(12) United States Patent
Honda

(10) Patent No.: US 12,454,600 B2
(45) Date of Patent: *Oct. 28, 2025

(54) CURABLE COMPOSITION

(71) Applicant: DAIKIN INDUSTRIES, LTD., Osaka (JP)

(72) Inventor: Yoshiaki Honda, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/102,051

(22) Filed: Jan. 26, 2023

(65) Prior Publication Data

US 2023/0167245 A1 Jun. 1, 2023

Related U.S. Application Data

(63) Continuation of application No. 16/759,385, filed as application No. PCT/JP2018/040355 on Oct. 30, 2018, now Pat. No. 11,591,439.

(30) Foreign Application Priority Data

Oct. 31, 2017 (JP) ................. 2017-211198

(51) Int. Cl.
| | |
|---|---|
| C08L 83/08 | (2006.01) |
| C08G 77/08 | (2006.01) |
| C08G 77/24 | (2006.01) |
| C08K 5/5419 | (2006.01) |

(52) U.S. Cl.
CPC ............ *C08G 77/08* (2013.01); *C08G 77/24* (2013.01); *C08K 5/5419* (2013.01); *C08L 83/08* (2013.01)

(58) Field of Classification Search
CPC ...................................... C08L 83/08
See application file for complete search history.

(56) References Cited

U.S. PATENT DOCUMENTS

| | | | | |
|---|---|---|---|---|
| 5,705,591 A | * | 1/1998 | Matsuda | C07F 7/1804 556/419 |
| 6,218,499 B1 | | 4/2001 | Tarumi | |
| 11,560,454 B2 | * | 1/2023 | Honda | C08G 77/46 |
| 11,629,254 B2 | * | 4/2023 | Honda | C08G 65/336 522/99 |
| 11,629,267 B2 | * | 4/2023 | Honda | C08K 5/57 528/35 |
| 2003/0138643 A1 | | 7/2003 | Moore et al. | |
| 2009/0299001 A1 | * | 12/2009 | Sato | C09D 171/02 524/588 |
| 2010/0076211 A1 | | 3/2010 | Yamane et al. | |
| 2012/0077041 A1 | * | 3/2012 | Yamane | C08G 65/007 525/185 |
| 2013/0108876 A1 | | 5/2013 | Komori | |
| 2015/0307719 A1 | | 10/2015 | Mitsuhashi | |
| 2016/0304665 A1 | | 10/2016 | Sakoh et al. | |
| 2017/0044315 A1 | | 2/2017 | Mitsuhashi et al. | |

FOREIGN PATENT DOCUMENTS

| | | |
|---|---|---|
| EP | 3 705 530 A1 | 9/2020 |
| JP | 07-053919 A | 2/1995 |
| JP | 9-77777 A | 3/1997 |
| JP | 2008-214566 A | 9/2008 |
| JP | 2010-047516 A | 3/2010 |
| JP | 2014-503380 A | 2/2014 |
| JP | 2015-168785 A | 9/2015 |
| JP | 2015-221888 A | 12/2015 |
| JP | 2016-204656 A | 12/2016 |
| WO | 2012/064646 A1 | 5/2012 |

OTHER PUBLICATIONS

Communication issued Jul. 23, 2021 by the European Patent Office in application No. 18874133.4.
International Preliminary Report on Patentability with the translation of Written Opinion dated May 5, 2020 from the International Bureau in International application No. PCT/JP2018/040355.
International Search Report for PCT/JP2018/040355 dated Jan. 22, 2019 [PCT/ISA/210].

* cited by examiner

*Primary Examiner* — Margaret G Moore
(74) *Attorney, Agent, or Firm* — Sughrue Mion, PLLC

(57) ABSTRACT

A curable composition including a fluorine-containing silane compound having two or more Si atoms each bonding to at least one group selected from the group consisting of a hydroxyl group and a hydrolyzable group; an organosilicon compound having at least two —O—$R^{g3}$ (s) each bonding to a Si atom, wherein each $R^{g3}$, at each occurrence, is independently a hydrogen atom or a monovalent organic group; a catalyst; and a solvent.

6 Claims, No Drawings

CURABLE COMPOSITION

CROSS-REFERENCE TO RELATED APPLICATIONS

This application is a Continuation of application Ser. No. 16/759,385 filed Apr. 27, 2020, which is a National Stage of International Application No. PCT/JP2018/040355 filed Oct. 30, 2018, claiming priority based on Japanese Patent Application No. 2017-211198 filed Oct. 31, 2017, the respective disclosures of all of the above of which are incorporated herein by reference in their entirety.

TECHNICAL FIELD

The present invention relates to a curable composition.

BACKGROUND ART

A certain fluorine-containing silane compound can impart excellent water-repellency, oil-repellency, antifouling property, and the like, and thus is used in, for example, a surface treatment of a base material. For example, Patent Literature 1 describes a perfluoropolyether group-containing silane compound having a perfluoropolyether group in a molecular backbone and having a hydrolyzable group bonding to a Si atom at a molecular end or an end. Examples of Patent Literatures 1 and 2 each describe a perfluoropolyether group-containing silane compound having a Si atom having a hydrolyzable group at an end of a branched chain.

CITATION LIST

Patent Literature

Patent Literature 1: JP 2016-204656 A
Patent Literature 2: JP 2010-047516 A

SUMMARY OF INVENTION

Technical Problem

On the other hand, for example, a sealing material and the like can also be demanded to have water-repellency, oil-repellency, and the like.

An object of the present invention is to provide a curable composition which includes a fluorine-containing silane compound to thereby allow a continuous thin film which not only has water-repellency and oil-repellency, but also can be particularly suitable as a sealing material or the like to be formed.

Solution to Problem

Examples of Patent Literatures 1 and 2 each describe a composition including a fluorine-containing silane compound and a solvent. It, however, have found according to studies by the present inventor that the composition described in Examples of Patent Literature 1 or 2 may be unsuitable for formation of a continuous thin film.

A first aspect of the present invention provides a curable composition including
a fluorine-containing silane compound having two or more Si atoms each bonding to at least one group selected from the group consisting of a hydroxyl group and a hydrolyzable group,
an organosilicon compound having at least two $-O-R^{g3}$ (s) each bonding to a Si atom, wherein each $R^{g3}$, at each occurrence, is independently a hydrogen atom or a monovalent organic group,
a catalyst, and
a solvent.

Advantageous Effects of Invention

The present invention can provide a curable composition which enables a continuous thin film which not only has water-repellency and oil-repellency, but also can be particularly suitable as a sealing material or the like to be formed.

DESCRIPTION OF EMBODIMENTS

Hereinafter, the curable composition of the present invention will be described.

The curable composition of the present invention includes
a fluorine-containing silane compound having two or more Si atoms each bonding to at least one group selected from the group consisting of a hydroxyl group and a hydrolyzable group (hereinafter, also referred to as "fluorine-containing silane compound"),
an organosilicon compound having at least two $-O-R^{g3}$ (s) each bonding to a Si atom (hereinafter, also referred to as "cross-linking agent"), wherein each $R^{g3}$, at each occurrence, is independently a hydrogen atom or a monovalent organic group,
a catalyst, and
a solvent.

(Fluorine-Containing Silane Compound)

The fluorine-containing silane compound is not limited as long as the compound has a fluorine-containing moiety imparting water-repellency and chemical proofness and a silane moiety imparting a binding ability to other substance. The fluorine-containing silane compound refers to a compound where at least one hydrogen atom bonding to a carbon atom is substituted with a fluorine atom.

The fluorine-containing silane compound preferably further includes a perfluoro(poly)ether group. That is, the fluorine-containing silane compound is preferably a perfluoropolyether group-containing silane compound (hereinafter, also referred to as "PFPE-containing silane compound (A)"). The perfluoropolyether group here means a group where all hydrogen atoms of a polyether group are each substituted with a fluorine atom.

The fluorine-containing silane compound may be adopted singly or in combinations of two or more kinds thereof.

The "hydrolyzable group", as used herein, means a group which can undergo a hydrolysis reaction, namely, means a group which can be removed from a main backbone of the compound by a hydrolysis reaction. Examples of the hydrolyzable group include $-OR$, $-OCOR$, $-O-N=CR_2$, $-NR_2$, $-NHR$ and halogen, wherein R represents a substituted or unsubstituted alkyl group having 1 to 4 carbon atoms, and $-OR$ (namely, an alkoxy group) is preferable. Examples of R include unsubstituted alkyl groups such as a methyl group, an ethyl group, a propyl group, an isopropyl group, a n-butyl group and an isobutyl group; and substituted alkyl groups such as a chloromethyl group. Among them, an alkyl group, in particular, an unsubstituted alkyl group is preferable, and a methyl group or an ethyl group is more preferable.

The hydroxyl group is not limited and may be generated by hydrolyzing the hydrolyzable group. Examples of the halogen can include a fluorine atom, a chlorine atom, a bromine atom and an iodine atom, and in particular, a chlorine atom is preferable.

Such a Si atom bonding to at least one group selected from the group consisting of a hydroxyl group and a hydrolyzable group is preferably present at each of both ends of a molecular backbone of the fluorine-containing silane compound (for example, PFPE-containing silane compound (A)). The molecular end means an end of a molecular backbone or a side chain. The molecular end is preferably an end of a molecular backbone, or the vicinity thereof, more preferably an end of a molecular backbone. The molecular backbone of the fluorine-containing silane compound (for example, PFPE-containing silane compound (A)) here represents a relatively longest binding chain in a molecule of the fluorine-containing silane compound (for example, PEPE-containing silane compound (A)).

The PFPE-containing silane compound (A) is preferably at least one compound represented by formula (A), (B), (C) or (D).

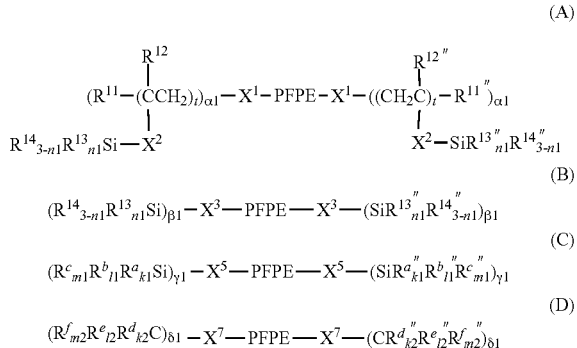

Hereinafter, such any PFPE-containing silane compound (A) represented by formulae (A), (B), (C) and (D) will be described.

The "di- to decavalent organic group", as used herein, means a di- to decavalent group containing carbon. The di- to decavalent organic group is not limited, and examples thereof include a di- to decavalent group where 1 to 9 hydrogen atoms are further removed from a hydrocarbon group. The divalent organic group is not limited, and examples thereof include a divalent group where one hydrogen atom is further removed from a hydrocarbon group.

The "hydrocarbon group", as used herein, means a group which contains carbon and hydrogen and which is obtained by removing one hydrogen atom from a molecule. The hydrocarbon group is not limited, and examples thereof include a hydrocarbon group having 1 to 20 carbon atoms, optionally substituted with one or more substituents, such as an aliphatic hydrocarbon group and an aromatic hydrocarbon group. For example, the "aliphatic hydrocarbon group" may be any linear, branched or cyclic group, and may be any saturated or unsaturated group. For example, the hydrocarbon group may contain one or more ring structures. The hydrocarbon group may have one or more N, O, S, Si, amide, sulfonyl, siloxane, carbonyl, carbonyloxy, and the like at an end thereof or in a molecular chain thereof.

Each substituent of the "hydrocarbon group", as used herein, is not limited, and examples thereof include a halogen atom; and one or more groups selected from a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5 to 10-membered heterocyclyl group, a 5 to 10-membered unsaturated heterocyclyl group, a $C_{6-10}$ aryl group and a 5 to 10-membered heteroaryl group each optionally substituted with one or more halogen atoms.

The alkyl group and the phenyl group may be herein unsubstituted or substituted, unless particularly noted. Each substituent of such groups is not limited, and examples thereof include one or more groups selected from a halogen atom, a $C_{1-6}$ alkyl group, a $C_{2-6}$ alkenyl group and a $C_{2-6}$ alkynyl group.

Formula (A)

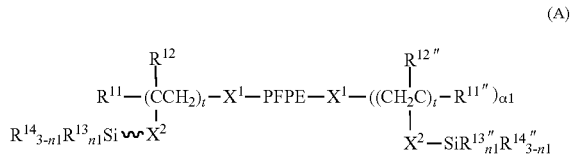

In the formulae, each PFPE, at each occurrence, is independently a group represented by:

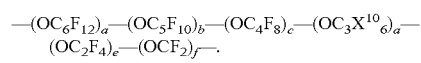

In the formulae, a, b, c, d, e and f are each independently an integer of 0 or more and 200 or less, and the sum of a, b, c, d, e and f is at least 1. Preferably, a, b, c, d, e and f are each independently an integer of 0 or more and 100 or less. Preferably, the sum of a, b, c, d, e and f is 5 or more, more preferably 10 or more. Preferably, the sum of a, b, c, d, e and f is 200 or less, more preferably 100 or less, for example, 10 or more and 200 or less, more specifically 10 or more and 100 or less. The occurrence order of the respective repeating units in parentheses with a, b, c, d, e or f is not limited in the formula. Each $X^{10}$, at each occurrence, independently represents a hydrogen atom, a fluorine atom or a chlorine atom, preferably a hydrogen atom or a fluorine atom, more preferably a fluorine atom.

Such repeating units may, for example, be linear or branched, and are preferably linear. For example, —$(OC_6F_{12})$— may be —$(OCF_2CF_2CF_2CF_2CF_2CF_2)$—, —$(OCF(CF_3)CF_2CF_2CF_2CF_2)$—, —$(OCF_2CF(CF_3)CF_2CF_2CF_2)$—, —$(OCF_2CF_2CF(CF_3)CF_2CF_2)$—, —$(OCF_2CF_2CF_2CF(CF_3)CF_2)$—, —$(OCF_2CF_2CF_2CF_2CF(CF_3))$—, or the like, and is preferably —$(OCF_2CF_2CF_2CF_2CF_2CF_2)$—. For example, —$(OC_5F_{10})$— may be —$(OCF_2CF_2CF_2CF_2CF_2)$—, —$(OCF(CF_3)CF_2CF_2CF_2)$—, —$(OCF_2CF(CF_3)CF_2CF_2)$—, —$(OCF_2CF_2CF(CF_3)CF_2)$—, —$(OCF_2CF_2CF_2CF(CF_3))$—, or the like, and is preferably —$(OCF_2CF_2CF_2CF_2CF_2)$—. —$(OC_4F_8)$— may be any of —$(OCF_2CF_2CF_2CF_2)$—, —$(OCF(CF_3)CF_2CF_2)$—, —$(OCF_2CF(CF_3)CF_2)$—, —$(OCF_2CF_2CF(CF_3))$—, —$(OC(CF_3)_2CF_2)$—, —$(OCF_2C(CF_3)_2)$—, —$(OCF(CF_3)CF(CF_3))$—, —$(OCF(C_2F_5)CF_2)$— and —$(OCF_2CF(C_2F_5))$—, and is preferably —$(OCF_2CF_2CF_2CF_2)$—. —$(OC_3F_6)$— (namely, in the formulae, $X^{10}$ represents a fluorine atom) may be any of —$(OCF_2CF_2CF_2)$—, —$(OCF(CF_3)CF_2)$— and —$(OCF_2CF(CF_3))$—, and is preferably —$(OCF_2CF_2CF_2)$—. —$(OC_2F_4)$— may be any of —(OCF$_2$CF$_2$)— and —(OCF(CF$_3$))—, and is preferably —(OCF$_2$CF$_2$)—.

In one embodiment, PFPE is —(OC$_3$F$_6$)$_d$—, wherein d is an integer of 1 or more and 200 or less, preferably 5 or more and 200 or less, more preferably 10 or more and 200 or less. Preferably, PFPE is —(OCF$_2$CF$_2$CF$_2$)$_d$—, wherein d is an integer of 1 or more and 200 or less, preferably 5 or more and 200 or less, more preferably 10 or more and 200 or less, or —(OCF(CF$_3$)CF$_2$)$_d$—, wherein d is an integer of 1 or more and 200 or less, preferably 5 or more and 200 or less, more preferably 10 or more and 200 or less. More preferably, PFPE is —(OCF$_2$CF$_2$CF$_2$)$_d$—, wherein d is an integer of 1 or more and 200 or less, preferably 5 or more and 200 or less, more preferably 10 or more and 200 or less.

In another embodiment, PFPE is —(OC$_4$F$_8$)$_c$—(OC$_3$F$_6$)—(OC$_2$F$_4$)$_e$—(OCF$_2$)$_f$—, wherein c and d are each independently an integer of 0 or more and 30 or less, e and f are each independently 1 or more and 200 or less, preferably 5 or more and 200 or less, more preferably an integer of 10 or more and 200 or less, the sum of c, d, e and f is at least 5 or more, preferably 10 or more, and the occurrence order of the respective repeating units in parentheses with the subscript c, d, e or f is not limited in the formulae. Preferably, PFPE is —(OCF$_2$CF$_2$CF$_2$CF$_2$)$_c$—(OCF$_2$CF$_2$CF$_2$)—(OCF$_2$CF$_2$)$_e$—(OCF$_2$)$_f$—.

In one embodiment, PEPE may be —(OC$_2$F$_4$)$_e$—(OCF$_2$)$_f$—, wherein e and f are each independently an integer of 1 or more and 200 or less, preferably 5 or more and 200 or less, more preferably 10 or more and 200 or less, and the occurrence order of the respective repeating units in parentheses with the subscript e or f is not limited in the formulae. The curable composition of the present invention, which includes the PFPE-containing silane compound (A), can contribute to formation of a cured product which may keep rubber properties even at a low temperature.

In still another embodiment, PFPE is a group represented by —(R$^6$—R$^7$)$_j$—. In the formulae, R$^6$ represents OCF$_2$ or OC$_2$F$_4$, preferably OC$_2$F$_4$. In the formula, R$^7$ represents a group selected from OC$_2$F$_4$, OC$_3$F$_6$, OC$_4$F$_8$, OC$_5$F$_{10}$ and OC$_6$F$_{12}$, or a combination of two or three groups independently selected from the above groups. Preferably, R$^7$ represents a group selected from OC$_2$F$_4$, OC$_3$F$_6$ and OC$_4$F$_8$, or a combination of two or three groups independently selected from the above groups, and is more preferably a group selected from OC$_3$F$_6$ and OC$_4$F$_8$. Such a combination of two or three groups independently selected from OC$_2$F$_4$, OC$_3$F$_6$ and OC$_4$F$_8$ is not limited, and examples thereof include
—OC$_2$F$_{40}$C$_3$F$_6$—,
 —OC$_2$F$_{40}$C$_4$F$_8$—,
 —OC$_3$F$_{60}$C$_2$F$_4$—,
 —OC$_3$F$_{60}$C$_3$F$_6$—,
 —OC$_3$F$_6$OC$_4$F$_8$—,
 —OC$_4$F$_8$OC$_4$F$_8$—,
 —OC$_4$F$_8$OC$_3$F$_6$—,
 —OC$_4$F$_8$OC$_2$F$_4$—, —OC$_2$F$_{40}$C$_2$F$_{40}$C$_3$F$_6$—,
 —OC$_2$F$_{40}$C$_2$F$_4$OC$_4$F$_8$—,
 —OC$_2$F$_{40}$C$_3$F$_6$OC$_2$F$_4$—, —OC$_2$F$_{40}$C$_3$F$_{60}$C$_3$F$_6$—,
 —OC$_2$F$_4$OC$_4$F$_8$OC$_2$F$_4$—,
 —OC$_3$F$_{60}$C$_2$F$_{40}$C$_2$F$_4$—, —OC$_3$F$_{60}$C$_2$F$_4$OC$_3$F$_6$—,
 —OC$_3$F$_{60}$C$_3$F$_{60}$C$_2$F$_4$—, and —OC$_4$F$_8$OC$_2$F$_{40}$C$_2$F$_4$—.

Here, j is an integer of 2 or more, preferably 3 or more, more preferably 5 or more, and an integer of 100 or less, preferably 50 or less. In the formulae, OC$_2$F$_4$, OC$_3$F$_6$, OC$_4$F$_8$, OC$_5$F$_{10}$ and OC$_6$F$_{12}$ may be linear or branched, and is preferably linear. In this embodiment, PFPE is preferably —(OC$_2$F$_4$—OC$_3$F$_6$)$_j$— or —(OC$_2$F$_4$—OC$_4$F$_8$)$_j$—.

The ratio of e to f in PFPE (hereinafter, referred to as "e/f ratio") is 0.1 or more and 10 or less, preferably 0.2 or more and 5 or less, more preferably 0.2 or more and 2 or less, further preferably 0.2 or more and 1.5 or less. The e/f ratio, which falls within the range, can more enhance water-repellency, oil-repellency and chemical resistance (for example, durability to brine, aqueous acidic or basic solution, acetone, oleic acid or hexane) of a cured product obtained from the compound. A lower e/f ratio more enhances water-repellency, oil-repellency and chemical resistance of the cured product. On the other hand, an e/f ratio of 0.1 or more can more enhance stability of the compound. A higher e/f ratio more enhances stability of the compound.

In one embodiment, the e/f ratio is less than 1.0. The e/f ratio is preferably 0.10 or more, more preferably 0.20 or more, further preferably 0.40 or more. The e/f ratio is preferably 0.90 or less, more preferably 0.85 or less, further preferably 0.80 or less. In the present embodiment, the e/f ratio is preferably 0.10 or more and 1.0 or less, 0.20 or more and 0.90 or less, further preferably 0.40 or more and 0.85 or less, particularly preferably 0.40 or more and 0.80 or less.

In one embodiment, the e/f ratio is 1.0 or more. The e/f ratio is preferably 1.1 or more, more preferably 1.2 or more. The e/f ratio is preferably 10.0 or less, more preferably 5.0 or less, further preferably 2.0 or less, particularly preferably 1.5 or less. In the present embodiment, the e/f ratio is preferably 1.0 or more and 10.0 or less, more preferably 1.0 or more and 5.0 or less, further preferably 1.0 or more and 2.0 or less, particularly preferably 1.0 or more and 1.5 or less.

The temperature of 1% decomposition of a cured product of the curable composition of the present embodiment can be a relatively high temperature. That is, the curable composition of the present embodiment can contribute to formation of a cured product usable in a wide temperature range. The "temperature of 1% decomposition" herein means a temperature at which 1% by mass of a cured product relative to the entire cured product is decomposed. The temperature of 1% decomposition means a value obtained by measurement according to thermogravimetric/differential thermal analysis (TG/DTA), and is specifically measured in the range from 25° C. to 600° C. at a temperature-increasing rate of 10° C./min under an air atmosphere. Examples of the TG/DTA can include DTG-60 manufactured by Shimadzu Corporation.

The number average molecular weight of the -PFPE-moiety in the PFPE-containing silane compound (A) is not limited, can be in the range from 2,000 to 200,000, and is preferably in the range from 3,000 to 100,000. The number average molecular weight is defined as a value obtained by $^{19}$F-NMR measurement.

In one embodiment, the number average molecular weight of the -PFPE- moiety can be in the range from 2,000 to 10,000, and is preferably in the range from 2,000 to 3,000. The compound can have such a number average molecular weight of the -PFPE-moiety to thereby allow the curable composition to be low in viscosity and be improved in handleability.

In one embodiment, the number average molecular weight of the -PFPE- moiety can be in the range from 10,000 to 100,000, and is preferably in the range from 10,000 to 50,000. The compound can have such a number average molecular weight of the -PFPE- moiety to thereby allow the curable composition to be improved in physical properties such as stretching properties after curing.

In the formulae, each $R^{13}$, at each occurrence, independently represents a hydroxyl group or a hydrolyzable group. The hydrolyzable group has the same meaning as described above.

In the formulae, each $R^{14}$, at each occurrence, independently represents a hydrogen atom or an alkyl group having 1 to 22 carbon atoms, preferably an alkyl group having 1 to 4 carbon atoms.

In the formulae, each $R^{11}$, at each occurrence, independently represents a hydrogen atom or a halogen atom. The halogen atom is preferably an iodine atom, a chlorine atom or a fluorine atom, more preferably a fluorine atom.

In the formulae, each $R^{12}$, at each occurrence, independently represents a hydrogen atom or a lower alkyl group. The lower alkyl group is preferably an alkyl group having 1 to 20 carbon atoms, more preferably an alkyl group having 1 to 6 carbon atoms, and examples thereof include a methyl group, an ethyl group and a propyl group.

In the formulae, $R^{11''}$, $R^{12''}$, $R^{13''}$ and $R^{14''}$ have the same meanings as $R^{11}$, $R^{12}$, $R^{13}$ and $R^{14}$, respectively.

In formula (A), such a Si atom bonding to at least one group selected from the group consisting of a hydroxyl group and a hydrolyzable group indicates a Si atom contained in $(-SiR^{13}{}_{n1}R^{14}{}_{3-n1})$ or $(-SiR^{13''}{}_{n1}R^{14''}{}_{3-n1})$ where n1 is an integer of 1 to 3.

In the formulae, n1 with respect to each $(-SiR^{13}{}_{n1}R^{14}{}_{3-n1})$ unit or each $(-SiR^{13''}{}_{n1}R^{14''}{}_{3-n1})$ unit is independently an integer of 0 to 3, preferably 1 to 3, more preferably 3. In the formulae, at least two n1(s) are each an integer of 1 to 3, namely, there is not any case where all n1(s) are simultaneously 0. That is, at least two Si atoms each bonding to $R^{13}$ or $R^{13''}$ are present in the formulae. In other words, at least two structures selected from the group consisting of a $-SiR^{13}{}_{n1}R^{14}{}_{3-n1}$ structure (namely, $-SiR^{13}$ moiety) where n1 is 1 or more and a $-SiR^{13''}{}_{n1}R^{14''}{}_{3-n1}$ structure (namely, $-SiR^{13''}$ moiety) where n1 is 1 or more are present in formula (A).

Preferably, the Si atom bonding to at least one group selected from the group consisting of a hydroxyl group and a hydrolyzable group is present at both ends of a molecular backbone in formula (A). That is, at least one $-SiR^{13}{}_{n1}R^{14}{}_{3-n1}$ structure (namely, $-SiR^{13}$ moiety) where n1 is 1 or more and at least one $-SiR^{13''}{}_{n1}R^{14''}{}_{3-n1}$ structure (namely, $-SiR^{13''}$ moiety) where n1 is 1 or more are present in formula (A).

In the formulae, each $X^1$ independently represents a single bond or a di- to decavalent organic group. $X^1$ is understood to be a linker which links a perfluoropolyether moiety (namely, -PFPE- moiety) mainly providing water-repellency, surface lubricity, and the like, and a silane moiety (namely, group in parentheses with α1) providing a binding ability to the base material, in any compound represented by formula (A). Accordingly, $X^1$ may be a single bond or any organic group as long as such any compound represented by formula (A) can be stably present. Herein, a left portion and a right portion of the group designated as $X^1$ are bonding to the group represented by PFPE and the group in parentheses with α1, respectively.

In another embodiment, $X^1$ can be $X^e$. $X^e$ represents a single bond or a di- to decavalent organic group, preferably represents a single bond or a di- to decavalent organic group having at least one selected from the group consisting of $-C_6H_4-$ (namely, -phenylene-, hereinafter, representing a phenylene group), $-CO-$ (carbonyl group), $-NR^4-$ and $-SO_2-$. Each $R^4$ independently represents a hydrogen atom, a phenyl group, or a $C_{1-6}$ alkyl group (preferably a methyl group), preferably represents a hydrogen atom or a methyl group. Such $-C_6H_4-$, $-CO-$, $-NR^4-$ or $-SO_2-$ is preferably contained in a molecular backbone of the PFPE-containing silane compound (A).

$X^e$ more preferably represents a single bond or a di- to decavalent organic group having at least one selected from the group consisting of $-C_6H_4-$,
$-CONR^4-$,
$-CONR^4-C_6H_4-$,
$-CO-$,
$-CO-C_6H_4-$,
$-SO_2NR^4-$,
$-SO_2NR^4-C_6H_4-$,
$-SO_2-$, and $-SO_2-C_6H_4-$. Such $-C_6H_4-$,
$-CONR^4-$,
$-CONR^4-C_6H_4-$,
$-CO-$,
$-CO-C_6H_4-$,
$-SO_2NR^4-$,
$-SO_2NR^4-C_6H_4-$, $-SO_2-$, or $-SO_2-C_6H_4-$ is preferably contained in a molecular backbone of the PFPE-containing silane compound (A).

In the formulae, α1 is an integer of 1 to 9, and may be varied depending on the valence of $X^1$. In formula (A), α1 corresponds to a value obtained by subtracting 1 from the valence of $X^1$. In the case where $X^1$ is a single bond, α1 is 1.

$X^1$ is preferably a di- to heptavalent, more preferably di- to tetravalent, further preferably divalent organic group.

In one embodiment, $X^1$ is a di- to tetravalent organic group, and α1 is 1 to 3.

In another embodiment, $X^1$ is a divalent organic group, and α1 is 1. In such a case, formula (A) is represented by the following formula (A').

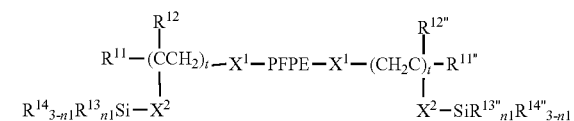

(A')

Examples of $X^1$ are not limited, and include a divalent group represented by the following formula:

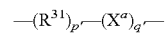

wherein:
$R^{31}$ represents a single bond, $-(CH_2)_{s'}-$, or an o-, m- or p-phenylene group, preferably represents $-(CH_2)_{s'}-$,
s' is an integer of 1 to 20, preferably an integer of 1 to 6, more preferably an integer of 1 to 3, still more preferably 1 or 2,
$X^a$ represents, $-(X^b)_{t'}-$,
each $X^b$, at each occurrence, independently represents a group selected from the group consisting of $-O-$, $-S-$, o-, m- or p-phenylene group, $-C(O)O-$, $-Si(R^{33})_2-$,
$-(Si(R^{33})_2O)_m-Si(R^3)_2-$, $-CONR^{34}-$,
$-O-CONR^{34}-$,
$-NR^{34}-$ and $-(CH_2)_{n'}-$,
each $R^{33}$, at each occurrence, independently represents a phenyl group, a $C_{1-6}$ alkyl group or a $C_{1-6}$ alkoxy group, preferably represents a phenyl group or a $C_{1-6}$ alkyl group, more preferably represents a methyl group, each $R^{34}$, at each occurrence, independently represents a hydrogen atom, a phenyl group, or a $C_{1-6}$ alkyl group (preferably a methyl group), each m', at each occurrence, is independently an integer of 1 to 100, preferably an integer of 1 to 20, each n', at each occurrence, is independently an integer of 1 to 20, preferably an integer of 1 to 6, more preferably an integer of 1 to 3, l' is an integer of 1 to 10, preferably an integer of 1 to 5, more preferably an integer of 1 to 3, p' is 0 or 1, and q' is 0 or 1, provided that at least one of p' and q' is 1, and the occurrence order of the respective repeating units in parentheses with p' or q' is not limited. Here, $R^{31}$ and $X^a$ (typically, any hydrogen atom in $R^{31}$ and $X^a$) are each optionally substituted with one or more substituents selected from a fluorine atom, a $C_{1-3}$ alkyl group and a $C_{1-3}$ fluoroalkyl group.

In one embodiment, l' is 1.

Preferably, $X^1$ is $—(R^{31})_{p'}—(X^a)_{q'}—R^{32}—$. $R^{32}$ represents a single bond, $—(CH_2)_{t'}—$, or an o-, m- or p-phenylene group, preferably $—(CH_2)_{t'}—$. Here, t' is an integer of 1 to 20, preferably an integer of 2 to 6, more preferably an integer of 2 to 3. Here, $R^{32}$ (typically, any hydrogen atom in $R^{32}$) is optionally substituted with one or more substituents selected from a fluorine atom, a $C_{1-3}$ alkyl group and a $C_{1-3}$ fluoroalkyl group.

Preferably, $X^1$ can be a single bond, a $C_{1-20}$ alkylene group, $—R^{31}—X^c—R^{32}—$, or $—X^d—R^{32}—$ wherein $R^{31}$ and $R^{32}$ have the same meanings as described above. Herein, such an alkylene group is a group having a $—(C_\delta H_{2\delta})—$ structure, and is optionally substituted or unsubstituted and is optionally linear or branched.

More preferably, $X^1$ is a single bond, a $C_{1-20}$ alkylene group, $—(CH_2)_{s'}—X^c—$, $—(CH_2)_{s'}—X^c—(CH_2)_{t'}—$, $—X^d—$, or $—X^d—(CH_2)_{t'}—$ wherein s' and t' have the same meanings as described above.

Further preferably, $X^1$ is $—X^f—$, a $—X^f—C_{1-20}$ alkylene group, $—X^f—(CH_2)_{s'}—X^c—$, $—X^f—(CH_2)_{s'}—X^c—(CH_2)_{t'}—$, $—X^f—X^d—$, or $—X^f—X^d—(CH_2)_{t'}—$ wherein s' and t' have the same meanings as described above.

In the formulae, $X^f$ is an alkylene group having 1 to 6 carbon atoms, preferably 1 to 4 carbon atoms, more preferably 1 to 2 carbon atoms, for example, a methylene group. Any hydrogen atom in $X^f$ is optionally substituted with one or more substituents selected from a fluorine atom, a $C_{1-3}$ alkyl group and a $C_{1-3}$ fluoroalkyl group, and is preferably substituted. $X^f$ may be linear or branched, and is preferably linear.

In the formulae, $X^c$ represents $—O—$, $—S—$, $—C(O)O—$, $—CONR^{34}—$, $—O—CONR^{34}—$, $—Si(R^{33})_2—$, $—(Si(R^{33})_2O)_{m'}—Si(R^{33})_2—$, $—O—(CH_2)_{u'}—(Si(R^{33})_2O)_{m'}—Si(R^{33})_2—$, $—O—(CH_2)_{u'}—Si(R^{33})_2—O—Si(R^{33})_2—CH_2CH_2—Si(R^{33})_2—O—Si(R^{33})_2—$, $—O—(CH_2)_{u'}—Si(OCH_3)_2OSi(OCH_3)_2—$, $—CONR^{34}—(CH_2)_{u'}—(Si(R^{33})_2O)_{m'}—Si(R^{33})_2—$, $—CONR^{34}—(CH_2)_{u'}—N(R^{34})—$, or $—CONR^{34}—$ (o-, m- or p-phenylene)-$Si(R^{33})_2—$ wherein $R^{33}$, $R^{34}$ and m' have the same meanings as described above, and u' is an integer of 1 to 20, preferably an integer of 2 to 6, more preferably an integer of 2 to 3. $X^c$ is preferably $—O—$.

In the formulae, $X^d$ represents $—S—$, $—C(O)O—$, $—CONR^{34}—$, $—CONR^{34}—(CH_2)_{u'}—(Si(R^{33})_2O)_{m'}—Si(R^{33})_2—$, $—CONR^{34}—(CH_2)_{u'}—N(R^{34})—$, or $—CONR^{34}$-(o-, m- or p-phenylene)-$Si(R^{33})_2—$ wherein each symbol has the same meaning as described above.

Particularly preferably, $X^1$ is a group represented by $—X^f—$, a $—X^f—C_{1-20}$ alkylene group, $—X^f—(CH_2)_{s'}—X^c—$, $—X^f—(CH_2)_{s'}—X^c—(CH_2)_{t'}—$, $—X^f—X^d—$, or $—X^f—X^d—(CH_2)_{t'}—$ wherein $X^f$, s' and t' have the same meanings as described above;

$X^c$ represents $—O—$, or $—CONR^{34}—$, $X^d$ represents $—CONR^{34}—$, and each $R^{34}$, at each occurrence, independently represents a hydrogen atom, a phenyl group, or a $C_{1-6}$ alkyl group (preferably a methyl group).

In one embodiment, $X^1$ is a group represented by $—X^f—(CH_2)_{s'}—X^c—$, $—X^f—(CH_2)_{s'}—X^c—(CH_2)_{t'}—$, $—X^f—X^d—$, or $—X^f—X^d—(CH_2)_{t'}—$ wherein $X^f$, s' and t' have the same meanings as described above;

$X^c$ represents $—CONR^{34}—$, $X^d$ represents $—CONR^{34}—$, and each $R^{34}$, at each occurrence, independently represents a hydrogen atom, a phenyl group or a $C_{1-6}$ alkyl group (preferably a methyl group).

In one embodiment, $X^1$ can be, a single bond, a $C_{1-20}$ alkylene group, $—(CH_2)_{s'}—X^c—(CH_2)_{t'}—$, or $—X^d—(CH_2)_{t'}—$ wherein each symbol has the same meaning as described above.

Preferably, $X^1$ is a single bond, a $C_{1-20}$ alkylene group, $—(CH_2)_{s'}—O—(CH_2)_{t'}—$, $—(CH_2)_{s'}—(Si(R^{33})_2O)_{m'}—Si(R^{33})_2—(CH_2)_{t'}—$, $—(CH_2)_{s'}—O—(CH_2)_{u'}—(Si(R^{33})_2O)_{m'}—Si(R^{33})_2—(CH_2)_{t'}—$, or —$(CH_2)_{s'}$—O—$(CH_2)_{t'}$—$Si(R^{33})_2$—$(CH_2)_{u'}$
—$Si(R^{33})_2$—$(C_vH_{2v})$— wherein $R^{33}$, m', s', t' and u' have the same meanings as described above, and v is an integer of 1 to 20, preferably an integer of 2 to 6, more preferably an integer of 2 to 3.

In the formulae, —$(C_vH_{2v})$— is optionally linear or branched, and can be, for example, —$CH_2$—,
—$CH_2CH_2$—,
—$CH_2CH_2CH_2$—,
—$CH(CH_3)$— or —$CH(CH_3)CH_2$—.

The $X^1$ group is optionally substituted with one or more substituents selected from a fluorine atom, a $C_{1-3}$ alkyl group and a $C_{1-3}$ fluoroalkyl group (preferably $C_{1-3}$perfluoroalkyl group).

In one embodiment, the $X^1$ group can be other than a —O—$C_{1-6}$ alkylene group.

In another embodiment, examples of the $X^1$ group include the following groups:

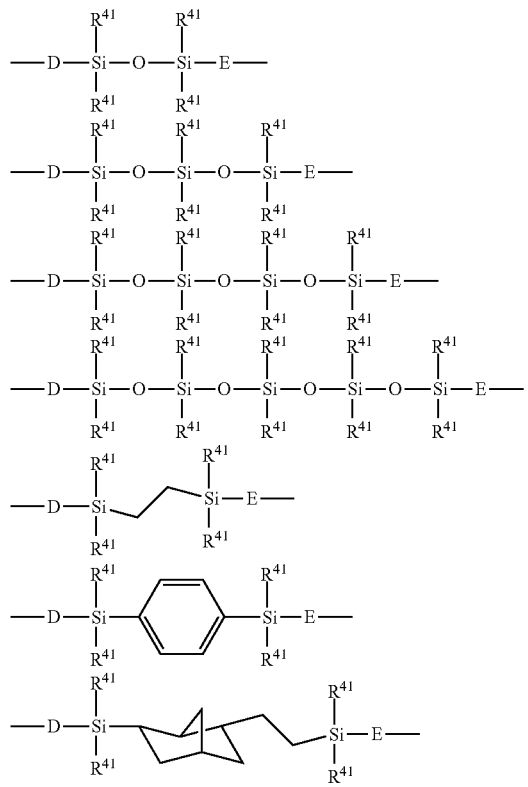

wherein each $R^{41}$ independently represents a hydrogen atom, a phenyl group, an alkyl group having 1 to 6 carbon atoms, or a $C_{1-6}$ alkoxy group, preferably a methyl group;

D is a group selected from
—$CH_2O(CH_2)_2$—,
—$CH_2O(CH_2)_3$—,
—$CF_2O(CH_2)_3$—,
—$(CH_2)_2$—,
—$(CH_2)_3$—,
—$(CH_2)_4$—,
—CONH—$(CH_2)_3$—,
—$CON(CH_3)$—$(CH_2)_3$—,
—CON(Ph)-$(CH_2)_3$—, wherein Ph means phenyl; and

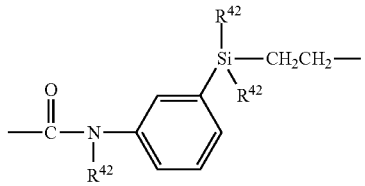

wherein each $R^{42}$ independently represents a hydrogen atom, a $C_{1-6}$ alkyl group or a $C_{1-6}$ alkoxy group, preferably a methyl group or a methoxy group, more preferably a methyl group;

E is —$(CH_2)_{ne}$— (ne is an integer of 2 to 6),

D is bonding to PFPE of a molecular backbone, and E is bonding to a group opposite to PFPE.

Specific examples of $X^1$ include:
a single bond,
—$CH_2OCH_2$—,
—$CH_2O(CH_2)_2$—,
—$CH_2O(CH_2)_3$—,
—$CH_2O(CH_2)_6$—,
—$CF_2$—$CH_2$—O—$CH_2$—,
—$CF_2$—$CH_2$—O—$(CH_2)_2$—,
—$CF_2$—$CH_2$—O—$(CH_2)_3$—,
—$CF_2$—$CH_2$—O—$(CH_2)_6$—,
—$CH_2O(CH_2)_3Si(CH_3)_2OSi(CH_3)_2(CH_2)_2$—,
—$CH_2O(CH_2)_3Si(CH_3)_2OSi(CH_3)_2OSi(CH_3)_2(CH_2)_2$—,
—$CH_2O(CH_2)_3Si(CH_3)_2O(Si(CH_3)_2O)_2Si(CH_3)_2(CH_2)_2$—,
—$CH_2O(CH_2)_3Si(CH_3)_2O(Si(CH_3)_2O)_3Si(CH_3)_2(CH_2)_2$—,
—$CH_2O(CH_2)_3Si(CH_3)_2O(Si(CH_3)_2O)_{10}Si(CH_3)_2(CH_2)_2$—,
—$CH_2O(CH_2)_3Si(CH_3)_2O(Si(CH_3)_2O)_2OSi(CH_3)_2(CH_2)_2$—,
—$CH_2OCF_2CHFOCF_2$—,
—$CH_2OCF_2CHFOCF_2CF_2$—,
—$CH_2OCF_2CHFOCF_2CF_2CF_2$—,
—$CH_2OCH_2CF_2CF_2OCF_2$—,
—$CH_2OCH_2CF_2CF_2OCF_2CF_2$—,
—$CH_2OCH_2CF_2CF_2OCF_2CF_2CF_2$—,
—$CH_2OCH_2CF_2CF_2OCF(CF_3)CF_2OCF_2$—,
—$CH_2OCH_2CF_2CF_2OCF(CF_3)CF_2OCF_2CF_2$—,
—$CH_2OCH_2CF_2CF_2OCF(CF_3)CF_2OCF_2CF_2CF_2$—,
—$CH_2OCH_2CHFCF_2OCF_2$—,
—$CH_2OCH_2CHFCF_2OCF_2CF_2$—,
—$CH_2OCH_2CHFCF_2OCF_2CF_2CF_2$—,
—$CH_2OCH_2CHFCF_2OCF(CF_3)CF_2OCF_2$—,
—$CH_2OCH_2CHFCF_2OCF(CF_3)CF_2OCF_2CF_2$—,
—$CH_2OCH_2CHFCF_2OCF(CF_3)CF_2OCF_2CF_2CF_2$—,
—$CH_2OCF_2CHFOCF_2CF_2CF_2$—C(O)NH—$CH_2$—,
—$CH_2OCH_2(CH_2)_7CH_2Si(OCH_3)_2OSi(OCH_3)_2$ $(CH_2)_2Si(OCH_3)_2OSi(OCH_3)_2(CH_2)_2$—,
—$CH_2OCH_2CH_2CH_2Si(OCH_3)_2OSi(OCH_3)_2(CH_2)_3$—,
—$CH_2OCH_2CH_2CH_2Si(OCH_2CH_3)_2OSi(OCH_2CH_3)_2(CH_2)_3$—,
—$CH_2OCH_2CH_2CH_2Si(OCH_3)_2OSi(OCH_3)_2(CH_2)_2$—,
—$CH_2OCH_2CH_2CH_2Si(OCH_2CH_3)_2OSi(OCH_2CH_3)_2(CH_2)_2$—,
—$(CH_2)_2$—$Si(CH_3)_2$—$(CH_2)_2$—,
—$CH_2$—,
—$(CH_2)_2$—,
—$(CH_2)_3$—,
—$(CH_2)_4$—,
—$(CH_2)_5$—, —(CH$_2$)$_6$—,
—CF$_2$—,
—(CF$_2$)$_2$—,
—CF$_2$—CH$_2$—,
—CF$_2$—(CH$_2$)$_2$—,
—CF$_2$—(CH$_2$)$_3$—,
—CF$_2$—(CH$_2$)$_4$—,
—CF$_2$—(CH$_2$)$_5$—,
—CF$_2$—(CH$_2$)$_6$—,
—CO—,
—CONH—,
—CONH—CH$_2$—,
—CONH—(CH$_2$)$_2$—,
—CONH—(CH$_2$)$_3$—,
—CONH—(CH$_2$)$_6$—,
—CF$_2$CONH—,
—CF$_2$CONHCH$_2$—,
—CF$_2$CONH(CH$_2$)$_2$—,
—CF$_2$CONH(CH$_2$)$_3$—,
—CF$_2$CONH(CH$_2$)$_6$—,
—CON(CH$_3$)—(CH$_2$)$_3$—,
—CON(Ph)-(CH$_2$)$_3$—, wherein Ph means phenyl,
—CON(CH$_3$)—(CH$_2$)$_6$—,
—CON(Ph)-(CH$_2$)$_6$—, wherein Ph means phenyl,
—CF$_2$—CON(CH$_3$)—(CH$_2$)$_3$—,
—CF$_2$—CON(Ph)-(CH$_2$)$_3$—, wherein Ph means phenyl,
—CF$_2$—CON(CH$_3$)—(CH$_2$)$_6$—,
—CF$_2$—CON(Ph)-(CH$_2$)$_6$—, wherein Ph means phenyl,
—CONH—(CH$_2$)$_2$NH(CH$_2$)$_3$—,
—CONH—(CH$_2$)$_6$NH(CH$_2$)$_3$—,
—CH$_2$O—CONH—(CH$_2$)$_3$—,
—CH$_2$O—CONH—(CH$_2$)$_6$—,
—S—(CH$_2$)$_3$—,
—(CH$_2$)$_2$S(CH$_2$)$_3$—,
—CONH—(CH$_2$)$_3$Si(CH$_3$)$_2$OSi(CH$_3$)$_2$(CH$_2$)$_2$—,
—CONH—(CH$_2$)$_3$Si(CH$_3$)$_2$OSi(CH$_3$)$_2$OSi(CH$_3$)$_2$(CH$_2$)$_2$—,
—CONH—(CH$_2$)$_3$Si(CH$_3$)$_2$O(Si(CH$_3$)$_2$O)$_2$Si(CH$_3$)$_2$(CH$_2$)$_2$—,
—CONH—(CH$_2$)$_3$Si(CH$_3$)$_2$O(Si(CH$_3$)$_2$O)$_3$Si(CH$_3$)$_2$(CH$_2$)$_2$—,
—CONH—(CH$_2$)$_3$Si(CH$_3$)$_2$O(Si(CH$_3$)$_2$O)$_{10}$Si(CH$_3$)$_2$(CH$_2$)$_2$—,
—CONH—(CH$_2$)$_3$Si(CH$_3$)$_2$O(Si(CH$_3$)$_2$O)$_2$OSi(CH$_3$)$_2$(CH$_2$)$_2$—,
—C(O)O—(CH$_2$)$_3$—,
—C(O)O—(CH$_2$)$_6$—,
—CH$_2$—O—(CH$_2$)$_3$—Si(CH$_3$)$_2$—(CH$_2$)$_2$—Si(CH$_3$)$_2$—(CH$_2$)$_2$—,
—CH$_2$—O—(CH$_2$)$_3$—Si(CH$_3$)$_2$—(CH$_2$)$_2$—Si(CH$_3$)$_2$—CH(CH$_3$)—,
—CH$_2$—O—(CH$_2$)$_3$—Si(CH$_3$)$_2$—(CH$_2$)$_2$—Si(CH$_3$)$_2$—(CH$_2$)$_3$—,
—CH$_2$—O—(CH$_2$)$_3$—Si(CH$_3$)$_2$—(CH$_2$)$_2$—Si(CH$_3$)$_2$—CH(CH$_3$)—CH$_2$—,
—OCH$_2$—,
—O(CH$_2$)$_3$—, and
—OCFHCF$_2$—

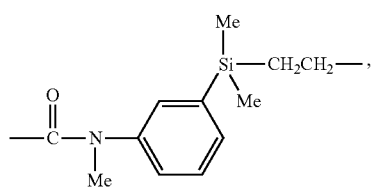

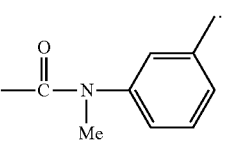

In particular, X$^1$ is preferably
—CH$_2$OCH$_2$—,
—CH$_2$O(CH$_2$)$_2$—,
—CH$_2$O(CH$_2$)$_3$—,
—CH$_2$O(CH$_2$)$_6$—,
—CF$_2$—CH$_2$—O—CH$_2$—,
—CF$_2$—CH$_2$—O—(CH$_2$)$_2$—,
—CF$_2$—CH$_2$—O—(CH$_2$)$_3$—,
—CF$_2$—CH$_2$—O—(CH$_2$)$_6$—,
—CH$_2$OCF$_2$CHFOCF$_2$—,
—CH$_2$OCF$_2$CHFOCF$_2$CF$_2$—,
—CH$_2$OCF$_2$CHFOCF$_2$CF$_2$CF$_2$—,
—CH$_2$OCH$_2$CF$_2$CF$_2$OCF$_2$—,
—CH$_2$OCH$_2$CF$_2$CF$_2$OCF$_2$CF$_2$—,
—CH$_2$OCH$_2$CF$_2$CF$_2$OCF$_2$CF$_2$CF$_2$—,
—CH$_2$OCH$_2$CF$_2$CF$_2$OCF(CF$_3$)CF$_2$OCF$_2$—,
—CH$_2$OCH$_2$CF$_2$CF$_2$OCF(CF$_3$)CF$_2$OCF$_2$CF$_2$—,
—CH$_2$OCH$_2$CF$_2$CF$_2$OCF(CF$_3$)CF$_2$OCF$_2$CF$_2$CF$_2$—,
—CH$_2$OCH$_2$CHFCF$_2$OCF$_2$—,
—CH$_2$OCH$_2$CHFCF$_2$OCF$_2$CF$_2$—,
—CH$_2$OCH$_2$CHFCF$_2$OCF$_2$CF$_2$CF$_2$—,
—CH$_2$OCH$_2$CHFCF$_2$OCF(CF$_3$)CF$_2$OCF$_2$—,
—CH$_2$OCH$_2$CHFCF$_2$OCF(CF$_3$)CF$_2$OCF$_2$CF$_2$—,
—CH$_2$OCH$_2$CHFCF$_2$OCF(CF$_3$)CF$_2$OCF$_2$CF$_2$CF$_2$—,
—CH$_2$OCF$_2$CHFOCF$_2$CF$_2$CF$_2$—C(O)NH—CH$_2$—,
—CH$_2$—,
—(CH$_2$)$_2$—,
—(CH$_2$)$_3$—,
—(CH$_2$)$_4$—,
(CH$_2$)$_5$—,
—(CH$_2$)$_6$—,
—CF$_2$—CH$_2$—,
—CF$_2$—(CH$_2$)$_2$—,
—CF$_2$—(CH$_2$)$_3$—,
—CF$_2$—(CH$_2$)$_4$—,
—CF$_2$—(CH$_2$)$_5$—,
—CF$_2$—(CH$_2$)$_6$—,
—CONH—,
—CONH—CH$_2$—,
—CONH—(CH$_2$)$_2$—,
—CONH—(CH$_2$)$_3$—,
—CONH—(CH$_2$)$_6$—,
—CF$_2$CONH—,
—CF$_2$CONHCH$_2$—,
—CF$_2$CONH(CH$_2$)$_2$—,
—CF$_2$CONH(CH$_2$)$_3$—,
—CF$_2$CONH(CH$_2$)$_6$—,
—CON(CH$_3$)—(CH$_2$)$_3$—,
—CON(Ph)-(CH$_2$)$_3$—, wherein Ph means phenyl,
—CON(CH$_3$)—(CH$_2$)$_6$—,
—CON(Ph)-(CH$_2$)$_6$—, wherein Ph means phenyl,
—CF$_2$—CON(CH$_3$)—(CH$_2$)$_3$—,
—CF$_2$—CON(Ph)-(CH$_2$)$_3$—, wherein Ph means phenyl,
—CF$_2$—CON(CH$_3$)—(CH$_2$)$_6$—,
—CF$_2$—CON(Ph)-(CH$_2$)$_6$—, wherein Ph means phenyl,
—CONH—(CH$_2$)$_2$NH(CH$_2$)$_3$—,
—CONH—(CH$_2$)$_6$NH(CH$_2$)$_3$—,
—CH$_2$O—CONH—(CH$_2$)$_3$—,
—CH$_2$O—CONH—(CH$_2$)$_6$—, —OCH$_2$—,
—O(CH$_2$)$_3$—, or
—OCFHCF$_2$—.
In particular, X$^1$ is more preferably
—CH$_2$OCF$_2$CHFOCF$_2$CF$_2$CF$_2$—C(O)NH—CH$_2$—,
—CONH—,
—CONH—CH$_2$—,
—CONH—(CH$_2$)$_2$—,
—CONH—(CH$_2$)$_3$—,
—CONH—(CH$_2$)$_6$—,
—CF$_2$CONH—,
—CF$_2$CONHCH$_2$—,
—CF$_2$CONH(CH$_2$)$_2$—,
—CF$_2$CONH(CH$_2$)$_3$—,
—CF$_2$CONH(CH$_2$)$_6$—,
—CON(CH$_3$)—(CH$_2$)$_3$—,
—CON(Ph)-(CH$_2$)$_3$—, wherein Ph means phenyl,
—CON(CH$_3$)—(CH$_2$)$_6$—,
—CON(Ph)-(CH$_2$)$_6$—, wherein Ph means phenyl,
—CF$_2$—CON(CH$_3$)—(CH$_2$)$_3$—,
—CF$_2$—CON(Ph)-(CH$_2$)$_3$—, wherein Ph means phenyl,
—CF$_2$—CON(CH$_3$)—(CH$_2$)$_6$—,
—CF$_2$—CON(Ph)-(CH$_2$)$_6$—, wherein Ph means phenyl,
—CONH—(CH$_2$)$_2$NH(CH$_2$)$_3$—,
—CONH—(CH$_2$)$_6$NH(CH$_2$)$_3$—.

In one embodiment, X$^1$ represents X$^{e'}$. X$^{e'}$ is a single bond, an alkylene group having 1 to 6 carbon atoms, —R$^{51}$—C$_6$H$_4$—R$^{52}$—, —R$^{51}$—CONR$^4$—R$^{52}$—, —R$^{51}$—CONR$^4$—C$_6$H$_4$—R$^{52}$—, —R$^{51}$—CO—R$^{52}$—, —R$^{51}$—CO—C$_6$H$_4$—R$^{52}$—, —R$^{51}$—SO$_2$NR$^4$—R$^{52}$—, —R$^{51}$—SO$_2$NR$^4$—C$_6$H$_4$—R$^{52}$—, —R$^{51}$—SO$_2$—R$^{52}$—, or —R$^{51}$—SO$_2$—C$_6$H$_4$—R$^{52}$—. R$^{51}$ and R$^{52}$ each independently represent a single bond or an alkylene group having 1 to 6 carbon atoms, preferably a single bond or an alkylene group having 1 to 3 carbon atoms. R$^4$ has the same meaning as described above. The alkylene group is substituted or unsubstituted, preferably unsubstituted. Examples of the substituent of the alkylene group can include a halogen atom, preferably a fluorine atom. The alkylene group is linear or branched, preferably linear.

In a preferable embodiment, X$^{e'}$ can be
a single bond,
—X$^f$—,
an alkylene group having 1 to 6 carbon atoms, preferably 1 to 3 carbon atoms,
a —X$^f$—C$_{1-6}$ alkylene group, preferably a —X$^f$—C$_{1-3}$ alkylene group, more preferably
a —X$^f$—C$_{1-2}$ alkylene group,
—C$_6$H$_4$—R$^{52'}$—,
—CONR$^{4'}$—R$^{52'}$—,
—CONR$^{4'}$—C$_6$H$_4$—R$^{52'}$—,
—X$^f$—CONR$^{4'}$—R$^{52'}$—,
—X$^f$—CONR$^{4'}$—C$_6$H$_4$—R$^{52'}$—,
—CO—R$^{52'}$—,
—CO—C$_6$H$_4$—R$^{52'}$—,
—SO$_2$NR$^{4'}$—R$^{52'}$—,
—SO$_2$NR$^{4'}$—C$_6$H$_4$—R$^{52'}$—,
—SO$_2$—R$^{52'}$—,
—SO$_2$—C$_6$H$_4$—R$^{52'}$—,
—R$^{51'}$—C$_6$H$_4$—,
—R$^{51'}$—CONR$^{4'}$—,
—R$^{51'}$—CONR$^{4'}$—C$_6$H$_4$—,
—R$^{51'}$—CO—,
—R$^{51'}$—CO—C$_6$H$_4$—,
—R$^{51'}$—SO$_2$NR$^{4'}$—,
—R$^{51'}$—SO$_2$NR$^{4'}$—C$_6$H$_4$—,
—R$^{51'}$—SO$_2$—,
—R$^{51'}$—SO$_2$—C$_6$H$_4$—,
—C$_6$H$_4$—,
—CONR$^{4'}$—,
—CONR$^{4'}$—C$_6$H$_4$—,
—X$^f$—CONR$^{4'}$—,
—X$^f$—CONR$^{4'}$—C$_6$H$_4$—,
—CO—,
—CO—C$_6$H$_4$—,
—SO$_2$NR$^{4'}$—,
—SO$_2$NR$^{4'}$—C$_6$H$_4$—
—SO$_2$—, or
—SO$_2$—C$_6$H$_4$— wherein R$^{51'}$ and R$^{52'}$ each independently represent a linear alkylene group having 1 to 6 carbon atoms, preferably 1 to 3 carbon atoms. The alkylene group is substituted or unsubstituted, as described above, and examples of the substituent of the alkylene group can include a halogen atom, preferably a fluorine atom, and R$^{4'}$ is a hydrogen atom or a methyl group.

In particular, X$^{e'}$ can be preferably
—X$^f$—,
an alkylene group having 1 to 6 carbon atoms, preferably 1 to 3 carbon atoms, or
a —X$^f$—C$_{1-6}$ alkylene group, preferably a —X$^f$—C$_{1-3}$ alkylene group, more preferably
a —X$^f$—C$_{1-2}$ alkylene group,
—CONR$^{4'}$—R$^{52'}$—,
—CONR$^{4'}$—C$_6$H$_4$—R$^{52'}$—,
—X$^f$—CONR$^{4'}$—R$^{52'}$—,
—X$^f$—CONR$^{4'}$—C$_6$H$_4$—R$^{52'}$—,
—R$^{51'}$—CONR$^{4'}$—,
—R$^{51'}$—CONR$^{4'}$—C$_6$H$_4$—,
—CONR$^{4'}$—,
—CONR$^{4'}$—C$_6$H$_4$—,
—X$^f$—CONR$^{4'}$—,
—X$^f$—CONR$^{4'}$—C$_6$H$_4$—,
—R$^{51'}$—CONR$^{4'}$—, or
—R$^{51'}$—CONR$^{4'}$—C$_6$H$_4$—. In the formulae, X$^f$, R$^{4'}$, R$^{51'}$ and R$^{52'}$ each have the same meanings as described above.

In particular, X$^{e'}$ can be more preferably
—CONR$^{4'}$—R$^{52'}$—,
—CONR$^{4'}$—C$_6$H$_4$—R$^{52'}$—,
—X$^f$—CONR$^{4'}$—R$^{52'}$—,
—X$^f$—CONR$^{4'}$—C$_6$H$_4$—R$^{52'}$—,
—R$^{51'}$—CONR$^{4'}$—,
—R$^{51'}$—CONR$^{4'}$—C$_6$H$_4$—,
—CONR$^{4'}$—,
—CONR$^{4'}$—C$_6$H$_4$—,
—X$^f$—CONR$^{4'}$—, or
—X$^f$—CONR$^{4'}$—C$_6$H$_4$—.

In the present embodiment, specific examples of X$^{e'}$ include
a single bond,
an alkylene group having 1 to 6 carbon atoms,
a perfluoroalkylene group having 1 to 6 carbon atoms (for example, —CF$_2$—, —(CF$_2$)$_2$—),
—CF$_2$—C$_{1-6}$ alkylene group,
—CONH—,
—CONH—CH$_2$—,
—CONH—(CH$_2$)$_2$—,
—CONH—(CH$_2$)$_3$—,
—CF$_2$—CONH—,
—CF$_2$CONHCH$_2$—,
—CF$_2$CONH(CH$_2$)$_2$—,
—CF$_2$CONH(CH$_2$)$_3$—,
—CON(CH$_3$)—, —CON(CH$_3$)—CH$_2$—,
—CON(CH$_3$)—(CH$_2$)$_2$—,
—CON(CH$_3$)—(CH$_2$)$_3$—,
—CF$_2$—CON(CH$_3$)—,
—CF$_2$—CON(CH$_3$)CH$_2$—,
—CF$_2$—CON(CH$_3$)—(CH$_2$)$_2$—,
—CF$_2$—CON(CH$_3$)—(CH$_2$)$_3$—,
—CH$_2$—CONH—,
—CH$_2$—CONH—CH$_2$—,
—CH$_2$—CONH—(CH$_2$)$_2$—,
—CH$_2$—CONH—(CH$_2$)$_3$—,
—CF$_2$—CH$_2$—CONH—,
—CF$_2$—CH$_2$—CONH—CH$_2$—,
—CF$_2$—CH$_2$—CONH—(CH$_2$)$_2$—,
—CF$_2$—CH$_2$—CONH—(CH$_2$)$_3$—,
—CONH—C$_6$H$_4$—,
—CON(CH$_3$)—C$_6$H$_4$—,
—CH$_2$—CON(CH$_3$)—CH$_2$—,
—CH$_2$—CON(CH$_3$)—(CH$_2$)$_2$—,
—CH$_2$—CON(CH$_3$)—(CH$_2$)$_3$—,
—CON(CH$_3$)—C$_6$H$_4$—,
—CF$_2$—CONH—C$_6$H$_4$—,
—CF$_2$—CON(CH$_3$)—C$_6$H$_4$—,
—CF$_2$—CH$_2$—CON(CH$_3$)—CH$_2$—,
—CF$_2$—CH$_2$—CON(CH$_3$)—(CH$_2$)$_2$—,
—CF$_2$—CH$_2$—CON(CH$_3$)—(CH$_2$)$_3$—,
—CF$_2$—CON(CH$_3$)—C$_6$H$_4$—,
—CO—,
—CO—C$_6$H$_4$—,
—C$_6$H$_4$—,
—SO$_2$NH—,
—SO$_2$NH—CH$_2$—,
—SO$_2$NH—(CH$_2$)$_2$—,
—SO$_2$NH—(CH$_2$)$_3$—,
—SO$_2$NH—C$_6$H$_4$—,
—SO$_2$N(CH$_3$)—,
—SO$_2$N(CH$_3$)—CH$_2$—,
—SO$_2$N(CH$_3$)—(CH$_2$)$_2$—,
—SO$_2$N(CH$_3$)—(CH$_2$)$_3$—,
—SO$_2$N(CH$_3$)—C$_6$H$_4$—,
—SO$_2$—,
—SO$_2$—CH$_2$—,
—SO$_2$—(CH$_2$)$_2$—,
—SO$_2$—(CH$_2$)$_3$—, or
—SO$_2$—C$_6$H$_4$—.

In the above list, examples of preferable $X^{e'}$ include an alkylene group having 1 to 6 carbon atoms, a perfluoroalkylene group having 1 to 6 carbon atoms (for example, —CF$_2$— and —(CF$_2$)$_2$—),
a —CF$_2$—C$_{1-6}$ alkylene group,
—CONH—,
—CONH—CH$_2$—,
—CONH—(CH$_2$)$_2$—,
—CONH—(CH$_2$)$_3$—,
—CF$_2$CONH—,
—CF$_2$CONHCH$_2$—,
—CF$_2$CONH(CH$_2$)$_2$—,
—CF$_2$CONH(CH$_2$)$_3$—,
—CON(CH$_3$)—,
—CON(CH$_3$)—CH$_2$—,
—CON(CH$_3$)—(CH$_2$)$_2$—,
—CON(CH$_3$)—(CH$_2$)$_3$—,
—CF$_2$—CON(CH$_3$)—,
—CF$_2$—CON(CH$_3$)CH$_2$—,
—CF$_2$—CON(CH$_3$)—(CH$_2$)$_2$—,
—CF$_2$—CON(CH$_3$)—(CH$_2$)$_3$—,
—CH$_2$—CONH—,
—CH$_2$—CONH—CH$_2$—,
—CH$_2$—CONH—(CH$_2$)$_2$—,
—CH$_2$—CONH—(CH$_2$)$_3$—,
—CF$_2$—CH$_2$—CONH—,
—CF$_2$—CH$_2$—CONH—CH$_2$—,
—CF$_2$—CH$_2$—CONH—(CH$_2$)$_2$—,
—CF$_2$—CH$_2$—CONH—(CH$_2$)$_3$—,
—CONH—C$_6$H$_4$—,
—CON(CH$_3$)—C$_6$H$_4$—,
—CH$_2$—CON(CH$_3$)—CH$_2$—,
—CH$_2$—CON(CH$_3$)—(CH$_2$)$_2$—,
—CH$_2$—CON(CH$_3$)—(CH$_2$)$_3$—,
—CON(CH$_3$)—C$_6$H$_4$—,
—CF$_2$—CONH—C$_6$H$_4$—,
—CF$_2$—CON(CH$_3$)—C$_6$H$_4$—,
—CF$_2$—CH$_2$—CON(CH$_3$)—CH$_2$—,
—CF$_2$—CH$_2$—CON(CH$_3$)—(CH$_2$)$_2$—,
—CF$_2$—CH$_2$—CON(CH$_3$)—(CH$_2$)$_3$—, and
—CF$_2$—CON(CH$_3$)—C$_6$H$_4$.

In the above list, examples of more preferable $X^{e'}$ include
—CONH—,
—CONH—CH$_2$—,
—CONH—(CH$_2$)$_2$—,
—CONH—(CH$_2$)$_3$—,
—CF$_2$CONH—,
—CF$_2$CONHCH$_2$—,
—CF$_2$CONH(CH$_2$)$_2$—,
—CF$_2$CONH(CH$_2$)$_3$—,
—CON(CH$_3$)—,
—CON(CH$_3$)—CH$_2$—,
—CON(CH$_3$)—(CH$_2$)$_2$—,
—CON(CH$_3$)—(CH$_2$)$_3$—,
—CF$_2$—CON(CH$_3$)—,
—CF$_2$—CON(CH$_3$)CH$_2$—,
—CF$_2$—CON(CH$_3$)—(CH$_2$)$_2$—,
—CF$_2$—CON(CH$_3$)—(CH$_2$)$_3$—,
—CH$_2$—CONH—,
—CH$_2$—CONH—CH$_2$—,
—CH$_2$—CONH—(CH$_2$)$_2$—,
—CH$_2$—CONH—(CH$_2$)$_3$—,
—CF$_2$—CH$_2$—CONH—,
—CF$_2$—CH$_2$—CONH—CH$_2$—,
—CF$_2$—CH$_2$—CONH—(CH$_2$)$_2$—,
—CF$_2$—CH$_2$—CONH—(CH$_2$)$_3$—,
—CONH—C$_6$H$_4$—,
—CON(CH$_3$)—C$_6$H$_4$—,
—CH$_2$—CON(CH$_3$)—CH$_2$—,
—CH$_2$—CON(CH$_3$)—(CH$_2$)$_2$—,
—CH$_2$—CON(CH$_3$)—(CH$_2$)$_3$—,
—CON(CH$_3$)—C$_6$H$_4$—,
—CF$_2$—CONH—C$_6$H$_4$—,
—CF$_2$—CON(CH$_3$)—C$_6$H$_4$—,
—CF$_2$—CH$_2$—CON(CH$_3$)—CH$_2$—,
—CF$_2$—CH$_2$—CON(CH$_3$)—(CH$_2$)$_2$—,
—CF$_2$—CH$_2$—CON(CH$_3$)—(CH$_2$)$_3$—, or —CF$_2$—CON(CH$_3$)—C$_6$H$_4$—.

In one embodiment, $X^{e'}$ is a single bond. In the present embodiment, PFPE and a group having a binding ability to the base material (namely, group in parentheses with α1 in (A)) are directly bonded.

In still another embodiment, $X^1$ is a group represented by formula: —(R$^{16}$)$_x$—(CFR$^{17}$)$_y$—(CH$_2$)$_z$—. In the formula, x, y and z are each independently an integer of 0 to 10, the sum of x, y and z is 1 or more, and the occurrence order of the respective repeating units in parentheses is not limited in the formula.

In the formula, each $R^{16}$, at each occurrence, independently represents an oxygen atom, phenylene, carbazolylene, —$NR^{18}$—, or a divalent organic group, wherein $R^{18}$ represents a hydrogen atom or an organic group. Preferably, $R^{16}$ is an oxygen atom or a divalent polar group.

The "divalent polar group" is not limited, and examples thereof include —C(O)—, —C(=$NR^{19}$)—, and —C(O)$NR^{19}$—, wherein $R^{19}$ represents a hydrogen atom or a lower alkyl group. The "lower alkyl group" is, for example, an alkyl group having 1 to 6 carbon atoms, such as a methyl group, an ethyl group, or a n-propyl group, and such a group is optionally substituted with one or more fluorine atoms.

In the formula, each $R^{17}$, at each occurrence, is independently a hydrogen atom, a fluorine atom or a lower fluoroalkyl group, preferably a fluorine atom. The "lower fluoroalkyl group" is, for example, a fluoroalkyl group having 1 to 6 carbon atoms, preferably 1 to 3 carbon atoms, preferably a perfluoroalkyl group having 1 to 3 carbon atoms, more preferably a trifluoromethyl group or a pentafluoroethyl group, further preferably a trifluoromethyl group.

In this embodiment, $X^1$ is preferably a group represented by formula: —$(O)_x$—$(CF_2)_y$—$(CH_2)_z$—, wherein x, y and z have the same meanings as described above, and the occurrence order of the respective repeating units in parentheses is not limited in the formula.

Examples of the group represented by formula: —$(O)_x$—$(CF_2)_y$—$(CH_2)_z$— include any group represented by —$(O)_{x'}$—$(CH_2)_{z''}$—O—$[(CH_2)_{z'''}$—O—$]_{z''''}$, and —$(O)_{x'}$—$(CF_2)_{y''}$—$(CH_2)_{z''}$—O—$[(CH_2)_{z'''}$—O—$]_{z''''}$, wherein x' is 0 or 1, y", z" and z''' are each independently an integer of 1 to 10, and z'''' is 0 or 1. Herein, a left end of such a group is bonding to PFPE.

In another preferable embodiment, $X^1$ is —O—$CFR^{20}$—$(CF_2)_{e'}$—.

Each $R^{20}$ independently represents a fluorine atom or a lower fluoroalkyl group. The lower fluoroalkyl group is, for example, a fluoroalkyl group having 1 to 3 carbon atoms, preferably a perfluoroalkyl group having 1 to 3 carbon atoms, more preferably a trifluoromethyl group or a pentafluoroethyl group, further preferably a trifluoromethyl group.

Each e' is independently 0 or 1.

In one specific example, $R^{20}$ is a fluorine atom and e' is 1.

In still another embodiment, examples of the $X^1$ group include the following groups:

wherein
each $R^{41}$ independently represents a hydrogen atom, a phenyl group, an alkyl group having 1 to 6 carbon atoms, or a $C_{1-6}$ alkoxy group, preferably a methyl group;
any number of the Ts in each $X^1$ group is the following group bonding to PFPE of a molecular backbone:
—$CH_2O(CH_2)_2$—,
—$CH_2O(CH_2)_3$—,
—$CF_2O(CH_2)_3$—,
—$CH_2$—,
—$(CH_2)_2$—,
—$(CH_2)_3$—,
—$(CH_2)_4$—,
—CONH—$(CH_2)_3$—,
—CON($CH_3$)—$(CH_2)_3$—,
—CON(Ph)-$(CH_2)_3$—, wherein Ph means phenyl, or wherein each $R^{42}$ independently represents a hydrogen atom, a $C_{1-6}$ alkyl group or a $C_{1-6}$ alkoxy group, preferably a methyl group or a methoxy group, more preferably a methyl group, some other of the Ts is —$(CH_2)_{n''}$— ($n''$ is an integer of 2 to 6) bonding to a group opposite to PFPE of a molecular backbone, and the remaining T, if present, can be independently a methyl group, a phenyl group, a $C_{1-6}$ alkoxy group, or a radical scavenging group or an UV absorbing group. Also in the embodiment, a left portion and a right portion of the group designated as $X^1$ are bonding to the group represented by PFPE and the group in parentheses with α1, respectively.

The radical scavenging group is not limited as long as it can scavenge a radial generated by light irradiation, and examples thereof include a residue of benzophenones, benzotriazoles, benzoates, phenyl salicylates, crotonic acids, malonates, organoacrylates, hindered amines, hindered phenols, or triazines.

The UV absorbing group is not limited as long as it can absorb ultraviolet light, and examples thereof include a residue of benzotriazoles, hydroxybenzophenones, esters of substituted and unsubstituted benzoic acid or salicylic acid compounds, acrylates or alkoxy cinnamates, oxamides, oxanilides, benzoxazinones, and benzoxazoles.

In a preferable embodiment, examples of a preferable radical scavenging group or an UV absorbing group include

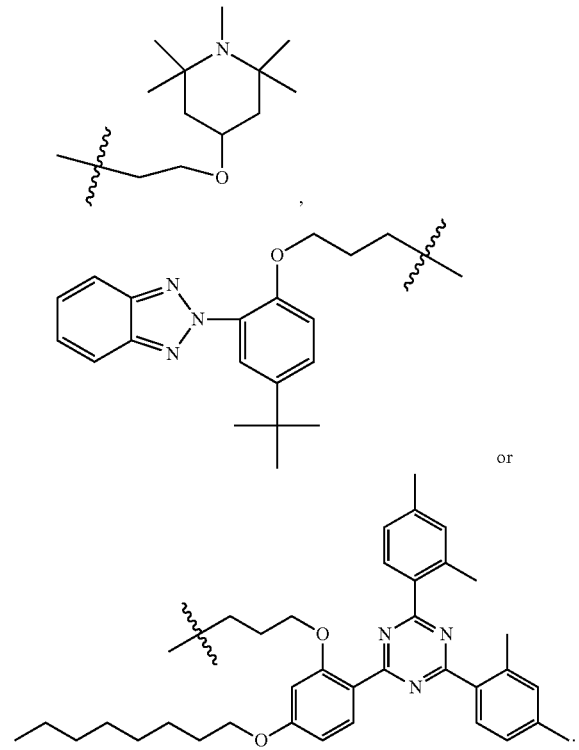

In this embodiment, $X^1$ (and, the following $X^3$, $X^5$ and $X^7$) can be a tri- to decavalent organic group.

In the formulae, each $X^2$, at each occurrence, independently represents a single bond or a divalent organic group. $X^2$ is preferably an alkylene group having 1 to 20 carbon atoms, more preferably —$(CH_2)_u$—, wherein u is an integer of 0 to 2.

In the formulae, each t is independently an integer of 1 to 10. In a preferable embodiment, t is an integer of 1 to 6. In another preferable embodiment, t is an integer of 2 to 10, preferably an integer of 2 to 6.

A preferable compound represented by formula (A) is a compound represented by the following formula (A'):

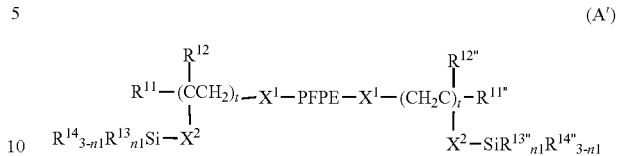

wherein:
each PFPE, at each occurrence, is independently a group represented by formula:

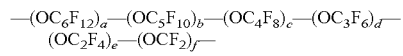

wherein a, b, c, d, e and f are each independently an integer of 0 or more and 200 or less, the sum of a, b, c, d, e and f is at least 1, and the occurrence order of the respective repeating units in parentheses with a, b, c, d, e or f is not limited in the formula;

each $R^{13}$, at each occurrence, independently represents a hydroxyl group or a hydrolyzable group;

each $R^{14}$, at each occurrence, independently represents a hydrogen atom or an alkyl group having 1 to 22 carbon atoms;

each $R^{11}$, at each occurrence, independently represents a hydrogen atom or a halogen atom;

each $R^{12}$, at each occurrence, independently represents a hydrogen atom or a lower alkyl group;

$R^{11''}$, $R^{12''}$, $R^{13''}$, $R^{14''}$ have the same meanings as $R^{11}$, $R^{12}$, $R^{13}$, $R^{14}$, respectively;

n1 is an integer of 1 to 3, preferably 3;

each $X^1$, at each occurrence, is independently —O—$CFR^{20}$—$(CF_2)_{e'}$—;

each $R^{20}$, at each occurrence, is independently a fluorine atom or a lower fluoroalkyl group;

each e', at each occurrence, is independently 0 or 1;

$X^2$ is —$(CH_2)_u$—;

each u, at each occurrence, is independently an integer of 0 to 2; and each t, at each occurrence, is independently an integer of 2 to 10.

Such any compound represented by formula (A) can be obtained by, for example, introducing iodine into an end of a perfluoropolyether derivative corresponding to a -PFPE- moiety, as a raw material, and reacting a vinyl monomer corresponding to —$CH_2CR^{12}(X^2-SiR^{13}_{n1}R^{14}_{3-n1})$—.

Formula (B):

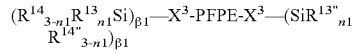

(B)

In formula (B), PFPE, $R^{13}$, $R^{13''}$, $R^{14}$, $R^{14''}$ and n1 have the same meanings as described with respect to the formula (A).

In formula (B), such a Si atom bonding to at least one group selected from the group consisting of a hydroxyl group and a hydrolyzable group indicates a Si atom contained in (—$SiR^{13}_{n1}R^{14}_{3-n1}$) or (—$SiR^{13''}_{n1}R^{14''}_{3-n1}$) where n1 is an integer of 1 to 3.

In the formulae, n1 with respect to each (—$SiR^{13}_{n1}R^{14}_{3-n1}$) unit or each (—$SiR^{13''}_{n1}R^{14''}_{3-n1}$) unit is independently an integer of 0 to 3, preferably 1 to 3, more preferably 3. In the formulae, at least two n1(s) are each an integer of 1 to 3, namely, there is not any case where all n1(s) are simultaneously 0. That is, at least two of $R^{13}$ and $R^{13"}$ are present in the formulae. That is, at least two structures selected from the group consisting of a $-SiR^{13}{}_{n1}R^{14}{}_{3-n1}$ structure (namely, $-SiR^{13}$ moiety) where n1 is 1 or more and a $-SiR^{13"}{}_{n1}R^{14"}{}_{3-n1}$ structure (namely, $-SiR^{13"}$ moiety) where n1 is 1 or more are present in formula (B).

More preferably, at least one Si bonding to the hydroxyl group or the hydrolyzable group is present at each of both ends of a molecular backbone of the PFPE-containing silane compound (A), in formula (B). That is, at least one $-SiR^{13}$ moiety is present, and at least one $-SiR^{13"}$ moiety is present.

In the formulae, each $X^3$ independently represents a single bond or a di- to decavalent organic group. $X^3$ is understood to be a linker which links a perfluoropolyether moiety (namely, -PFPE- moiety) mainly providing water-repellency, surface lubricity, and the like, and a silane moiety (specifically, $-SiR^{13}{}_{n1}R^{14}{}_{3-n1}$ or $-SiR^{13"}{}_{n1}R^{14"}{}_{3-n1}$) providing a binding ability to the base material, in any compound represented by formula (B). Accordingly, $X^3$ may be a single bond or any organic group as long as such any compound represented by formula (B) can be stably present. Herein, a left portion and a right portion of the structure designated as $X^3$ are bonding to the group represented by PFPE and the group in parentheses with β1, respectively.

In another embodiment, $X^3$ represents $X^e$. $X^e$ has the same meaning as described above.

In the formulae, β1 is an integer of 1 to 9, and may be varied depending on the valence of $X^3$. In formula (B), β1 corresponds to a value obtained by subtracting 1 from the value of the valence of $X^3$. In the case where $X^3$ is a single bond, β1 is 1.

$X^3$ is preferably a di- to heptavalent, more preferably di- to tetravalent, further preferably divalent organic group.

In one embodiment, $X^3$ is a di- to tetravalent organic group, and β1 is 1 to 3.

In another embodiment, $X^3$ is a divalent organic group, and β1 is 1. In such a case, formula (B) is represented by the following formula (B').

$$R^{14}{}_{3-n1}R^{13}{}_{n1}Si-X^3\text{-PFPE-}X^3-SiR^{13"}{}_{n1}R^{14"}{}_{3-n1} \quad (B')$$

Examples of $X^3$ are not limited, and include the same as described with respect to $X^1$.

In particular, preferable specific examples of $X^3$ include a single bond,
—$CH_2OCH_2$—,
—$CH_2O(CH_2)_2$—,
—$CH_2O(CH_2)_3$—,
—$CH_2O(CH_2)_6$—,
—$CF_2$—$CH_2$—O—$CH_2$—,
—$CF_2$—$CH_2$—O—$(CH_2)_2$—,
—$CF_2$—$CH_2$—O—$(CH_2)_3$—,
—$CF_2$—$CH_2$—O—$(CH_2)_6$—,
—$CH_2O(CH_2)_3Si(CH_3)_2OSi(CH_3)_2(CH_2)_2$—,
—$CH_2O(CH_2)_3Si(CH_3)_2OSi(CH_3)_2OSi(CH_3)_2(CH_2)_2$—,
—$CH_2O(CH_2)_3Si(CH_3)_2O(Si(CH_3)_2O)_2Si(CH_3)_2(CH_2)_2$—,
—$CH_2O(CH_2)_3Si(CH_3)_2O(Si(CH_3)_2O)_3Si(CH_3)_2(CH_2)_2$—,
—$CH_2O(CH_2)_3Si(CH_3)_2O(Si(CH_3)_2O)_{10}Si(CH_3)_2(CH_2)_2$—,
—$CH_2O(CH_2)_3Si(CH_3)_2O(Si(CH_3)_2O)_2OSi(CH_3)_2(CH_2)_2$—,
—$CH_2OCF_2CHFOCF_2$—,
—$CH_2OCF_2CHFOCF_2CF_2$—,
—$CH_2OCF_2CHFOCF_2CF_2CF_2$—,
—$CH_2OCH_2CF_2CF_2OCF_2$—,
—$CH_2OCH_2CF_2CF_2OCF_2CF_2$—,
—$CH_2OCH_2CF_2CF_2OCF_2CF_2CF_2$—,
—$CH_2OCH_2CF_2CF_2OCF(CF_3)CF_2OCF_2$—,
—$CH_2OCH_2CF_2CF_2OCF(CF_3)CF_2OCF_2CF_2$—,
—$CH_2OCH_2CF_2CF_2OCF(CF_3)CF_2OCF_2CF_2CF_2$—,
—$CH_2OCH_2CHFCF_2OCF_2$—,
—$CH_2OCH_2CHFCF_2OCF_2CF_2$—,
—$CH_2OCH_2CHFCF_2OCF_2CF_2CF_2$—,
—$CH_2OCH_2CHFCF_2OCF(CF_3)CF_2OCF_2$—,
—$CH_2OCH_2CHFCF_2OCF(CF_3)CF_2OCF_2CF_2$—,
—$CH_2OCH_2CHFCF_2OCF(CF_3)CF_2OCF_2CF_2CF_2$—,
—$CH_2OCF_2CHFOCF_2CF_2CF_2$—C(O)NH—$CH_2$—,
—$CH_2OCH_2(CH_2)_7CH_2Si(OCH_3)_2OSi(OCH_3)_2(CH_2)_2Si(OCH_3)_2OSi(OCH_3)_2(CH_2)_2$—,
—$CH_2OCH_2CH_2CH_2Si(OCH_3)_2OSi(OCH_3)_2(CH_2)_3$—,
—$CH_2OCH_2CH_2CH_2Si(OCH_2CH_3)_2OSi(OCH_2CH_3)_2(CH_2)_3$—,
—$CH_2OCH_2CH_2CH_2Si(OCH_3)_2OSi(OCH_3)_2(CH_2)_2$—,
—$CH_2OCH_2CH_2CH_2Si(OCH_2CH_3)_2OSi(OCH_2CH_3)_2(CH_2)_2$—,
—$(CH_2)_2$—$Si(CH_3)_2$—$(CH_2)_2$—,
—$CH_2$—,
—$(CH_2)_2$—,
—$(CH_2)_3$—,
—$(CH_2)_4$—,
—$(CH_2)_5$—,
—$(CH_2)_6$—,
—$CF_2$—, —$(CF_2)_2$—,
—$CF_2$—$CH_2$—,
—$CF_2$—$(CH_2)_2$—,
—$CF_2$—$(CH_2)_3$—,
—$CF_2$—$(CH_2)_4$—,
—$CF_2$—$(CH_2)_5$—,
—$CF_2$—$(CH_2)_6$—,
—CO—,
—CONH—,
—CONH—$CH_2$—,
—CONH—$(CH_2)_2$—,
—CONH—$(CH_2)_3$—,
—CONH—$(CH_2)_6$—,
—$CF_2CONH$—,
—$CF_2CONHCH_2$—,
—$CF_2CONH(CH_2)_2$—,
—$CF_2CONH(CH_2)_3$—,
—$CF_2CONH(CH_2)_6$—,
—$CON(CH_3)$—$(CH_2)_3$—,
—$CON(Ph)$-$(CH_2)_3$—, wherein Ph means phenyl,
—$CON(CH_3)$—$(CH_2)_6$—,
—$CON(Ph)$-$(CH_2)_6$—, wherein Ph means phenyl,
—$CF_2$—$CON(CH_3)$—$(CH_2)_3$—,
—$CF_2$—$CON(Ph)$-$(CH_2)_3$—, wherein Ph means phenyl,
—$CF_2$—$CON(CH_3)$—$(CH_2)_6$—,
—$CF_2$—$CON(Ph)$-$(CH_2)_6$—, wherein Ph means phenyl,
—CONH—$(CH_2)_2NH(CH_2)_3$—,
—CONH—$(CH_2)_6NH(CH_2)_3$—,
—$CH_2O$—CONH—$(CH_2)_3$—,
—$CH_2O$—CONH—$(CH_2)_6$—,
—S—$(CH_2)_3$—,
—$(CH_2)_2S(CH_2)_3$—,
—CONH—$(CH_2)_3Si(CH_3)_2OSi(CH_3)_2(CH_2)_2$—,
—CONH—$(CH_2)_3Si(CH_3)_2OSi(CH_3)_2OSi(CH_3)_2(CH_2)_2$—,
—CONH—$(CH_2)_3Si(CH_3)_2O(Si(CH_3)_2O)_2Si(CH_3)_2(CH_2)_2$—,
—CONH—$(CH_2)_3Si(CH_3)_2O(Si(CH_3)_2O)_3Si(CH_3)_2(CH_2)_2$—, —CONH—(CH$_2$)$_3$Si(CH$_3$)$_2$O(Si(CH$_3$)$_2$O)$_{10}$Si(CH$_3$)$_2$(CH$_2$)$_2$—,
—CONH—(CH$_2$)$_3$Si(CH$_3$)$_2$O(Si(CH$_3$)$_2$O)$_2$OSi(CH$_3$)$_2$(CH$_2$)$_2$—,
—C(O)O—(CH$_2$)$_3$—,
—C(O)O—(CH$_2$)$_6$—,
—CH$_2$—O—(CH$_2$)$_3$—Si(CH$_3$)$_2$—(CH$_2$)$_2$—Si(CH$_3$)$_2$—(CH$_2$)$_2$—,
—CH$_2$—O—(CH$_2$)$_3$—Si(CH$_3$)$_2$—(CH$_2$)$_2$—Si(CH$_3$)$_2$—CH(CH$_3$)—,
—CH$_2$—O—(CH$_2$)$_3$—Si(CH$_3$)$_2$—(CH$_2$)$_2$—Si(CH$_3$)$_2$—(CH$_2$)$_3$—,
—CH$_2$—O—(CH$_2$)$_3$—Si(CH$_3$)$_2$—(CH$_2$)$_2$—Si(CH$_3$)$_2$—CH(CH$_3$)—CH$_2$—,
—OCH$_2$—,
—O(CH$_2$)$_3$—, and
—OCFHCF$_2$—

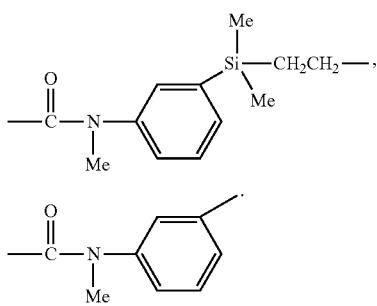

In particular, X$^3$ is preferably
—CH$_2$OCH$_2$—,
—CH$_2$O(CH$_2$)$_2$,
—CH$_2$O(CH$_2$)$_3$—,
—CH$_2$O(CH$_2$)$_6$—,
—CF$_2$—CH$_2$—O—CH$_2$—,
—CF$_2$—CH$_2$—O—(CH$_2$)$_2$—,
—CF$_2$—CH$_2$—O—(CH$_2$)$_3$—,
—CF$_2$—CH$_2$—O—(CH$_2$)$_6$—,
—CH$_2$OCF$_2$CHFOCF$_2$—,
—CH$_2$OCF$_2$CHFOCF$_2$CF$_2$—,
—CH$_2$OCF$_2$CHFOCF$_2$CF$_2$CF$_2$—,
—CH$_2$OCH$_2$CF$_2$CF$_2$OCF$_2$—,
—CH$_2$OCH$_2$CF$_2$CF$_2$OCF$_2$CF$_2$—,
—CH$_2$OCH$_2$CF$_2$CF$_2$OCF$_2$CF$_2$CF$_2$—,
—CH$_2$OCH$_2$CF$_2$CF$_2$OCF(CF$_3$)CF$_2$OCF$_2$—,
—CH$_2$OCH$_2$CF$_2$CF$_2$OCF(CF$_3$)CF$_2$OCF$_2$CF$_2$—,
—CH$_2$OCH$_2$CF$_2$CF$_2$OCF(CF$_3$)CF$_2$OCF$_2$CF$_2$CF$_2$—,
—CH$_2$OCH$_2$CHFCF$_2$OCF$_2$—,
—CH$_2$OCH$_2$CHFCF$_2$OCF$_2$CF$_2$—,
—CH$_2$OCH$_2$CHFCF$_2$OCF$_2$CF$_2$CF$_2$—,
—CH$_2$OCH$_2$CHFCF$_2$OCF(CF$_3$)CF$_2$OCF$_2$—,
—CH$_2$OCH$_2$CHFCF$_2$OCF(CF$_3$)CF$_2$OCF$_2$CF$_2$—,
—CH$_2$OCH$_2$CHFCF$_2$OCF(CF$_3$)CF$_2$OCF$_2$CF$_2$CF$_2$—,
—CH$_2$OCF$_2$CHFOCF$_2$CF$_2$CF$_2$—C(O)NH—CH$_2$—,
—CF$_2$—CH$_2$OCF$_2$CHFOCF$_2$CF$_2$CF$_2$—C(O)NH—CH$_2$—,
—CH$_2$—,
—(CH$_2$)$_2$—,
—(CH$_2$)$_3$—,
—(CH$_2$)$_4$—,
—(CH$_2$)$_5$—,
—(CH$_2$)$_6$—,
—CF$_2$—, —(CF$_2$)$_2$—,
—CF$_2$—CH$_2$—,
—CF$_2$—(CH$_2$)$_2$—,
—CF$_2$—(CH$_2$)$_3$—,
—CF$_2$—(CH$_2$)$_4$—,
—CF$_2$—(CH$_2$)$_5$—,
—CF$_2$—(CH$_2$)$_6$—,
—CONH—,
—CONH—CH$_2$—,
—CONH—(CH$_2$)$_2$—,
—CONH—(CH$_2$)$_3$—,
—CONH—(CH$_2$)$_6$—,
—CF$_2$CONH—,
—CF$_2$CONHCH$_2$—,
—CF$_2$CONH(CH$_2$)$_2$—,
—CF$_2$CONH(CH$_2$)$_3$—,
—CF$_2$CONH(CH$_2$)$_6$—,
—CON(CH$_3$)—(CH$_2$)$_3$—,
—CON(Ph)-(CH$_2$)$_3$—, wherein Ph means phenyl,
—CON(CH$_3$)—(CH$_2$)$_6$—,
—CON(Ph)-(CH$_2$)$_6$—, wherein Ph means phenyl,
—CF$_2$—CON(CH$_3$)—(CH$_2$)$_3$—,
—CF$_2$—CON(Ph)-(CH$_2$)$_3$—, wherein Ph means phenyl,
—CF$_2$—CON(CH$_3$)—(CH$_2$)$_6$—,
—CF$_2$—CON(Ph)-(CH$_2$)$_6$—, wherein Ph means phenyl,
—CONH—(CH$_2$)$_2$NH(CH$_2$)$_3$—,
—CONH—(CH$_2$)$_6$NH(CH$_2$)$_3$—,
—CH$_2$O—CONH—(CH$_2$)$_3$—,
—CH$_2$O—CONH—(CH$_2$)$_6$—,
—OCH$_2$—,
—O(CH$_2$)$_3$—,
—OCFHCF$_2$—.

In particular, X$^3$ is more preferably
—CH$_2$OCF$_2$CHFOCF$_2$CF$_2$CF$_2$—C(O)NH—CH$_2$—,
—CF$_2$—CH$_2$OCF$_2$CHFOCF$_2$CF$_2$CF$_2$—C(O)NH—CH$_2$—,
—CONH—,
—CONH—CH$_2$—,
—CONH—(CH$_2$)$_2$—,
—CONH—(CH$_2$)$_3$—,
—CONH—(CH$_2$)$_6$—,
—CF$_2$CONH—,
—CF$_2$CONHCH$_2$—,
—CF$_2$CONH(CH$_2$)$_2$—,
—CF$_2$CONH(CH$_2$)$_3$—,
—CF$_2$CONH(CH$_2$)$_6$—,
—CON(CH$_3$)—(CH$_2$)$_3$—,
—CON(Ph)-(CH$_2$)$_3$—, wherein Ph means phenyl,
—CON(CH$_3$)—(CH$_2$)$_6$—,
—CON(Ph)-(CH$_2$)$_6$—, wherein Ph means phenyl,
—CF$_2$—CON(CH$_3$)—(CH$_2$)$_3$—,
—CF$_2$—CON(Ph)-(CH$_2$)$_3$—, wherein Ph means phenyl,
—CF$_2$—CON(CH$_3$)—(CH$_2$)$_6$—,
—CF$_2$—CON(Ph)-(CH$_2$)$_6$—, wherein Ph means phenyl,
—CONH—(CH$_2$)$_2$NH(CH$_2$)$_3$—,
—CONH—(CH$_2$)$_6$NH(CH$_2$)$_3$.

In another preferable embodiment, X$^3$ represents X$^{e'}$. X$^{e'}$ has the same meaning as described above.

In one embodiment, X$^{e'}$ is a single bond. In the present embodiment, PEPE and a group having a binding ability to the base material (namely, group in parentheses with β1 in (B)) are directly bonded.

In one embodiment, at least two Si each bonding to the hydroxyl group or the hydrolyzable group are present in formula (B). That is, at least two SiR$^{13}$ moieties are present in formula (B).

A preferable compound represented by formula (B) is a compound represented by the following formula (B'):

$$R^{14}_{3-n1}Si-X^3\text{-PFPE-}X^3-SiR^{13"}_{n1}R^{14"}_{3-n1} \quad (B')$$

wherein:
each PFPE, at each occurrence, is independently a group represented by formula:

$$-(OC_6F_{12})_a-(OC_5F_{10})_b-(OC_4F_8)_c-(OC_3F_6)_d-$$
$$(OC_2F_4)_e-(OCF_2)_f-$$

wherein a, b, c, d, e and f are each independently an integer of 0 or more and 200 or less, the sum of a, b, c, d, e and f is at least 1, and the occurrence order of the respective repeating units in parentheses with a, b, c, d, e or f is not limited in the formula;
each $R^{13}$, at each occurrence, independently represents a hydroxyl group or a hydrolyzable group;
each $R^{14}$, at each occurrence, independently represents a hydrogen atom or an alkyl group having 1 to 22 carbon atoms;
$R^{13"}$ and $R^{14"}$ have the same meanings as $R^{13}$ and $R^{14}$, respectively;
n1 is an integer of 1 to 3, preferably 3; and
$X^3$ is $-CH_2O(CH_2)_2-$, $-CH_2O(CH_2)_3-$ or $-CH_2O(CH_2)_6-$.

Such any compound represented by formula (B) can be produced by a known method, for example, a method described in JP 2013-117012 A, or an improved method thereof.

Formula (C):

$$(R^c_{m1}R^b_{l1}R^a_{k1}Si)_{\gamma 1}-X^5\text{-PFPE-}X^5-$$
$$(SiR^{a"}_{k1}R^{b"}_{l1}R^{c"}_{m1})_{\gamma 1} \quad (C)$$

In formula (C), PFPE has the same meaning as described above.

In the formula, each $X^5$ independently represents a single bond or a di- to decavalent organic group. $X^5$ is understood to be a linker which links a perfluoropolyether moiety (namely, -PFPE- moiety) mainly providing water-repellency, surface lubricity, and the like, and a silane moiety (specifically, $-SiR^a_{k1}R^b_{l1}R^c_{m1}$ group or $-SiR^{a"}_{k1}R^{b"}_{l1}R^{c"}_{m1}$ group) providing a binding ability to the base material, in any compound represented by formula (C). Accordingly, $X^5$ may be a single bond or any organic group as long as such any compound represented by formula (C) can be stably present. Herein, a left portion and a right portion of the structure designated as $X^5$ are bonding to the group represented by PFPE and the group in parentheses with γ1, respectively.

In another embodiment, $X^5$ represents $X^e$. $X^e$ has the same meaning as described above.

In the formula, γ1 is an integer of 1 to 9, and γ1 may be varied depending on the valence of $X^5$. In formula (C), γ1 corresponds to a value obtained by subtracting 1 from the value of the valence of $X^5$. In the case where $X^5$ is a single bond, γ1 is 1.

$X^5$ is preferably a di- to heptavalent, more preferably di- to tetravalent, further preferably divalent organic group.

In one embodiment, $X^5$ is a di- to tetravalent organic group, and γ1 is 1 to 3.

In another embodiment, $X^5$ is a divalent organic group, and γ1 is 1. In such a case, formula (C) is represented by the following formula (C').

$$R^c_{m1}R^b_{l1}R^a_{k1}Si-X^5\text{-PFPE-}X^5-SiR^{a"}_{k1}R^{b"}_{l1}R^{c"}_{m1} \quad (C')$$

Examples of $X^5$ are not limited, and include the same as described with respect to $X^1$.

In particular, preferable specific examples of $X^5$ include a single bond,
—$CH_2OCH_2$—,
—$CH_2O(CH_2)_2$—,
—$CH_2O(CH_2)_3$—,
—$CH_2O(CH_2)_6$—,
—$CF_2$—$CH_2$—O—$CH_2$—,
—$CF_2$—$CH_2$—O—$(CH_2)_2$—,
—$CF_2$—$CH_2$—O—$(CH_2)_3$—,
—$CF_2$—$CH_2$—O—$(CH_2)_6$—,
—$CH_2O(CH_2)_3Si(CH_3)_2OSi(CH_3)_2(CH_2)_2$—,
—$CH_2O(CH_2)_3Si(CH_3)_2OSi(CH_3)_2OSi(CH_3)_2(CH_2)_2$—,
—$CH_2O(CH_2)_3Si(CH_3)_2O(Si(CH_3)_2O)_2Si(CH_3)_2(CH_2)_2$—,
—$CH_2O(CH_2)_3Si(CH_3)_2O(Si(CH_3)_2O)_3Si(CH_3)_2(CH_2)_2$—,
—$CH_2O(CH_2)_3Si(CH_3)_2O(Si(CH_3)_2O)_{10}Si(CH_3)_2(CH_2)_2$—,
—$CH_2O(CH_2)_3Si(CH_3)_2O(Si(CH_3)_2O)_2OSi(CH_3)_2(CH_2)_2$—,
—$CH_2OCF_2CHFOCF_2$—,
—$CH_2OCF_2CHFOCF_2CF_2$—,
—$CH_2OCF_2CHFOCF_2CF_2CF_2$—,
—$CH_2OCH_2CF_2CF_2OCF_2$—,
—$CH_2OCH_2CF_2CF_2OCF_2CF_2$—,
—$CH_2OCH_2CF_2CF_2OCF_2CF_2CF_2$—,
—$CH_2OCH_2CF_2CF_2OCF(CF_3)CF_2OCF_2$—,
—$CH_2OCH_2CF_2CF_2OCF(CF_3)CF_2OCF_2CF_2$—,
—$CH_2OCH_2CF_2CF_2OCF(CF_3)CF_2OCF_2CF_2CF_2$—,
—$CH_2OCH_2CHFCF_2OCF_2$—,
—$CH_2OCH_2CHFCF_2OCF_2CF_2$—,
—$CH_2OCH_2CHFCF_2OCF_2CF_2CF_2$—,
—$CH_2OCH_2CHFCF_2OCF(CF_3)CF_2OCF_2$—,
—$CH_2OCH_2CHFCF_2OCF(CF_3)CF_2OCF_2CF_2$—,
—$CH_2OCH_2CHFCF_2OCF(CF_3)CF_2OCF_2CF_2CF_2$—,
—$CH_2OCF_2CHFOCF_2CF_2CF_2$—C(O)NH—$CH_2$—,
—$CH_2OCH_2(CH_2)_7CH_2Si(OCH_3)_2OSi(OCH_3)_2(CH_2)_2Si(OCH_3)_2OSi(OCH_3)_2(CH_2)_2$—,
—$CH_2OCH_2CH_2CH_2Si(OCH_3)_2OSi(OCH_3)_2(CH_2)_3$—,
—$CH_2OCH_2CH_2CH_2Si(OCH_2CH_3)_2OSi(OCH_2CH_3)_2(CH_2)_3$—,
—$CH_2OCH_2CH_2CH_2Si(OCH_3)_2OSi(OCH_3)_2(CH_2)_2$—,
—$CH_2OCH_2CH_2CH_2Si(OCH_2CH_3)_2OSi(OCH_2CH_3)_2(CH_2)_2$—,
$(CH_2)_2$—Si(CH_3)_2—(CH_2)_2—,
—$CH_2$—,
—$(CH_2)_2$—,
—$(CH_2)_3$—,
—$(CH_2)_4$—,
—$(CH_2)_5$—,
—$(CH_2)_6$—,
—$CF_2$—, —$(CF_2)_2$—,
—$CF_2$—$CH_2$—,
—$CF_2$—$(CH_2)_2$—,
—$CF_2$—$(CH_2)_3$—,
—$CF_2$—$(CH_2)_4$—,
—$CF_2$—$(CH_2)_5$—,
—$CF_2$—$(CH_2)_6$—,
—CO—,
—CONH—,
—CONH—$CH_2$—,
—CONH—$(CH_2)_2$—,
—CONH—$(CH_2)_3$—,
—CONH—$(CH_2)_6$—,
—$CF_2$CONH—,
—$CF_2$CONHCH_2—,
—$CF_2$CONH(CH_2)_2—, —CF$_2$CONH(CH$_2$)$_3$—,
—CF$_2$CONH(CH$_2$)$_6$—,
—CON(CH$_3$)—(CH$_2$)$_3$—,
—CON(Ph)-(CH$_2$)$_3$—, wherein Ph means phenyl,
—CON(CH$_3$)—(CH$_2$)$_6$—,
—CON(Ph)-(CH$_2$)$_6$—, wherein Ph means phenyl,
—CF$_2$—CON(CH$_3$)—(CH$_2$)$_3$—,
—CF$_2$—CON(Ph)-(CH$_2$)$_3$—, wherein Ph means phenyl,
—CF$_2$—CON(CH$_3$)—(CH$_2$)$_6$—,
—CF$_2$—CON(Ph)-(CH$_2$)$_6$—, wherein Ph means phenyl,
—CONH—(CH$_2$)$_2$NH(CH$_2$)$_3$—,
—CONH—(CH$_2$)$_6$NH(CH$_2$)$_3$—,
—CH$_2$O—CONH—(CH$_2$)$_3$—,
—CH$_2$O—CONH—(CH$_2$)$_6$—,
—S—(CH$_2$)$_3$—,
—(CH$_2$)$_2$S(CH$_2$)$_3$—,
—CONH—(CH$_2$)$_3$Si(CH$_3$)$_2$OSi(CH$_3$)$_2$(CH$_2$)$_2$—,
—CONH—(CH$_2$)$_3$Si(CH$_3$)$_2$OSi(CH$_3$)$_2$OSi(CH$_3$)$_2$(CH$_2$)$_2$—,
—CONH—(CH$_2$)$_3$Si(CH$_3$)$_2$O(Si(CH$_3$)$_2$O)$_2$Si(CH$_3$)$_2$(CH$_2$)$_2$—,
—CONH—(CH$_2$)$_3$Si(CH$_3$)$_2$O(Si(CH$_3$)$_2$O)$_3$Si(CH$_3$)$_2$(CH$_2$)$_2$—,
—CONH—(CH$_2$)$_3$Si(CH$_3$)$_2$O(Si(CH$_3$)$_2$O)$_{10}$Si(CH$_3$)$_2$(CH$_2$)$_2$—,
—CONH—(CH$_2$)$_3$Si(CH$_3$)$_2$O(Si(CH$_3$)$_2$O)$_2$OSi(CH$_3$)$_2$(CH$_2$)$_2$—,
—C(O)O—(CH$_2$)$_3$—,
—C(O)O—(CH$_2$)$_6$—,
—CH$_2$—O—(CH$_2$)$_3$—Si(CH$_3$)$_2$—(CH$_2$)$_2$—Si(CH$_3$)$_2$—(CH$_2$)$_2$—,
—CH$_2$—O—(CH$_2$)$_3$—Si(CH$_3$)$_2$—(CH$_2$)$_2$—Si(CH$_3$)$_2$—CH(CH$_3$)—,
—CH$_2$—O—(CH$_2$)$_3$—Si(CH$_3$)$_2$—(CH$_2$)$_2$—Si(CH$_3$)$_2$—(CH$_2$)$_3$—,
—CH$_2$—O—(CH$_2$)$_3$—Si(CH$_3$)$_2$—(CH$_2$)$_2$—Si(CH$_3$)$_2$—CH(CH$_3$)—CH$_2$—,
—OCH$_2$—,
—O(CH$_2$)$_3$—, and
—OCFHCF$_2$—

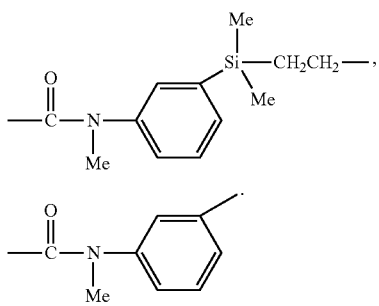

In particular, $X^5$ is preferably
—CH$_2$OCH$_2$—,
—CH$_2$O(CH$_2$)$_2$—,
—CH$_2$O(CH$_2$)$_3$—,
—CH$_2$O(CH$_2$)$_6$—,
—CF$_2$—CH$_2$—O—CH$_2$—,
—CF$_2$—CH$_2$—O—(CH$_2$)$_2$—,
—CF$_2$—CH$_2$—O—(CH$_2$)$_3$—,
—CF$_2$—CH$_2$—O—(CH$_2$)$_6$—,
—CH$_2$OCF$_2$CHFOCF$_2$—,
—CH$_2$OCF$_2$CHFOCF$_2$CF$_2$—,
—CH$_2$OCF$_2$CHFOCF$_2$CF$_2$CF$_2$—,
—CH$_2$OCH$_2$CF$_2$CF$_2$OCF$_2$—,
—CH$_2$OCH$_2$CF$_2$CF$_2$OCF$_2$CF$_2$—,
—CH$_2$OCH$_2$CF$_2$CF$_2$OCF$_2$CF$_2$CF$_2$—,
—CH$_2$OCH$_2$CF$_2$CF$_2$OCF(CF$_3$)CF$_2$OCF$_2$—,
—CH$_2$OCH$_2$CF$_2$CF$_2$OCF(CF$_3$)CF$_2$OCF$_2$CF$_2$—,
—CH$_2$OCH$_2$CF$_2$CF$_2$OCF(CF$_3$)CF$_2$OCF$_2$CF$_2$CF$_2$—,
—CH$_2$OCH$_2$CHFCF$_2$OCF$_2$—,
—CH$_2$OCH$_2$CHFCF$_2$OCF$_2$CF$_2$—,
—CH$_2$OCH$_2$CHFCF$_2$OCF$_2$CF$_2$CF$_2$—,
—CH$_2$OCH$_2$CHFCF$_2$OCF(CF$_3$)CF$_2$OCF$_2$—,
—CH$_2$OCH$_2$CHFCF$_2$OCF(CF$_3$)CF$_2$OCF$_2$CF$_2$—,
—CH$_2$OCH$_2$CHFCF$_2$OCF(CF$_3$)CF$_2$OCF$_2$CF$_2$CF$_2$—,
—CH$_2$OCF$_2$CHFOCF$_2$CF$_2$CF$_2$—C(O)NH—CH$_2$—,
—CF$_2$—CH$_2$OCF$_2$CHFOCF$_2$CF$_2$CF$_2$—C(O)NH—CH$_2$—,
—CH$_2$—,
—(CH$_2$)$_2$—,
—(CH$_2$)$_3$—,
—(CH$_2$)$_4$—,
—(CH$_2$)$_5$—,
—(CH$_2$)$_6$—,
—CF$_2$—,
—(CF$_2$)$_2$—,
—CF$_2$—CH$_2$—,
—CF$_2$—(CH$_2$)$_2$—,
—CF$_2$—(CH$_2$)$_3$—,
—CF$_2$—(CH$_2$)$_4$—,
—CF$_2$—(CH$_2$)$_5$—,
—CF$_2$—(CH$_2$)$_6$—,
—CONH—,
—CONH—CH$_2$—,
—CONH—(CH$_2$)$_2$—,
—CONH—(CH$_2$)$_3$—,
—CONH—(CH$_2$)$_6$—,
—CF$_2$CONH—,
—CF$_2$CONHCH$_2$—,
—CF$_2$CONH(CH$_2$)$_2$—,
—CF$_2$CONH(CH$_2$)$_3$—,
—CF$_2$CONH(CH$_2$)$_6$—,
—CON(CH$_3$)—(CH$_2$)$_3$—,
—CON(Ph)-(CH$_2$)$_3$—, wherein Ph means phenyl,
—CON(CH$_3$)—(CH$_2$)$_6$—,
—CON(Ph)-(CH$_2$)$_6$—, wherein Ph means phenyl,
—CF$_2$—CON(CH$_3$)—(CH$_2$)$_3$—,
—CF$_2$—CON(Ph)-(CH$_2$)$_3$—, wherein Ph means phenyl,
—CF$_2$—CON(CH$_3$)—(CH$_2$)$_6$—,
—CF$_2$—CON(Ph)-(CH$_2$)$_6$—, wherein Ph means phenyl,
—CONH—(CH$_2$)$_2$NH(CH$_2$)$_3$—,
—CONH—(CH$_2$)$_6$NH(CH$_2$)$_3$—,
—CH$_2$O—CONH—(CH$_2$)$_3$—,
—CH$_2$O—CONH—(CH$_2$)$_6$—,
—OCH$_2$—,
—O(CH$_2$)$_3$—,
—OCFHCF$_2$—.

In particular, $X^5$ is more preferably
—CH$_2$OCF$_2$CHFOCF$_2$CF$_2$CF$_2$—C(O)NH—CH$_2$—,
—CF$_2$—CH$_2$OCF$_2$CHFOCF$_2$CF$_2$CF$_2$—C(O)NH—CH$_2$—,
—CONH—,
—CONH—CH$_2$—,
—CONH—(CH$_2$)$_2$—,
—CONH—(CH$_2$)$_3$—,
—CONH—(CH$_2$)$_6$—,
—CF$_2$CONH—,
—CF$_2$CONHCH$_2$—,
—CF$_2$CONH(CH$_2$)$_2$—,
—CF$_2$CONH(CH$_2$)$_3$—, —$CF_2CONH(CH_2)_6$—,
—$CON(CH_3)$—$(CH_2)_3$—,
—$CON(Ph)$-$(CH_2)_3$—, wherein Ph means phenyl,
—$CON(CH_3)$—$(CH_2)_6$—,
—$CON(Ph)$-$(CH_2)_6$—, wherein Ph means phenyl,
—$CF_2$—$CON(CH_3)$—$(CH_2)_3$—,
—$CF_2$—$CON(Ph)$-$(CH_2)_3$—, wherein Ph means phenyl,
—$CF_2$—$CON(CH_3)$—$(CH_2)_6$—,
—$CF_2$—$CON(Ph)$-$(CH_2)_6$—, wherein Ph means phenyl,
—$CONH$—$(CH_2)_2NH(CH_2)_3$—,
—$CONH$—$(CH_2)_6NH(CH_2)_3$—.

In another preferable embodiment, $X^5$ represents $X^{e'}$. $X^{e'}$ has the same meaning as described above.

In one embodiment, $X^{e'}$ is a single bond. In the present embodiment, PFPE and a group having a binding ability to the base material (namely, group in parentheses with γ1 in formula (C)) are directly bonded.

In the formula, each $R^a$, at each occurrence, independently represents —$Z^3$—$SiR^{71}_{p1}R^{72}_{q1}R^{73}_{r1}$.

In the formula, each $Z^3$, at each occurrence, independently represents an oxygen atom or a divalent organic group.

$Z^3$ is preferably a divalent organic group, and does not encompass any group which is taken together with a Si atom at an end of a molecular backbone in formula (C) (Si atom to which $R^a$ is bonded) to form a siloxane bond.

$Z^3$ is preferably a $C_{1-6}$ alkylene group, —$(CH_2)_g$—O—$(CH_2)_h$—, wherein g is an integer of 1 to 6, h is an integer of 1 to 6), or -phenylene-$(CH_2)_i$—, wherein i is an integer of 0 to 6), more preferably a $C_{1-3}$ alkylene group. Such a group is optionally substituted with one or more substituents selected from, for example, a fluorine atom, a $C_{1-6}$ alkyl group, a $C_{2-6}$ alkenyl group and a $C_{2-6}$ alkynyl group. $Z^3$ is more preferably a linear or branched alkylene group, further preferably a linear alkylene group from the viewpoint of particularly favorable ultraviolet durability. The number of carbon atoms constituting the alkylene group of $Z^3$ is preferably in the range from 1 to 6, more preferably in the range from 1 to 3. The alkylene group is as described above.

In the formulae, each $R^{71}$, at each occurrence, independently represents $R^{a'}$. $R^{a'}$ has the same meaning as $R^a$.

The number of Si linearly linked via a 23 group is at most 5 in $R^a$. That is, in the case where at least one $R^{71}$ is present in $R^a$, two or more Si atoms linearly linked via a $Z^3$ group are present in $R^a$, and the number of such Si atoms linearly linked via a $Z^3$ group is at most 5. Herein, the "number of Si atoms linearly linked via a $Z^3$ group in $R^a$" is equal to the number of repeatings of —$Z^3$—Si— linearly linked in $R^a$.

One example is represented below, where Si atoms are linked via a $Z^3$ group in $R^a$.

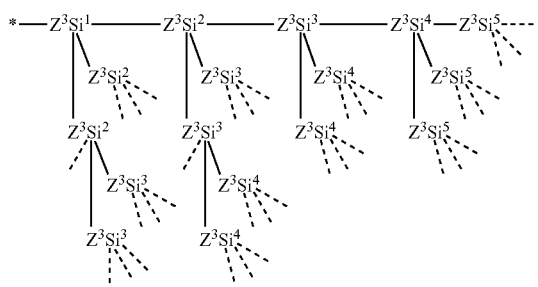

In the formula, "*" means a site bonded to Si of a main chain, and " . . . " means that a predetermined group other than $Z^3$Si is bonded, namely, when all three bonds of a Si atom are " . . . ", it means a point at which repeating of $Z^3$Si is terminated. The superscript number in Si means the number of occurrence of Si linearly linked via a $Z^3$ group when counted from "*". That is, a chain where repeating of $Z^3$Si is terminated at $Si^2$ is a chain where the "number of Si atoms linearly linked via a $Z^3$ group in $R^{a}$" is 2, and similarly, chains where repeating of $Z^3$Si is terminated at $Si^3$, $Si^4$ and $Si^5$ mean chains where the "number of Si atoms linearly linked via a $Z^3$ group in $R^{a}$" is 3, 4 and 5, respectively. As clear from the formula, a plurality of $Z^3$Si chains are present in $R^a$, and all the chains do not necessarily have the same length, and, for example, may each have any length.

In a preferable embodiment, the "number of Si atoms linearly linked via a $Z^3$ group in $R^{a}$" is 1 (left formula) or 2 (right formula) in all chains, as represented below.

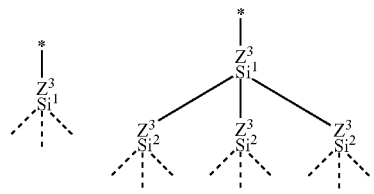

In one embodiment, the number of Si atoms linearly linked via a $Z^3$ group in $R^a$ is 1 or 2, preferably 1.

In the formulae, each $R^{72}$, at each occurrence, independently represents a hydroxyl group or a hydrolyzable group. The "hydrolyzable group" has the same meaning as described above.

Preferably, $R^{72}$ is —OR, wherein R represents a substituted or unsubstituted $C_{1-3}$ alkyl group, more preferably a methyl group.

In the formulae, each $R^{73}$, at each occurrence, independently represents a hydrogen atom or a lower alkyl group. The lower alkyl group is preferably an alkyl group having 1 to 20 carbon atoms, more preferably an alkyl group having 1 to 6 carbon atoms, further preferably a methyl group.

In the formulae, each p1, at each occurrence, is independently an integer of 0 to 3; each q1, at each occurrence, is independently an integer of 0 to 3; and each r1, at each occurrence, is independently an integer of 0 to 3, provided that the sum of p1, q1 and r1 with respect to (—$Z^3$—$SiR^{71}_{p1}R^{72}_{q1}R^{73}_{r1}$) is 3.

In a preferable embodiment, in $R^{a'}$ at an end of $R^a$ ($R^a$ in the case where no $R^{a'}$ is present), q1 is preferably 2 or more, for example, 2 or 3, more preferably 3.

In a preferable embodiment, at least one end of $R^a$ can be —$Si(-Z^3-SiR^{72}_{q1'}R^{73}_{r1'})_2R^{72}_{q1'}R^{73}_{r1'}$ (provided that either one of q1' and r1' is 1 and the other is 0) or —$Si(-Z^3-SiR^{72}_{q1'}R^{73}_{r1'})_3$, preferably —$Si(-Z^3-SiR^{72}_{q1}R^{73}_{r1})_3$ (wherein the total of q1 and r1 is 3). In the formula, a (—$Z^3$—$SiR^{72}_{q1}R^{73}_{r1}$) unit is preferably (—$Z^3$—$SiR^{72}_3$). In a further preferable embodiment, all ends of $R^a$ can be —$Si(-Z^3-SiR^{72}_{q1}R^{73}_{r1})_3$, preferably —$Si(-Z^3-SiR^{72}_3)_3$.

In a preferable embodiment, an end of a group represented by ($SiR^a_{k1}R^b_{l1}R^c_{m1}$) can be —$Si(-Z^3-SiR^{72}_{q1}R^{73}_{r1})_2R^b_{l1}R^c_{m1}$ (provided that any one of l1 and m1 is 1 and the other is 0), —$Si(-Z^3-SiR^{72}_{q1}R^{73}_{r1})_2R^{72}_{q1'}R^{73}_{r1'}$ (provided that any one of q1' and r1' is 1 and the other is 0), or —$Si(-Z^3-SiR^{72}_{q1}R^{73}_{r1})_3$, preferably —$Si(-Z^3-SiR^{72}_{q1}R^{73}_{r1})_3$ (wherein the total of q1 and r1 is 3). More preferably, an end of a group represented by ($SiR^a_{k1}R^b_{l1}R^c_{m1}$) is —$Si(-Z^3-SiR^{72}_3)_3$.

In the formulae, each $R^{a''}$, at each occurrence, independently represents $—Z^3—SiR^{71}{}_{p1}R^{72''}{}_{q1}R^{73}{}_{r1}$. $Z^3$, $R^{71}$, $R^{73}$, p1, q1 and r1 have the same meanings as described above. $R^{72''}$ has the same meaning as $R^{72}$.

In a preferable embodiment, at least one end of $R^{a''}$ can be $—Si(—Z^3—SiR^{72''}{}_{q1}R^{73}{}_{r1})_2R^{72''}{}_{q1'}R^{73}{}_{r1'}$ (provided that either one of q1' and r1' is 1 and the other is 0), or $—Si(—Z^3—SiR^{72''}{}_{q1}R^{73}{}_{r1})_3$, preferably $—Si(—Z^3—SiR^{72''}{}_{q1}R^{73}{}_{r1})_3$ (wherein the total of q1 and r1 is 3). In the formula, a $(—Z^3—SiR^{72''}{}_{q1}R^{73}{}_{r1})$ unit is preferably $(—Z^3—SiR^{72''}{}_3)$. In a further preferable embodiment, all ends of $R^a$ can be $—Si(—Z^3—SiR^{72''}{}_{q1}R^{73}{}_{r1})_3$, preferably $—Si(—Z^3—SiR^{72''}{}_3)_3$.

In a preferable embodiment, an end of a group represented by $(SiR^{a''}{}_{k1}R^{b''}{}_{l1}R^{c''}{}_{m1})$ can be $—Si(—Z^3—SiR^{72''}{}_{q1}R^{73}{}_{r1})_2R^{b''}{}_{l1}R^{c''}{}_{m1}$ (provided that any one of l1 and m1 is 1 and the other is 0), $—Si(—Z^3—SiR^{72''}{}_{q1}R^{73}{}_{r1})_2R^{72''}{}_{q1'}R^{73}{}_{r1'}$ (provided that any one of q1' and r1' is 1 and the other is 0), or $—Si(—Z^3—SiR^{72''}{}_{q1}R^{73}{}_{r1})_3$, preferably $—Si(—Z^3—SiR^{72''}{}_{q1}R^{73}{}_{r1})_3$ (wherein the total of q1 and r1 is 3). More preferably, an end of a group represented by $(SiR^{a''}{}_{k1}R^{b''}{}_{l1}R^{c''}{}_{m1})$ is $—Si(—Z^3—SiR^{72''}{}_3)_3$.

At least two Si atoms each bonding to the hydroxyl group or the hydrolyzable group are present in formula (C). That is, at least two structures selected from the group consisting of $SiR^{72}$ (specifically, a group represented by $—SiR^{71}{}_{p1}R^{72}{}_{q1}R^{73}{}_{r1}$, provided that q1 is an integer of 1 to 3), $SiR^{72''}$ (specifically, a group represented by $—SiR^{71}{}_{p1}R^{72''}{}_{q1}R^{73}{}_{r1}$, provided that q1 is an integer of 1 to 3), $SiR^b$ (specifically, a group represented by $—SiR^a{}_{k1}R^b{}_{l1}R^c{}_{m1}$, provided that l1 is an integer of 1 to 3) and $SiR^{b''}$ (specifically, a group represented by $—SiR^{a''}{}_{k1}R^{b''}{}_{l1}R^{c''}{}_{m1}$, provided that l1 is an integer of 1 to 3) are present. $R^b$ and $R^{b''}$ are described below.

More preferably, at least one Si bonding to the hydroxyl group or the hydrolyzable group is present at each of both ends of a molecular backbone of the PFPE-containing silane compound (A), in formula (C). That is, at least one $SiR^{72}$ and/or $SiR^b$ structure is present, and at least one $SiR^{72''}$ and/or $SiR^{b''}$ structure is present.

In the formulae, each $R^b$, at each occurrence, independently represents a hydroxyl group or a hydrolyzable group. $R^b$ preferably represents a hydroxyl group, $—OR$, $—OCOR$, $—O—N{=}C(R)_2$, $—N(R)_2$, $—NHR$, or halogen, wherein R represents a substituted or unsubstituted alkyl group having 1 to 4 carbon atoms, and $R^b$ more preferably represents $—OR$. Examples of R include unsubstituted alkyl groups such as a methyl group, an ethyl group, a propyl group, an isopropyl group, a n-butyl group and an isobutyl group; and substituted alkyl groups such as a chloromethyl group. Among them, an alkyl group, in particular, an unsubstituted alkyl group is preferable, and a methyl group or an ethyl group is more preferable. The hydroxyl group is not limited, and, may be generated by hydrolyzing the hydrolyzable group. More preferably, $R^b$ represents $—OR$, wherein R represents a substituted or unsubstituted $C_{1-3}$ alkyl group, more preferably a methyl group.

In the formulae, $R^{b''}$ has the same meaning as $R^b$.

In the formulae, each $R^c$, at each occurrence, independently represents a hydrogen atom or a lower alkyl group. The lower alkyl group is preferably an alkyl group having 1 to 20 carbon atoms, more preferably an alkyl group having 1 to 6 carbon atoms, further preferably a methyl group.

In the formulae, $R^{c''}$ has the same meaning as $R^c$.

In the formulae, each k1, at each occurrence, is independently an integer of 0 to 3; each l1, at each occurrence, is independently an integer of 0 to 3; and each m1, at each occurrence, is independently an integer of 0 to 3, provided that the sum of k1, l1 and m1 with respect to $(SiR^a{}_{k1}R^b{}_{l1}R^c{}_{m1})$ or with respect to $(SiR^{a''}{}_{k1}R^{b''}{}_{l1}R^{c''}{}_{m1})$ is 3.

In one embodiment, k1 is preferably 1 to 3, more preferably 3.

Such any compound represented by formula (C) can be synthesized as described in WO 2014/069592.

Formula (D):

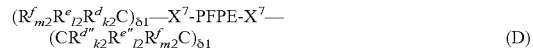

(D)

In formula (D), PFPE has the same meaning as described with respect to formula (A).

In the formula, each $X^7$ independently represents a single bond or a di- to decavalent organic group. $X^7$ is understood to be a linker which links a perfluoropolyether moiety (namely, -PFPE- moiety) mainly providing water-repellency, surface lubricity, and the like, and a moiety (namely, group in parentheses with δ1) providing a binding ability to the base material, in any compound represented by formula (D).

Accordingly, $X^7$ may be a single bond or any organic group as long as such any compound represented by formula (D) can be stably present. Herein, a left portion and a right portion of the structure designated as $X^7$ are bonding to the group represented by PFPE and the group in parentheses with δ1, respectively.

In another embodiment, $X^7$ represents $X^e$. $X^e$ has the same meaning as described above.

In the formulae, δ1 is an integer of 1 to 9, and δ1 may be varied depending on the valence of $X^7$. In formula (D), δ1 corresponds to a value obtained by subtracting 1 from the valence of $X^7$. In the case where $X^7$ is a single bond, δ1 is 1.

$X^7$ is preferably a di- to heptavalent, more preferably di- to tetravalent, further preferably divalent organic group.

In one embodiment, $X^7$ is a di- to tetravalent organic group, and δ1 is 1 to 3.

In another embodiment, $X^7$ is a divalent organic group, and δ1 is 1. In such a case, formula (D) is represented by the following formula (D'):

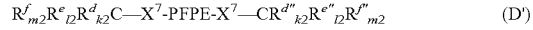

(D')

Examples of $X^7$ are not limited, and include the same as described with respect to $X^1$.

In particular, preferable specific examples of $X^7$ include a single bond, $—CF_2—$, $—(CF_2)_2—$,
$—CH_2OCH_2—$,
$—CH_2O(CH_2)_2—$,
$—CH_2O(CH_2)_3—$,
$—CH_2O(CH_2)_6—$,
$—CF_2—CH_2—O—CH_2—$,
$—CF_2—CH_2—O—(CH_2)_2—$,
$—CF_2—CH_2—O—(CH_2)_3—$,
$—CF_2—CH_2—O—(CH_2)_6—$,
$—CH_2O(CH_2)_3Si(CH_3)_2OSi(CH_3)_2(CH_2)_2—$,
$—CH_2O(CH_2)_3Si(CH_3)_2OSi(CH_3)_2OSi(CH_3)_2(CH_2)_2—$,
$—CH_2O(CH_2)_3Si(CH_3)_2O(Si(CH_3)_2O)_2Si(CH_3)_2(CH_2)_2—$,
$—CH_2O(CH_2)_3Si(CH_3)_2O(Si(CH_3)_2O)_3Si(CH_3)_2(CH_2)_2—$,
$—CH_2O(CH_2)_3Si(CH_3)_2O(Si(CH_3)_2O)_{10}Si(CH_3)_2(CH_2)_2—$,
$—CH_2O(CH_2)_3Si(CH_3)_2O(Si(CH_3)_2O)_2OSi(CH_3)_2(CH_2)_2—$, —CH₂OCF₂CHFOCF₂—,
—CH₂OCF₂CHFOCF₂CF₂—,
—CH₂OCF₂CHFOCF₂CF₂CF₂—,
—CH₂OCH₂CF₂CF₂OCF₂—,
—CH₂OCH₂CF₂CF₂OCF₂CF₂—,
—CH₂OCH₂CF₂CF₂OCF₂CF₂CF₂—,
—CH₂OCH₂CF₂CF₂OCF(CF₃)CF₂OCF₂—,
—CH₂OCH₂CF₂CF₂OCF(CF₃)CF₂OCF₂CF₂—,
—CH₂OCH₂CF₂CF₂OCF(CF₃)CF₂OCF₂CF₂CF₂—,
—CH₂OCH₂CHFCF₂OCF₂—,
—CH₂OCH₂CHFCF₂OCF₂CF₂—,
—CH₂OCH₂CHFCF₂OCF₂CF₂CF₂—,
—CH₂OCH₂CHFCF₂OCF(CF₃)CF₂OCF₂—,
—CH₂OCH₂CHFCF₂OCF(CF₃)CF₂OCF₂CF₂—,
—CH₂OCH₂CHFCF₂OCF(CF₃)CF₂OCF₂CF₂CF₂—,
—CH₂OCF₂CHFOCF₂CF₂CF₂—C(O)NH—CH₂—,
—CH₂OCH₂(CH₂)₇CH₂Si(OCH₃)₂OSi(OCH₃)₂(CH₂)₂Si(OCH₃)₂OSi(OCH₃)₂(CH₂)₂—,
—CH₂OCH₂CH₂CH₂Si(OCH₃)₂OSi(OCH₃)₂(CH₂)₃—,
—CH₂OCH₂CH₂CH₂Si(OCH₂CH₃)₂OSi(OCH₂CH₃)₂(CH₂)₃—,
—CH₂OCH₂CH₂CH₂Si(OCH₃)₂OSi(OCH₃)₂(CH₂)₂—,
—CH₂OCH₂CH₂CH₂Si(OCH₂CH₃)₂OSi(OCH₂CH₃)₂(CH₂)₂—,
—(CH₂)₂—Si(CH₃)₂—(CH₂)₂—,
—CH₂—,
—(CH₂)₂—,
—(CH₂)₃—,
—(CH₂)₄—,
—(CH₂)₅—,
—(CH₂)₆—,
—CF₂—, —(CF₂)₂—,
—CF₂—CH₂—,
—CF₂—(CH₂)₂—,
—CF₂—(CH₂)₃—,
—CF₂—(CH₂)₄—,
—CF₂—(CH₂)₅—,
—CF₂—(CH₂)₆—,
—CO—,
—CONH—,
—CONH—CH₂—,
—CONH—(CH₂)₂—,
—CONH—(CH₂)₃—,
—CONH—(CH₂)₆—,
—CF₂CONH—,
—CF₂CONHCH₂—,
—CF₂CONH(CH₂)₂—,
—CF₂CONH(CH₂)₃—,
—CF₂CONH(CH₂)₆—,
—CON(CH₃)—(CH₂)₃—,
—CON(Ph)-(CH₂)₃—, wherein Ph means phenyl,
—CON(CH₃)—(CH₂)₆—,
—CON(Ph)-(CH₂)₆—, wherein Ph means phenyl,
—CF₂—CON(CH₃)—(CH₂)₃—,
—CF₂—CON(Ph)-(CH₂)₃—, wherein Ph means phenyl,
—CF₂—CON(CH₃)—(CH₂)₆—,
—CF₂—CON(Ph)-(CH₂)₆—, wherein Ph means phenyl,
—CONH—(CH₂)₂NH(CH₂)₃—,
—CONH—(CH₂)₆NH(CH₂)₃—,
—CH₂O—CONH—(CH₂)₃—,
—CH₂O—CONH—(CH₂)₆—,
—S—(CH₂)₃—,
—(CH₂)₂S(CH₂)₃—,
—CONH—(CH₂)₃Si(CH₃)₂OSi(CH₃)₂(CH₂)₂—,
—CONH—(CH₂)₃Si(CH₃)₂OSi(CH₃)₂OSi(CH₃)₂(CH₂)₂—,
—CONH—(CH₂)₃Si(CH₃)₂O(Si(CH₃)₂O)₂Si(CH₃)₂(CH₂)₂—,
—CONH—(CH₂)₃Si(CH₃)₂O(Si(CH₃)₂O)₃Si(CH₃)₂(CH₂)₂—,
—CONH—(CH₂)₃Si(CH₃)₂O(Si(CH₃)₂O)₁₀Si(CH₃)₂(CH₂)₂—,
—CONH—(CH₂)₃Si(CH₃)₂O(Si(CH₃)₂O)₂OSi(CH₃)₂(CH₂)₂—,
—C(O)O—(CH₂)₃—,
—C(O)O—(CH₂)₆—,
—CH₂—O—(CH₂)₃—Si(CH₃)₂—(CH₂)₂—Si(CH₃)₂—(CH₂)₂—,
—CH₂—O—(CH₂)₃—Si(CH₃)₂—(CH₂)₂—Si(CH₃)₂—CH(CH₃)—,
—CH₂—O—(CH₂)₃—Si(CH₃)₂—(CH₂)₂—Si(CH₃)₂—(CH₂)₃—,
—CH₂—O—(CH₂)₃—Si(CH₃)₂—(CH₂)₂—Si(CH₃)₂—CH(CH₃)—CH₂—,
—OCH₂—,
—O(CH₂)₃—, and
—OCFHCF₂—

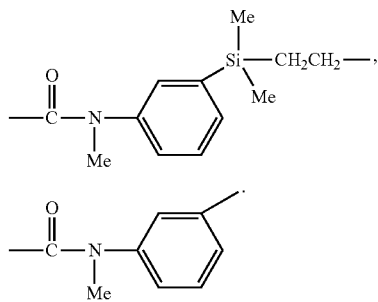

In particular, specific $X^7$ is more preferably
—CH₂OCH₂—,
—CH₂O(CH₂)₂—,
—CH₂O(CH₂)₃—,
—CH₂O(CH₂)₆—,
—CF₂—CH₂—O—CH₂—,
—CF₂—CH₂—O—(CH₂)₂—,
—CF₂—CH₂—O—(CH₂)₃—,
—CF₂—CH₂—O—(CH₂)₆—,
—CH₂OCF₂CHFOCF₂—,
—CH₂OCF₂CHFOCF₂CF₂—,
—CH₂OCF₂CHFOCF₂CF₂CF₂—,
—CH₂OCH₂CF₂CF₂OCF₂—,
—CH₂OCH₂CF₂CF₂OCF₂CF₂—,
—CH₂OCH₂CF₂CF₂OCF₂CF₂CF₂—,
—CH₂OCH₂CF₂CF₂OCF(CF₃)CF₂OCF₂—,
—CH₂OCH₂CF₂CF₂OCF(CF₃)CF₂OCF₂CF₂—,
—CH₂OCH₂CF₂CF₂OCF(CF₃)CF₂OCF₂CF₂CF₂—,
—CH₂OCH₂CHFCF₂OCF₂—,
—CH₂OCH₂CHFCF₂OCF₂CF₂—,
—CH₂OCH₂CHFCF₂OCF₂CF₂CF₂—,
—CH₂OCH₂CHFCF₂OCF(CF₃)CF₂OCF₂—,
—CH₂OCH₂CHFCF₂OCF(CF₃)CF₂OCF₂CF₂—,
—CH₂OCH₂CHFCF₂OCF(CF₃)CF₂OCF₂CF₂CF₂—,
—CH₂OCF₂CHFOCF₂CF₂CF₂—C(O)NH—CH₂—,
—CF₂—CH₂OCF₂CHFOCF₂CF₂CF₂—C(O)NH—CH₂—,
—CH₂—,
—(CH₂)₂—,
—(CH₂)₃—,
—(CH₂)₄—, —(CH$_2$)$_5$—,
—(CH$_2$)$_6$—,
—CF$_2$—, —(CF$_2$)$_2$—,
—CF$_2$—CH$_2$—,
—CF$_2$—(CH$_2$)$_2$—,
—CF$_2$—(CH$_2$)$_3$—,
—CF$_2$—(CH$_2$)$_4$—,
—CF$_2$—(CH$_2$)$_5$—,
—CF$_2$—(CH$_2$)$_6$—,
—CONH—,
—CONH—CH$_2$—,
—CONH—(CH$_2$)$_2$—,
—CONH—(CH$_2$)$_3$—,
—CONH—(CH$_2$)$_6$—,
—CF$_2$CONH—,
—CF$_2$CONHCH$_2$—,
—CF$_2$CONH(CH$_2$)$_2$—,
—CF$_2$CONH(CH$_2$)$_3$—,
—CF$_2$CONH(CH$_2$)$_6$—,
—CON(CH$_3$)—(CH$_2$)$_3$—,
—CON(Ph)-(CH$_2$)$_3$—, wherein Ph means phenyl,
—CON(CH$_3$)—(CH$_2$)$_6$—,
—CON(Ph)-(CH$_2$)$_6$—, wherein Ph means phenyl,
—CF$_2$—CON(CH$_3$)—(CH$_2$)$_3$—,
—CF$_2$—CON(Ph)-(CH$_2$)$_3$—, wherein Ph means phenyl,
—CF$_2$—CON(CH$_3$)—(CH$_2$)$_6$—,
—CF$_2$—CON(Ph)-(CH$_2$)$_6$—, wherein Ph means phenyl,
—CONH—(CH$_2$)$_2$NH(CH$_2$)$_3$—,
—CONH—(CH$_2$)$_6$NH(CH$_2$)$_3$—,
—CH$_2$O—CONH—(CH$_2$)$_3$—,
—CH$_2$O—CONH—(CH$_2$)$_6$—,
—OCH$_2$—,
—O(CH$_2$)$_3$—,
—OCFHCF$_2$—.

In particular, $X^7$ is more preferably
—CH$_2$OCF$_2$CHFOCF$_2$CF$_2$CF$_2$—C(O)NH—CH$_2$—,
—CF$_2$—CH$_2$OCF$_2$CHFOCF$_2$CF$_2$CF$_2$—C(O)NH—CH$_2$—,
—CONH—,
—CONH—CH$_2$—,
—CONH—(CH$_2$)$_2$—,
—CONH—(CH$_2$)$_3$—,
—CONH—(CH$_2$)$_6$—,
—CF$_2$CONH—,
—CF$_2$CONHCH$_2$—,
—CF$_2$CONH(CH$_2$)$_2$—,
—CF$_2$CONH(CH$_2$)$_3$—,
—CF$_2$CONH(CH$_2$)$_6$—,
—CON(CH$_3$)—(CH$_2$)$_3$—,
—CON(Ph)-(CH$_2$)$_3$—, wherein Ph means phenyl,
—CON(CH$_3$)—(CH$_2$)$_6$—,
—CON(Ph)-(CH$_2$)$_6$—, wherein Ph means phenyl,
—CF$_2$—CON(CH$_3$)—(CH$_2$)$_3$—,
—CF$_2$—CON(Ph)-(CH$_2$)$_3$—, wherein Ph means phenyl,
—CF$_2$—CON(CH$_3$)—(CH$_2$)$_6$—,
—CF$_2$—CON(Ph)-(CH$_2$)$_6$—, wherein Ph means phenyl,
—CONH—(CH$_2$)$_2$NH(CH$_2$)$_3$—,
—CONH—(CH$_2$)$_6$NH(CH$_2$)$_3$—.

In one embodiment, $X^7$ represents $X^{e'}$. $X^{e'}$ has the same meaning as described above.

In one embodiment, $X^{e'}$ is a single bond. In the present embodiment, PFPE and a group having a binding ability to the base material (namely, group in parentheses with δ1 in formula (D)) are directly bonded. It is considered that such a structure is included to thereby strengthen a bonding force between PFPE and the group in parentheses with δ1. It is also considered that a carbon atom (namely, in the group in parentheses with δ1, a carbon atom bonding to $R^d$, $R^e$ and $R^f$ or a carbon atom bonding to $R^{d''}$, $R^{e''}$ and $R^{f''}$) directly bonding to PFPE is less biased in charge and, as a result, a nucleophilic reaction or the like hardly occurs at the carbon atom and the compound is stably bonding to the base material. Such a structure has the advantage of being capable of more enhancing friction durability of a layer formed by the PFPE-containing silane compound.

In the formulae, each $R^d$, at each occurrence, independently represents —$Z^4$—$CR^{81}_{p2}R^{82}_{q2}R^{83}_{r2}$.

In the formulae, each $Z^4$, at each occurrence, independently represents an oxygen atom or a divalent organic group.

$Z^4$ is preferably a $C_{1-6}$ alkylene group, —(CH$_2$)$_g$—O—(CH$_2$)$_h$—, wherein g is an integer of 0 to 6, for example, an integer of 1 to 6, and h is an integer of 0 to 6, for example, an integer of 1 to 6, or -phenylene-(CH$_2$)$_i$—, wherein i is an integer of 0 to 6, more preferably a $C_{1-3}$ alkylene group. Such a group is optionally substituted with one or more substituents selected from, for example, a fluorine atom, a $C_{1-6}$ alkyl group, a $C_{2-6}$ alkenyl group and a $C_{2-6}$ alkynyl group.

In the formulae, each $R^{81}$, at each occurrence, independently represents $R^{d'}$. $R^{d'}$ has the same meaning as $R^d$.

The number of C linearly linked via a $Z^4$ group in $R^d$ is at most 5. That is, in the case where at least one $R^{81}$ is present in $R^d$, two or more C atoms linearly linked via a $Z^4$ group are present in $R^d$, and the number of such C atoms linearly linked via a $Z^4$ group is at most 5. Herein, the "number of C atoms linearly linked via a $Z^4$ group in $R^d$" is equal to the number of repeating units of —$Z^4$—C— linearly linked in $R^d$.

In a preferable embodiment, the "number of C atoms linearly linked via a $Z^4$ group in $R^d$" is 1 (left formula) or 2 (right formula) in all chains, as represented below.

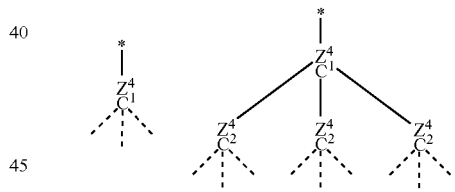

In one embodiment, the number of C atoms linearly linked via a $Z^4$ group in $R^d$ is 1 or 2, preferably 1.

In the formulae, each $R^{82}$, at each occurrence, independently represents —Y—$SiR^{85}_{n2}R^{86}_{3-n2}$.

Each Y, at each occurrence, independently represents a divalent organic group.

In a preferable embodiment, Y is a $C_{1-6}$ alkylene group, —(CH$_2$)$_{g'}$—O—(CH$_2$)$_{h'}$—, wherein g' is an integer of 0 to 6, for example, an integer of 1 to 6, and h' is an integer of 0 to 6, for example, an integer of 1 to 6, or -phenylene-(CH$_2$)$_{i'}$—, wherein i' is an integer of 0 to 6. Such a group is optionally substituted with one or more substituents selected from, for example, a fluorine atom, a $C_{1-6}$ alkyl group, a $C_{2-6}$ alkenyl group and a $C_{2-6}$ alkynyl group.

In one embodiment, Y can be a $C_{1-6}$ alkylene group or -phenylene-(CH$_2$)$_{i'}$—. In the case where Y is any of the above groups, light resistance, in particular, ultraviolet resistance can be more enhanced.

Each $R^{85}$, at each occurrence, independently represents a hydroxyl group or a hydrolyzable group.

Examples of the "hydrolyzable group" include the same as in formula (C).

Preferably, $R^{85}$ is —OR, wherein R represents a substituted or unsubstituted $C_{1-3}$ alkyl group, more preferably an ethyl group or a methyl group, in particular, a methyl group.

Each $R^{86}$, at each occurrence, independently represents a hydrogen atom or a lower alkyl group. The lower alkyl group is preferably an alkyl group having 1 to 20 carbon atoms, more preferably an alkyl group having 1 to 6 carbon atoms, further preferably a methyl group.

n2 with respect to a $(-Y-SiR^{85}{}_{n2}R^{86}{}_{3-n2})$ unit or with respect to a $(-Y-SiR^{85"}{}_{n2}R^{86"}{}_{3-n2})$ unit independently represents an integer of 0 to 3, preferably an integer of 1 to 3, more preferably 2 or 3, particularly preferably 3. $R^{85"}$ and $R^{86"}$ are described below.

Each $R^{83}$, at each occurrence, independently represents a hydrogen atom, a hydroxyl group or a lower alkyl group, preferably a hydrogen atom or a lower alkyl group. The lower alkyl group is preferably an alkyl group having 1 to 20 carbon atoms, more preferably an alkyl group having 1 to 6 carbon atoms, further preferably a methyl group.

In the formulae, each p2, at each occurrence, is independently an integer of 0 to 3; each q2, at each occurrence, is independently an integer of 0 to 3; and each r2, at each occurrence, is independently an integer of 0 to 3, provided that the sum of p2, q2 and r2 with respect to $(-Z^4-CR^{81}{}_{p2}R^{82}{}_{q2}R^{83}{}_{r2})$ or with respect to $(-Z^4-CR^{81}{}_{p2}R^{82"}{}_{q2}R^{83}{}_{r2})$ is 3. $R^{82"}$ is described below.

In a preferable embodiment, in $R^{d'}$ at an end of $R^d$ ($R^d$ in the case where no $R^{d'}$ is present), q2 is preferably 2 or more, for example, 2 or 3, more preferably 3.

In a preferable embodiment, at least one end of $R^d$ can be $-C(-Y-SiR^{85}{}_{n2}R^{86}{}_{3-n2})_2$(specifically, $-C(-Y-SiR^{85}{}_{n2}R^{86}{}_{3-n2})_2R^{83}$) or $-C(-Y-SiR^{85}{}_{n2}R^{86}{}_{3-n2})_3$, preferably $-C(-Y-SiR^{85}{}_{n2}R^{86}{}_{3-n2})_3$. Here, n2 is an integer of 1 to 3. In the formulae, a $(-Y-SiR^{85}{}_{n2}R^{86}{}_{3-n2})$ unit is preferably $(-Y-SiR^{85}{}_3)$. In a further preferable embodiment, all ends of $R^d$ can be each $-C(-Y-SiR^{85}{}_{n2}R^{86}{}_{3-n2})_3$, preferably $-C(-Y-SiR^{85}{}_3)_3$.

In a more preferable embodiment, an end of a group represented by $(CR^d{}_{k2}R^e{}_{l2}R^f{}_{m2})$ is $C(-Y-SiR^{85}{}_{n2}R^{86}{}_{3-n2})_2R^f$, $C(-Y-SiR^{85}{}_{n2}R^{86}{}_{3-n2})_2R^{83}$ or $C(-Y-SiR^{85}{}_{n2}R^{86}{}_{3-n2})_3$, preferably $C(-Y-SiR^{85}{}_{n2}R^{86}{}_{3-n2})_3$. Here, n2 is an integer of 1 to 3. In the formulae, a $(-Y-SiR^{85}{}_{n2}R^{86}{}_{3-n2})$ unit is preferably $(-Y-SiR^{85}{}_3)$. In a further preferable embodiment, all ends of the group can be each $C(-Y-SiR^{85}{}_{n2}R^{86}{}_{3-n2})_3$, preferably $C(-Y-SiR^{85}{}_3)_3$.

In the formulae, each $R^{d"}$, at each occurrence, independently represents $-Z^4-CR^{81}{}_{p2}R^{82"}{}_{q2}R^{83}{}_{r2}$. $Z^4$, $R^{81}$, $R^{83}$, p2, q2 and r2 have the same meanings as described above. Each $R^{82"}$, at each occurrence, independently represents $-Y-SiR^{85"}{}_{n2}R^{86"}{}_{3-n2}$. Here, Y and n2 have the same meanings as described above. $R^{85"}$ and $R^{86"}$ have the same meanings as $R^{85}$ and $R^{86}$, respectively.

In a preferable embodiment, in $R^{d"}$ at an end of $R^{d"}$ ($R^{d"}$ in the case where no $R^{d'}$ is present), q2 is preferably 2 or more, for example, 2 or 3, more preferably 3.

In a preferable embodiment, at least one end of $R^{d"}$ can be $-C(-Y-SiR^{85"}{}_{n2}R^{86"}{}_{3-n2})_2$(specifically, $-C(-Y-SiR^{85"}{}_{n2}R^{86"}{}_{3-n2})_2R^{83}$) or $-C(-Y-SiR^{85"}{}_{n2}R^{86"}{}_{3-n2})_3$, preferably $-C(-Y-SiR^{85"}{}_{n2}R^{86"}{}_{3-n2})_3$. Here, n2 is an integer of 1 to 3. In the formulae, a $(-Y-SiR^{85"}{}_{n2}R^{86"}{}_{3-n2})$ unit is preferably $(-Y-SiR^{85"}{}_3)$. In a further preferable embodiment, all ends of $R^d$ can be each $-C(-Y-SiR^{85"}{}_{n2}R^{86"}{}_{3-n2})_3$, preferably $-C(-Y-SiR^{85"}{}_3)_3$.

In a more preferable embodiment, an end of a group represented by $(CR^{d"}{}_{k2}R^{e"}{}_{l2}R^{f"}{}_{m2})$ is $C(-Y-SiR^{85"}{}_{n2}R^{86"}{}_{3-n2})_2R^{f"}$, $C(-Y-SiR^{85"}{}_{n2}R^{86"}{}_{3-n2})_2R^{83}$ or $C(-Y-SiR^{85"}{}_{n2}R^{86"}{}_{3-n2})_3$, preferably $C(-Y-SiR^{85"}{}_{n2}R^{86"}{}_{3-n2})_3$. Here, n2 is an integer of 1 to 3. In the formulae, a $(-Y-SiR^{85"}{}_{n2}R^{86"}{}_{3-n2})$ unit is preferably $(-Y-SiR^{85"}{}_3)$. In a further preferable embodiment, all ends of the group can be each $C(-Y-SiR^{85"}{}_{n2}R^{86"}{}_{3-n2})_3$, preferably $C(-Y-SiR^{85"}{}_3)_3$.

In the formulae, each $R^e$, at each occurrence, independently represents $-Y-SiR^{85}{}_{n2}R^{86}{}_{3-n2}$. Here, Y, $R^{85}$, $R^{86}$ and n2 have the same meanings as described in $R^{82}$.

In the formulae, each $R^{e"}$, at each occurrence, independently represents $-Y-SiR^{85"}{}_{n2}R^{86"}{}_{3-n2}$. Here, $R^{85"}$, $R^{86"}$, Y, and n2 have the same meanings as described above.

In the formulae, each $R^f$, at each occurrence, independently represents a hydrogen atom, a hydroxyl group or a lower alkyl group. Preferably, each $R^f$, at each occurrence, independently represents a hydrogen atom or a lower alkyl group. The lower alkyl group is preferably an alkyl group having 1 to 20 carbon atoms, more preferably an alkyl group having 1 to 6 carbon atoms, further preferably a methyl group.

In the formulae, $R^{f"}$ has the same meaning as $R^f$.

In the formulae, each k2, at each occurrence, is independently an integer of 0 to 3; each l2, at each occurrence, is independently an integer of 0 to 3; and each m2, at each occurrence, is independently an integer of 0 to 3, provided that the sum of k2, l2 and m2 is 3.

In one embodiment, at least one k2 is 2 or 3, preferably 3.

In one embodiment, k2 is 2 or 3, preferably 3.

In one embodiment, l2 is 2 or 3, preferably 3.

In formula (D), two or more groups selected from the group consisting of a group represented by $-Y-SiR^{85}$ and a group represented by $-Y-SiR^{85"}$ are present. In formula (D), preferably, one or more groups represented by $-Y-SiR^{85}$ and one or more groups represented by $-Y-SiR^{85"}$ are present.

More preferably, one or more carbon atoms each bonding to two or more groups each represented by $-Y-SiR^{85}{}_{n2}R^{86}{}_{3-n2}$ are present, and one or more carbon atoms each bonding to two or more groups each represented by $-Y-SiR^{85"}{}_{n2}R^{86"}{}_{3-n2}$ are present, wherein n2 is an integer of 1 to 3.

That is, one or more groups selected from a group represented by $-C-R^d{}_{k2}$ $(Y-SiR^{85}{}_{n2}R^{86}{}_{3-n2})_{l2}R^f{}_{m2}$ (provided that l2 is 2 or 3 and the total of k2, l2 and m2 is 3) and a group represented by $-C-R^{81}{}_{p2}$ $(Y-SiR^{85}{}_{n2}R^{86}{}_{3-n2})_{q2}R^{83}{}_{r2}$ (provided that q2 is 2 or 3 and the total of p2, q2 and r2 is 3), and one or more groups selected from a group represented by $-C-R^d{}_{k2}$ $(Y-SiR^{85"}{}_{n2}R^{86"}{}_{3-n2})_{l2}R^f{}_{m2}$ (provided that l2 is 2 or 3 and the total of k2, l2 and m2 is 3) and a group represented by $-C-R^{81}{}_{p2}$ $(Y-SiR^{85"}{}_{n2}R^{86"}{}_{3-n2})_{q2}R^{83}{}_{r2}$ (provided that q2 is 2 or 3 and the total of p2, q2 and r2 is 3), wherein n2 is an integer of 1 to 3, are preferably present.

In one embodiment, one or more groups each represented by $-C-(Y-SiR^{85}{}_{n2}R^{86}{}_{3-n2})_2$ and one or more groups each represented by $-C-(Y-SiR^{85"}{}_{n2}R^{86"}{}_{3-n2})_2$, wherein n2 is an integer of 1 to 3, are preferably present in formula (D).

In one embodiment, one or more groups each represented by $-C-(Y-SiR^{85}{}_{n2}R^{86}{}_{3-n2})_3$ and one or more groups each represented by $-C-(Y-SiR^{85"}{}_{n2}R^{86"}{}_{3-n2})_3$, wherein n2 is an integer of 1 to 3, are preferably present in formula (D).

In formula (D), n2 is an integer of 1 to 3 and at least one q2 is 2 or 3, or at least one l2 is 2 or 3.

In formula (D), at least two of —Y—SiR$^{85}$$_{n2}$R$^{86}$$_{3-n2}$ group and —Y—SiR$^{85''}$$_{n2}$R$^{86''}$$_{3-n2}$ group are preferably present. In formula (D), one or more —Y—SiR$^{85}$$_{n2}$R$^{86}$$_{3-n2}$ groups and one or more —Y—SiR$^{85''}$$_{n2}$R$^{86''}$$_{3-n2}$ groups are more preferably present. That is, a group containing —SiR$^{85}$ and a group containing —SiR$^{85''}$ are preferably present at each of both ends of a molecular backbone of the PFPE-containing silane compound (A).

The compound represented by formula (D) can be produced by combining known methods.

In a preferable embodiment, the PFPE-containing silane compound (A) is represented by formula (B) or (C).

In one embodiment, the PFPE-containing silane compound (A) can be a compound represented by formula (A), (C) or (D). Such a silane compound can be used to thereby allow adhesion properties to the base material to be enhanced.

In one embodiment, on at least one end of the PFPE-containing silane compound (A), there is two or more, preferably three or more Si atoms each having a hydroxyl group or a hydrolyzable group.

The PFPE-containing silane compound (A) can have a number average molecular weight of $5\times10^2$ to $1\times10^5$, without any limitation. In particular, the compound preferably has a number average molecular weight of 2,000 to 30,000, more preferably 2,500 to 12,000, further preferably 3,000 to 6,000. In the present invention, the number average molecular weight is defined as a value obtained by $^{19}$F-NMR measurement.

(Cross-Linking Agent)

The cross-linking agent is an organosilicon compound having at least two —O—R$^{g3}$ (s) each bonding to a Si atom. In the formula, each R$^{g3}$, at each occurrence, independently represents a hydrogen atom or a monovalent organic group. The monovalent organic group means a carbon atom-containing group. Such a monovalent organic group is not limited, and examples thereof include a group where one hydrogen atom is further removed from a hydrocarbon group. The hydrocarbon group has the same meaning as described above.

The cross-linking agent is not limited as long as the agent is a compound having a moiety which can undergo a crosslinking reaction (condensation reaction) with the fluorine-containing silane compound (for example, PFPE-containing silane compound (A), specifically, a silane moiety having a hydroxyl group or a hydrolyzable group bonding to a Si atom of the PFPE-containing silane compound (A)). The fluorine-containing silane compound (for example, PFPE-containing silane compound (A)) and the cross-linking agent can be included, thereby improving physical properties (for example, tensile strength and elastic modulus) of a cured product obtained from the curable composition of the present invention.

The cross-linking agent has a structure different from the structure of the fluorine-containing silane compound (for example, PFPE-containing silane compound (A)).

Examples of the cross-linking agent can include
an organic compound where R$^{g3}$ is a hydrogen atom, namely, an organosilicon compound having at least two silanol groups in one molecule, and
any organosilicon compound represented by formulae (E3) to (E5) described below.

Organosilicon compound having at least two silanol groups in one molecule:

Such silanol groups are preferably present at both respective ends of a molecular backbone in the organosilicon compound. The molecular backbone here represents a relatively longest binding chain in a molecule of the organosilicon compound.

Examples of the compound having silanol groups at both respective ends of a molecular backbone can include a compound represented by the following formula (E1) or (E2).

(E1)

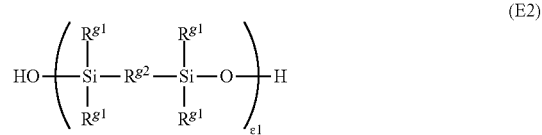

(E2)

In formula (E1) or (E2), each R$^{g1}$, at each occurrence, is independently a substituted or unsubstituted monovalent hydrocarbon group having 1 to 8 carbon atoms. Specific examples of R$^{g1}$ include alkyl groups such as a methyl group, an ethyl group, a propyl group, an isopropyl group, a butyl group, an isobutyl group, a tert-butyl group, a pentyl group, a neopentyl group, a hexyl group, a heptyl group, an octyl group, a nonyl group and a decyl group; cycloalkyl groups such as a cyclopentyl group, a cyclohexyl group and a cycloheptyl group; alkenyl groups such as a vinyl group, an allyl group, a propenyl group, an isopropenyl group, a butenyl group, an isobutenyl group, a hexenyl group and a cyclohexenyl group; aryl groups such as a phenyl group, a tolyl group, a xylyl group and a naphthyl group; aralkyl groups such as a benzyl group, a phenylethyl group and a phenylpropyl group; and groups where some or all hydrogen atoms of such a group are substituted with a halogen atom (for example, a chloromethyl group, a bromoethyl group, a chloropropyl group, a trifluoropropyl group and a nonafluorohexyl group).

In formula (E1) or (E2), each R$^{g2}$, at each occurrence, independently represents a substituted or unsubstituted divalent hydrocarbon group having 1 to 20 carbon atoms, preferably 2 to 10 carbon atoms. Specific examples of R$^{g2}$ include alkylene groups such as a methylene group, an ethylene group, a propylene group, a methylethylene group, a butylene group and a hexamethylene group; cycloalkylene groups such as a cyclohexylene group, arylene groups such as a phenylene group, a tolylene group, a xylylene group, a naphthylene group and a biphenylene group; a group where some or all hydrogen atoms of such a group are substituted with a halogen atom; and a combination of such a substituted or unsubstituted alkylene group and an arylene group. Among them, R$^{g2}$ is preferably a methylene group, an ethylene group, a propylene group, a butylene group, a hexamethylene group, a cyclohexylene group or a phenylene group, and is particularly preferably an ethylene group, a propylene group, a butylene group or a phenylene group. Examples of the compound having silanol groups in a molecule include a resin compound including a bond of one unit of R$^{g1}$$_3$SiO$_{1/2}$, R$^{g1}$$_2$SiO, R$^{g1}$SiO$_{3/2}$, and SiO$_2$, or a combination of two or more kinds thereof, with a silanol group. Constituent units of the resin compound may be directly bonded or may be bonded via a di- or higher valent hydrocarbon group.

In formula (E1) or (E2), each ε1, at each occurrence, is independently an integer of 1 or more, and ε1 is preferably 2 or more, more preferably 5 or more, preferably 50 or less, more preferably 20 or less.

The organosilicon compound having at least two silanol groups in one molecule (specifically, compound represented by formula (E1) or (E2)) preferably has no PEPE structure in a molecular structure.

Any organosilicon compound represented by formula (E3), (E4) or (E5):

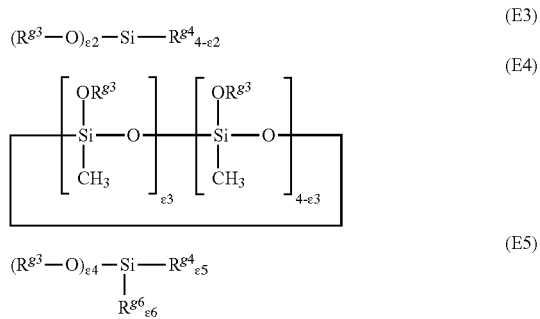

In formulae (E3) and (E4), $R^{g3}$ has the same meaning as described above. $R^{g3}$ is a moiety which can react with a moiety having a hydroxyl group or a hydrolyzable group bonding to a Si atom of the fluorine-containing silane compound (for example, the PFPE-containing silane compound (A) represented by formula (A), (B), (C) or (D)).

$R^{g3}$ is preferably a monovalent organic group.

Each $R^{g3}$—, at each occurrence, is more preferably independently $CH_3$—, $C_2H_5$—, $C_3H_7$—, $CF_3CH_2$—, $CH_3CO$—, $CH_2=C(CH_3)$—, $CH_3CH_2C(CH_3)=N$—, $(CH_3)_2N$—, $(C_2H_5)_2N$—, $CH_2=C(OC_2H_5)$—, $(CH_3)_2C=C(OC_8H_{17})$—, or

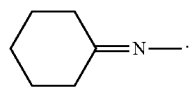

In formulae (E3) and (E4), each $R^{g4}$, at each occurrence, is independently a monovalent organic group. $R^{g4}$ is preferably a substituted or unsubstituted monovalent hydrocarbon group, more preferably a substituted or unsubstituted monovalent hydrocarbon group having 1 to 12 carbon atoms. Specific examples of $R^{g4}$ can include alkyl groups such as a methyl group, an ethyl group, a propyl group, an isopropyl group, a butyl group, an isobutyl group, a tert-butyl group, a pentyl group, a neopentyl group, a hexyl group, a heptyl group, an octyl group, a nonyl group and a decyl group; cycloalkyl groups such as a cyclopentyl group, a cyclohexyl group and a cycloheptyl group; aryl groups such as a phenyl group, a tolyl group, a xylyl group and a naphthyl group; aralkyl groups such as a benzyl group, a phenylethyl group and a phenylpropyl group; alkenyl groups such as a vinyl group, an allyl group, a propenyl group and a butenyl group; and groups where some or all hydrogen atoms of such a group are substituted with a halogen atom such as fluorine, chlorine or bromine (for example, a chloromethyl group, a bromoethyl group, a chloropropyl group, a trifluoropropyl group and a 3,3,4,4,5,5,6,6,6-nonafluorohexyl group).

In one embodiment, $R^{g4}$ can be a group represented by the following general formula.

$$Rf^1—R^{g5}—$$

In the formulae, $Rf^1$ is a monovalent fluorinated polyether group. Examples of $Rf^1$ include one having a structure where $CF_3O$—, $CF_3CF_2O$—, $CF_3CF_2CF_2O$—, $(CF_3)_2CFO$—, $CF_3CF_2CF_2CF_2O$— or the like is bonding to a $CF_2$ end of PFPE above.

$R^{g5}$ is a divalent organic group. The divalent organic group has the same meaning as described above.

$R^{g5}$ can be a substituted or unsubstituted divalent hydrocarbon group, for example, optionally containing one or more of an oxygen atom, a nitrogen atom, a silicon atom and a sulfur atom, and optionally containing an amide bond or a sulfonamide bond. The divalent hydrocarbon group preferably has 2 to 20 carbon atoms. Specific examples of a substituted or unsubstituted divalent hydrocarbon group not having any oxygen atom, nitrogen atom, silicon atom or sulfur atom interposed and not containing any amide bond or sulfonamide bond include alkylene groups such as an ethylene group, a propylene group, a methylethylene group, a butylene group and a hexamethylene group; cycloalkylene groups such as a cyclohexylene group; arylene groups such as a phenylene group, a tolylene group, a xylylene group, a naphthylene group and a biphenylene group; a combination of any alkylene group and any arylene group; and a group where some or all hydrogen atoms of such alkylene group and arylene group are substituted with a halogen atom.

The divalent hydrocarbon group can contain an oxygen atom in the form of —O—, a nitrogen atom in the form of —$NR^{g51}$— ($R^{g51}$ is a hydrogen atom or an alkyl group or aryl group having 1 to 10 carbon atoms) or —N=, a silicon atom in the form of —$SiR^{g52}R^{g53}$— ($R^{g52}$ and $R^{g53}$, at each occurrence, are each independently an alkyl group or aryl group having 1 to 10 carbon atoms), and/or a sulfur atom in the form of —S—. The divalent hydrocarbon group can contain an amide bond in the form of —C(=O)$NR^{g51}$— ($R^{g51}$ is the same as described above) and/or a sulfonamide bond in the form of —$SO_2NR^{g51}$— ($R^{g51}$ is the same as described above). Specific examples of such a divalent hydrocarbon group include the following. In the following formulae, Me represents a methyl group and Ph represents a phenyl group, and an $Rf^1$ group is bonding to a left portion of each of the following formulae.

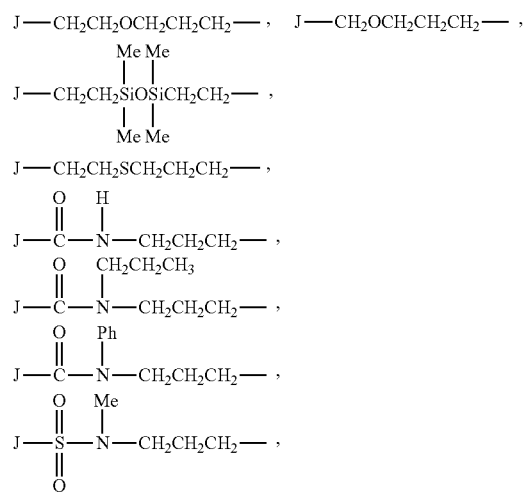

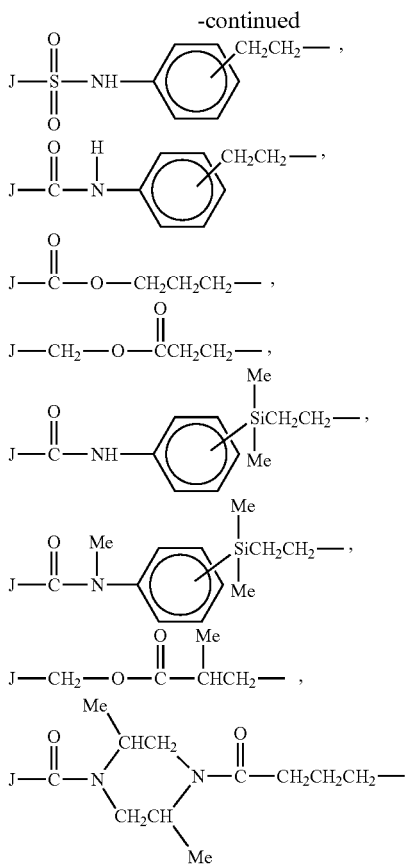

J represents a bonding site.

In formulae (E3) and (E4), each ε2, at each occurrence, is independently 2 or 3, and each ε3, at each occurrence, is independently 2 or 3.

In formula (E5), $R^{g3}$ and $R^{94}$ have the same meanings as described above. In formula (E5), each $R^{g6}$—, at each occurrence, independently represents $R^{g8}$—$R^{g7}$—.

Each $R^{g7}$, at each occurrence, independently represents a single bond, an oxygen atom or a divalent organic group. The divalent organic group is as described above.

$R^{g7}$ is preferably an alkylene group having 1 to 10 carbon atoms or a group having 1 to 10 carbon atoms and containing a nitrogen atom or an oxygen atom in a main chain.

$R^{g7}$ is more preferably
an alkylene group having 1 to 3 carbon atoms,
$CH_2CH_2$—NH—$CH_2CH_2CH_2$, or
$CH_2$—O—$CH_2CH_2CH_2$.

$R^{g8}$ is a reactive functional group. Each $R^{g8}$, at each occurrence, is preferably independently an amino group, an epoxy group, a methacrylic group, a vinyl group or a mercapto group, more preferably an amino group.

In formula (E5), ε4 is an integer of 2 or more, preferably 2 or 3, more preferably 3. In formula (E5), ε5 is an integer of 0 or more, preferably 0 or 1. In formula (E5), ε6 is 1 or 2, preferably 1, provided that the sum of ε4, ε5 and ε6 is 4.

In formula (E5), preferably ε4 is 2 or 3, ε5 is 0 or 1 and ε6 is 1 or 2, more preferably ε4 is 3, ε5 is 0 and ε6 is 1.

Preferably, the cross-linking agent is any compound represented by formula (E3) or formula (E5), more preferably any compound represented by formula (E3).

In one embodiment, the cross-linking agent does not have any group represented by PFPE in a molecular chain.

In one embodiment, the molecular weight of the cross-linking agent is 1,000 or less, preferably 600 or less, more preferably 250 or less. The lower limit of the molecular weight of the cross-linking agent may be 50 or more or 100 or more.

In a preferable embodiment, the cross-linking agent is at least one selected from the group consisting of tetraethoxysilane, tetratrimethoxysilane, methyltriethoxysilane, methyltrimethoxysilane, dimethyldimethoxysilane, aminopropyltriethoxysilane, aminopropyltrimethoxysilane, tridecafluoro-n-octyltriethoxysilane and tridecafluoro-n-octyltrimethoxysilane.

The curable composition of the present invention can include, for example, 0.1 parts by mass or more, specifically 0.3 parts by mass or more, and 30 parts by mass or less, specifically 10 parts by mass or less of the cross-linking agent based on 100 parts by mass of the fluorine-containing silane compound (for example, PFPE-containing silane compound (A)). The curable composition of the present invention can include 0.1 to 30 parts by mass, specifically 1.0 to 15 parts by mass, 5.0 to 15 parts by mass or 0.3 to 10 parts by mass, more specifically 0.3 to 5.0 parts by mass of the cross-linking agent based on 100 parts by mass of the fluorine-containing silane compound (for example, PFPE-containing silane compound (A)).

The cross-linking agent can contain, for example, 1 mol or more, specifically 2 mol or more of —O—$R^{g3}$ based on 1 mol of the hydroxyl group or hydrolyzable group bonding to any Si atom of the fluorine-containing silane compound (for example, PFPE-containing silane compound (A)), in the curable composition of the present invention. The cross-linking agent can contain, for example, 30 mol or less, specifically 20 mol or less, more specifically 10 mol or less of —O—$R^{g3}$ based on 1 mol of the hydroxyl group or hydrolyzable group bonding to any Si atom of the PFPE-containing silane compound (A). $R^{g3}$ has the same meaning as described above.

The cross-linking agent can contain, for example, —O—$R^{g3}$, for example, in the range from 1 to 30 mol, specifically in the range from 2 to 20 mol based on 1 mol of the hydroxyl group or hydrolyzable group bonding to any Si atom of the fluorine-containing silane compound (for example, PFPE-containing silane compound (A)).

The cross-linking agent can be included, for example, in the range from 0.1 to 30 parts by mass, specifically in the range from 0.3 to 10 parts by mass based on 100 parts by mass of the curable composition of the present invention.

The cross-linking agent may be used singly or in combinations of two or more kinds thereof.

(Catalyst)

The catalyst promotes a condensation reaction of the fluorine-containing silane compound (for example, PFPE-containing silane compound (A)) and the cross-linking agent.

The curable composition of the present invention preferably includes 0.05 parts by mass or more, more preferably 0.07 parts by mass or more of the catalyst based on 100 parts by mass of the fluorine-containing silane compound (for example, PFPE-containing silane compound (A)). The curable composition of the present invention preferably includes 1.0 part by mass or less, more preferably 0.7 parts by mass or less of the catalyst based on 100 parts by mass of the fluorine-containing silane compound (for example, PFPE-containing silane compound (A)). The curable composition includes the concentration of the catalyst, thereby allowing a condensation reaction of the fluorine-containing silane compound and the cross-linking agent to be particularly promoted. The curable composition includes the concentration of the catalyst, thereby allowing a condensation reaction of the fluorine-containing silane compound (for example, PFPE-containing silane compound (A)) and the cross-linking agent to be particularly promoted.

The curable composition of the present invention preferably includes 0.05 to 1.0 parts by mass, more preferably 0.07 to 0.7 parts by mass of the catalyst based on 100 parts by mass of the fluorine-containing silane compound (for example, PFPE-containing silane compound (A)).

The catalyst can be a metal-based catalyst, an organic acid-based catalyst, an inorganic acid-based catalyst, a base-based catalyst (for example, ammonia, triethylamine or diethylamine), or the like.

Examples of the organic acid-based catalyst can include a compound having carboxylic acid, sulfonic acid or phosphoric acid, and can specifically include acetic acid, trifluoroacetic acid, methanesulfonic acid, toluenezenesulfonic acid and alkylphosphoric acid.

Examples of the inorganic acid-based catalyst can include hydrochloric acid and sulfuric acid.

The catalyst is preferably a metal-based catalyst.

Examples of any metal atom contained in the metal-based catalyst can include titanium, zirconium and tin. In particular, titanium or zirconium is preferably used.

The metal-based catalyst preferably has alkoxide (—O—$R^h$) as a ligand. Such a metal-based catalyst is preferably at least one selected from the group consisting of tetrabutyl titanate (for example, tetra-n-butyl titanate), tetrapropyl titanate (for example, tetraisopropyl titanate, tetra-n-propyl titanate), tetrapropyl zirconate (tetraisopropyl zirconia, tetra-n-propyl zirconate), tetra-n-butyl zirconate, dibutyltin dimethoxide and dibutyltin dilaurate, more preferably at least one selected from the group consisting of tetraisopropyl titanate and tetra-n-propyl zirconate. Such a metal-based catalyst is used to thereby promote a condensation reaction of the fluorine-containing silane compound (for example, PFPE-containing silane compound (A)) and the cross-linking agent. Such a metal-based catalyst can be easily dissolved or dispersed in the curable composition and can contribute to promotion of a reaction uniformly. The curable composition, which includes such a metal-based catalyst, can contribute to formation of a cured product of the curable composition, having less foreign substances and high transparency.

$R^h$ is preferably an alkyl group having 1 to 4 carbon atoms. A catalyst having such an alkyl group is used to particularly promote a condensation reaction.

$R^h$ is further preferably an alkyl group having 1 to 3 carbon atoms. The alkyl group having 1 to 3 carbon atoms is, namely, a methyl group, an ethyl group, a n-propyl group or an i-propyl group. The catalyst, which has such $R^h$, can be easily dissolved in a solvent and can contribute to promotion of a reaction uniformly.

The catalyst may be used singly or in combinations of two or more kinds thereof.

(Solvent)

The curable composition of the present invention includes a solvent. The composition, which includes a solvent, is thus improved in handleability. In the case where the curable composition of the present invention is used to form a layer, the layer formed can be a continuous thin film. Such a curable composition can contribute to formation of a thin film having any thickness.

The curable composition of the present invention can be used for, for example, uniformly filling even any narrow and fine void (for example, any void between electronic members) therewith. The curable composition of the present invention can hardly cause any bubbles (air bubbles) to be generated in filling of such any void, or can allow any bubbles generated to disappear naturally (without any particular operation), even if such any bubbles are generated.

The composition preferably includes 300 parts by mass or less, more preferably 200 parts by mass or less, further preferably 100 parts by mass or less of the solvent based on 100 parts by mass of the total of the fluorine-containing silane compound, the organosilicon compound and the catalyst. The composition includes 1 part by mass or more, more preferably 20 parts by mass or more, further preferably 50 parts by mass or more of the solvent based on 100 parts by mass of the total of the fluorine-containing silane compound, the organosilicon compound and the catalyst.

The solvent is preferably included in the range from 1 to 300 parts by mass, more preferably in the range from 20 to 200 parts by mass, further preferably in the range from 50 to 100 parts by mass based on 100 parts by mass of the total of the fluorine-containing silane compound, the cross-linking agent and the catalyst.

Examples of the solvent include:
a fluorine atom-containing solvent selected from the group consisting of perfluorohexane, $CF_3CF_2CHCl_2$, $CF_3CH_2CF_2CH_3$, $CF_3CHFCHFC_2F_5$, 1,1,1,2,2,3,3,4,4,5,5,6,6-tridecafluorooctane, 1,1,2,2,3,3,4-heptafluorocyclopentane ((Zeorora H (trade name) or the like), $C_4F_9OCH_3$, $C_4F_9OC_2H_5$, $CF_3CH_2OCF_2CHF_2$, $C_6F_{13}CH=CH_2$, xylene hexafluoride, perfluorobenzene, methylpentadecafluoroheptylketone, trifluoroethanol, pentafluoropropanol, hexafluoroisopropanol, $HCF_2CF_2CH_2OH$, methyltrifluoromethanesulfonate, trifluoroacetic acid, $CF_3O(CF_2CF_2O)_{m1}(CF_2O)_{n1}CF_2CF_3$, wherein m1 and n1 are each independently an integer of 0 or more and 1000 or less and the occurrence order of the respective repeating units in parentheses with m1 or n1 is not limited in the formula, provided that the sum of m1 and n1 is 1 or more, 1,1-dichloro-2,3,3,3-tetrafluoro-1-propene, 1,2-dichloro-1,3,3,3-tetrafluoro-1-propene, 1,2-dichloro-3,3,3-trifluoro-1-propene, 1,1-dichloro-3,3,3-trifluoro-1-propene, 1,1,2-trichloro-3,3,3-trifluoro-1-propene, 1,1,1,4,4,4-hexafluoro-2-butene, ethyl perfluorobutyl ether and methyl perfluorobutyl ether. Such a solvent may be used singly or as a mixture of two or more kinds thereof.

In particular, a preferable solvent is a fluorine atom-containing solvent. The fluorine atom-containing solvent is preferably at least one selected from the group consisting of ethyl perfluorobutyl ether and methyl perfluorobutyl ether. Such a solvent is used to thereby enhance storage stability of the curable composition of the present invention.

The curable composition of the present invention includes the fluorine-containing silane compound, the cross-linking agent, the catalyst and the solvent to thereby allow for formation of a continuous film (sometimes referred to such a film as "uniformity"). The continuous film refers to a film not having any region not coated, like a pinhole. In the case where the curable composition of the present invention is used, a thin film having any thickness (for example, 0.1 to 100 μm, specifically 1 to 50 μm) can be formed.

The curable composition of the present invention enables a gel-like cured product to be formed. The curable composition of the present invention can be thus suited for use as, for example, a sealing material.

The curable composition of the present invention can be used for, for example, uniformly filling even any narrow and fine void (for example, any void between electronic members) therewith. The curable composition of the present invention can hardly cause any bubbles to be generated in filling of such any void, or even if such any bubbles are generated, can allow any bubbles generated to disappear naturally (without any particular operation).

The content of moisture contained in the solvent is preferably 100 ppm by mass or less, more preferably 50 ppm by mass or less. The lower limit of the content of moisture contained in the solvent is not limited, and is, for example, 1 ppm by mass or more. The content of moisture can be measured with a Karl Fischer method. The content of moisture can be in the range to thereby allow storage stability of the curable composition to be enhanced.

The content of moisture contained in the curable composition of the present invention is preferably 20 ppm by mass or less relative to the composition. The lower limit of the content of moisture contained in the curable composition is not limited, and no moisture may be substantially contained (for example, 0 ppm by mass). The content of moisture can be measured with a Karl Fischer method. The content of moisture can be in the range to thereby allow storage stability of the curable composition to be enhanced. The content of moisture can be in the range to thereby allow stability (for example, storage stability) of the curable composition of the present invention to be enhanced.

The viscosity of the curable composition of the present invention is preferably in the range from 5 to 1000 mPa·s. The viscosity of the curable composition is more preferably 500 mPa·s or less, further preferably 300 mPa·s or less, more preferably 100 mPa·s or less, further preferably 60 mPa·s or less, particularly preferably 50 mPa·s or less. The viscosity of the curable composition is more preferably 3 mPa·s or more, further preferably 5 mPa·s or more.

Preferably, the viscosity of the composition for formation of a cured product is in the range from 3 to 500 mPa·s, more preferably in the range from 5 to 300 mPa·s.

The curable composition of the present invention, which has such a viscosity, can be thus more enhanced in handleability.

The viscosity corresponds to a viscosity at 25° C., as determined by a B-type viscometer, and can be measured according to JIS K7117-1:1999.

The curable composition of the present invention can further include any compound represented by the following formula (A1), (B1), (C1) or (D1).

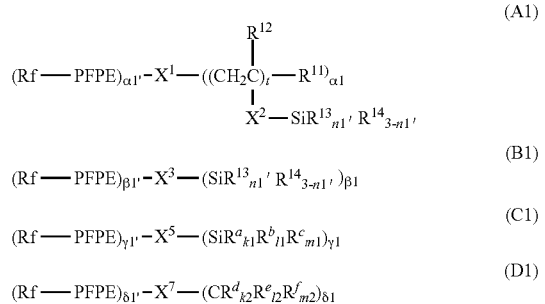

Any portion of the descriptions of formulae (A1), (B1), (C1) and (D1), overlapped with those of (A), (B), (C) and (D), may be sometimes omitted.

In the formulae, Rf, at each occurrence, independently represents an alkyl group having 1 to 16 carbon atoms, optionally substituted with one or more fluorine atoms.

The "alkyl group having 1 to 16 carbon atoms" with respect to the alkyl group having 1 to 16 carbon atoms, the group being optionally substituted with one or more fluorine atoms, is optionally linear or branched, is preferably a linear or branched alkyl group having 1 to 6 carbon atoms, particularly 1 to 3 carbon atoms, more preferably a linear alkyl group having 1 to 3 carbon atoms.

Rf is preferably an alkyl group having 1 to 16 carbon atoms, the group being optionally substituted with one or more fluorine atoms, more preferably a $CF_2H$—$C_{1-15}$ fluoroalkylene group or a $C_{1-16}$ perfluoroalkyl group, further preferably a $C_{1-16}$ perfluoroalkyl group.

The perfluoroalkyl group having 1 to 16 carbon atoms may be linear or branched, and is preferably a linear or branched perfluoroalkyl group having 1 to 6 carbon atoms, in particular, 1 to 3 carbon atoms, more preferably a linear perfluoroalkyl group having 1 to 3 carbon atoms, specifically —$CF_3$, —$CF_2CF_3$, or —$CF_2CF_2CF_3$.

In formula (A1), $\alpha 1$ is an integer of 1 to 9 and $\alpha 1'$ is an integer of 1 to 9. Here, $\alpha 1'$ may be varied depending on the valence of $X^1$. In formula (A1), the sum of $\alpha 1$ and $\alpha 1'$ is the same as the valence of $X^1$. For example, in the case where $X^1$ is a decavalent organic group, the sum of $\alpha 1$ and $\alpha 1'$ is 10, for example, $\alpha 1$ can be 9 and $\alpha 1'$ can be 1, $\alpha 1$ can be 5 and $\alpha 1'$ can be 5, or $\alpha 1$ can be 1 and $\alpha 1'$ can be 9. In the case where $X^1$ is a divalent organic group, $\alpha 1$ and $\alpha 1'$ are 1. In the case where $X^1$ is a single bond, $\alpha 1$ and $\alpha' 1$ are 1.

$X^1$ is preferably a di- to heptavalent, more preferably di- to tetravalent, further preferably divalent organic group.

In one embodiment, $X^1$ is a di- to tetravalent organic group, $\alpha 1$ is 1 to 3, and $\alpha 1'$ is 1.

In another embodiment, $X^1$ is a divalent organic group, $\alpha 1$ is 1, and $\alpha 1'$ is 1.

In formula (A1), n1' with respect to a (—$SiR^{13}_{n1'}R^{14}_{3-n1'}$) unit is independently an integer of 0 to 3, preferably 1 to 3, more preferably 3. In the formula, at least one n1' is an integer of 1 to 3, namely, there is not any case where all n1' (s) are simultaneously 0. In other words, at least one $R^{13}$ is present in formula (A1).

In formula (B1), $\beta 1$ is an integer of 1 to 9 and $\beta 1'$ is an integer of 1 to 9. Such $\beta 1$ and $\beta 1'$ may be varied depending on the valence of $X^3$. In formula (B1), the sum of $\beta 1$ and $\beta 1'$ is the same as the valence of, $X^3$. For example, in the case where $X^3$ is a decavalent organic group, the sum of $\beta 1$ and $\beta 1'$ is 10, for example, $\beta 1$ can be 9 and $\beta 1'$ can be 1, $\beta 1$ can be 5 and $\beta 1'$ can be 5, or $\beta 1$ can be 1 and $\beta 1'$ can be 9. In the case where $X^3$ is a divalent organic group, $\beta 1$ and $\beta 1'$ are 1. In the case where $X^3$ is a single bond, $\beta 1$ and $\beta' 1$ are 1.

$X^3$ is preferably a di- to heptavalent, more preferably di- to tetravalent, further preferably divalent organic group.

In one embodiment, $X^3$ is a di- to tetravalent organic group, $\beta 1$ is 1 to 3, and $\beta 1'$ is 1.

In one embodiment, $X^3$ is a divalent organic group, $\beta 1$ is 1, and $\beta 1'$ is 1.

In formula (B1), n1' has the same meaning as described with respect to (A1).

In formula (C1), $\gamma 1$ is an integer of 1 to 9 and $\gamma 1'$ is an integer of 1 to 9. Such $\gamma 1$ and $\gamma 1'$ may be varied depending on the valence of $X^5$. In formula (C1), the sum of $\gamma 1$ and $\gamma 1'$ is the same as the valence of $X^5$. For example, in the case where $X^5$ is a decavalent organic group, the sum of $\gamma 1$ and $\gamma 1'$ is 10, for example, $\gamma 1$ can be 9 and $\gamma 1'$ can be 1, $\gamma 1$ can be 5 and $\gamma 1'$ can be 5, or $\gamma 1$ can be 1 and $\gamma 1'$ can be 9. In the case where $X^5$ is a divalent organic group, $\gamma 1$ and $\gamma 1'$ are 1. In the case where $X^5$ is a single bond, $\gamma 1$ and $\gamma' 1$ are 1.

$X^5$ is preferably a di- to heptavalent, more preferably di- to tetravalent, further preferably divalent organic group.

In one embodiment, $X^5$ is a di- to tetravalent organic group, $\gamma 1$ is 1 to 3, and $\gamma 1'$ is 1.

In one embodiment, $X^5$ is a divalent organic group, $\gamma 1$ is 1, and $\gamma 1'$ is 1.

In formula (D1), $\delta 1$ is an integer of 1 to 9 and $\delta 1'$ is an integer of 1 to 9. Such $\delta 1$ and $\delta 1'$ may be varied depending on the valence of $X^7$. In formula (D1), the sum of $\delta 1$ and $\delta 1'$ is the same as the valence of $X^7$. For example, in the case where $X^7$ is a decavalent organic group, the sum of $\delta 1$ and $\delta 1'$ is 10, for example, $\delta 1$ can be 9 and $\delta 1'$ can be 1, $\delta 1$ can be 5 and $\delta 1'$ can be 5, or $\delta 1$ can be 1 and $\delta 1'$ can be 9. In the case where $X^7$ is a divalent organic group, $\delta 1$ and $\delta 1'$ are 1. In the case where $X^7$ is a single bond, $\delta 1$ and $\delta' 1$ are 1.

$X^7$ is preferably a di- to heptavalent, more preferably di- to tetravalent, further preferably divalent organic group.

In one embodiment, $X^7$ is a di- to tetravalent organic group, $\delta 1$ is 1 to 3, and $\delta 1'$ is 1.

In another embodiment, $X^7$ is a divalent organic group, $\delta 1$ is 1, and $\delta 1'$ is 1.

In the present embodiment, the curable composition can further include the compound represented by formula (A1), (B1), (C1) or (D1). The curable composition may include 400 parts by mass or less, 300 parts by mass or less, 250 parts by mass or less, or 150 parts by mass or less, and 0.1 parts by mass or more, 1 part by mass or more, 10 parts by mass or more, or 50 parts by mass or more of the compound represented by formula (A1), (B1), (C1) or (D1) based on 100 parts by mass of the fluorine-containing silane compound (for example, PFPE-containing silane compound (A)).

The curable composition preferably includes 0.1 to 400 parts by mass, more preferably 1 to 250 parts by mass, further preferably 1 to 150 parts by mass of the compound represented by formula (A1), (B1), (C1) or (D1) based on 100 parts by mass of the fluorine-containing silane compound (for example, PFPE-containing silane compound (A)). In the case where a plurality of such compounds represented by formula (A1), (B1), (C1) or (D1) are present, the proportion thereof means the proportion of the total amount of such compounds represented by formulae (A1), (B1), (C1) and (D1) based on 100 parts by mass of the fluorine-containing silane compound (for example, PFPE-containing silane compound (A)).

In one embodiment, the compound represented by formula (A1), (B1), (C1) or (D1) is preferably a compound represented by formula (A1), (C1) or (D1). Such a silane compound can be used to thereby allow adhesion properties to the base material to be enhanced.

In one embodiment, the compound represented by formula (A1), (B1), (C1) or (D1) has two or more, preferably three or more Si atoms each having a hydroxyl group or a hydrolyzable group at an end.

In one embodiment, the curable composition of the present invention includes 0.1% by mol or more and 35% by mol or less of any compound represented by formulae (A1), (B1), (C1) and (D1) based on the total of any compound represented by formulae (A), (B), (C) and (D) (hereinafter, also referred to as "component (1)") and any compound represented by formulae (A1), (B1), (C1) and (D1) (hereinafter, also referred to as "component (2)"). The lower limit of the content of any compound represented by formulae (A1), (B1), (C1) and (D1) based on the total of the component (1) and the component (2) can be preferably 0.1% by mol, more preferably 0.2% by mol, further preferably 0.5% by mol, still more preferably 1% by mol, particularly preferably 2% by mol, particularly 5% by mol. The upper limit of the content of any compound represented by formulae (A1), (B1), (C1) and (D1) based on the total of the component (1) and the component (2) can be preferably 35% by mol, more preferably 30% by mol, further preferably 20% by mol, still more preferably 15% by mol or 10% by mol. Any compound represented by formulae (A1), (B1), (C1) and (D1) based on the total of the component (1) and the component (2) is preferably 0.1% by mol or more and 30% by mol or less, more preferably 0.1% by mol or more and 20% by mol or less, further preferably 0.2% by mol or more and 10% by mol or less, still more preferably 0.5% by mol or more and 10% by mol or less, particularly preferably 1% by mol or more and 10% by mol or less, for example, 2% by mol or more and 10% by mol or less or 5% by mol or more and 10% by mol or less. The component (1) and the component (2) can be included in such a range, thereby allowing the curable composition of the present invention to contribute to formation of a cured product favorable in friction durability.

The combination of the component (1) and the component (2) in the curable composition is preferably a combination of a compound represented by formula (A) and a compound represented by formula (A1), a combination of a compound represented by formula (B) and a compound represented by formula (B1), a combination of a compound represented by formula (C) and a compound represented by formula (C1), or a combination of a compound represented by formula (D) and a compound represented by formula (D1).

In such any compound represented by formula (A) and formula (A1), t is preferably 2 or more, more preferably an integer of 2 to 10, further preferably an integer of 2 to 6. Here, t can be 2 or more, thereby allowing a plurality of Si atoms each having $R^{13}$ or $R^{13''}$ to be present and allowing a cured product formed from the curable composition of the present invention to achieve higher durability (for example, friction durability).

In such any compound represented by formula (C) and formula (C1), k1 is preferably 2 or 3, more preferably 3.

In a preferable embodiment, the compound represented by formula (C) has a structure represented by —Si—($Z^3$—SiR$^{72}_3$)$_2$, —Si—($Z^3$—SiR$^{72}_3$)$_2$, —Si—($Z^3$—SiR$^{72}_3$)$_3$ or —Si—($Z^3$—SiR$^{72''}_3$)$_3$, further preferably has a structure represented by —Si—($Z^3$—SiR$^{72}_3$)$_3$ or —Si—($Z^3$—SiR$^{72''}_3$)$_3$ at an end; the compound represented by formula (C1) has a structure represented by —Si—($Z^3$—SiR$^{72}_3$)$_2$ or —Si—($Z^3$—SiR$^{72}_3$)$_3$, further preferably has a structure represented by —Si—($Z^3$—SiR$^{72}_3$)$_3$ at an end. Such a structure can be at an end, thereby allowing a cured product formed from the curable composition of the present invention to achieve higher durability (for example, friction durability).

Specific examples of the group represented by —Si—($Z^3$—SiR$^{72}_3$)$_2$ or —Si—($Z^3$—SiR$^{72''}_3$)$_2$ can include
—Si—R$^a_2$R$^b_{l1}$R$^c_{m1}$ wherein R$^a$ is a group represented by —Z$^3$—SiR$^{72}_3$ and the sum of l1 and m1 is 1,
—Si—R$^{a''}_2$R$^{b''}_{l1}$R$^{c''}_{m1}$ wherein R$^{a''}$ is a group represented by —Z$^3$—SiR$^{72''}_3$ and the sum of l1 and m1 is 1,
—Si—R$^{71}_2$R$^{72}_{q1}$R$^{73}_{r1}$ wherein R$^{71}$ is a group represented by —Z$^3$—SiR$^{72}_3$ and the total of q1 and r1 is 1, or
—Si—R$^{71}_2$R$^{72''}_{q1}$R$^{73}_{r1}$ wherein R$^{71}$ is a group represented by —Z$^3$—SiR$^{72}_3$ and the total of q1 and r1 is 1.

In such any compound represented by formula (D) and formula (D1), l2 is preferably 2 or 3, more preferably 3.

In a preferable embodiment, the compound represented by formula (D) has a —C—(Y—SiR$^{85}_3$)$_2$, —C—(Y—SiR$^{85''}_3$)$_2$ (specifically, —C—(Y—SiR$^{85}_3$)$_2$R$^{83}$, —C—(Y—SiR$^{85''}_3$)$_2$R$^{83}$), —C—(Y—SiR$^{85}_3$)$_3$ or —C—(Y—SiR$^{85''}_3$)$_3$ structure, further preferably a —C—(Y—SiR$^{85}_3$)$_3$ or —C—(Y—SiR$^{85''}_3$)$_3$ structure at an end; and the compound represented by formula (D1) has a —C—(Y—SiR$^{85}$$_3$)$_2$(specifically, —C—(Y—SiR$^{85}$$_3$)$_2$R$^{83}$) or —C—(Y—SiR$^{85}$)$_3$ structure, further preferably a —C—(Y—SiR$^{85}$)$_3$ structure at an end. Such a structure can be at an end, thereby allowing a cured product formed from the curable composition of the present invention to achieve higher durability (for example, friction durability).

(Other Component)

The curable composition of the present invention may further include other component. Such other component is not limited, and may include, for example, a (non-reactive) fluoropolyether compound which can be understood as a fluorine-containing oil, preferably a perfluoro (poly)ether compound (hereinafter, referred to as "fluorine-containing oil") a stabilizing material (dehydrating agent, molecular sieve, magnesium sulfate or methyl o-formate), a viscosity modifier, a filler, a fluorescent agent, a storage stabilizer, a filling agent, a colorant, a heat resistance improver, a cold resistance improver, a rust inhibitor, an adhesiveness improver, and/or a liquid strengthening agent.

The fluorine-containing oil is not limited, and examples thereof include a compound (perfluoro (poly)ether compound) represented by the following general formula (III):

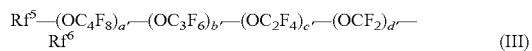

Rf$^5$—(OC$_4$F$_8$)$_{a'}$—(OC$_3$F$_6$)$_{b'}$—(OC$_2$F$_4$)$_{c'}$—(OCF$_2$)$_{d'}$—Rf$^6$ (III)

wherein Rf$^5$ represents an alkyl group having 1 to 16 carbon atoms optionally substituted with one or more fluorine atoms (preferably C$_{1-16}$ perfluoroalkyl group), Rf$^6$ represents an alkyl group having 1 to 16 carbon atoms optionally substituted with one or more fluorine atoms (preferably C$_{1-16}$ perfluoroalkyl group), a fluorine atom or a hydrogen atom, and Rf$^5$ and Rf$^6$ are more preferably, each independently, a C$_{1-3}$ perfluoroalkyl group; and a', b', c' and d' represent the respective four numbers of repeating units in perfluoro(poly)ether constituting a main backbone of the polymer and are mutually independently an integer of 0 or more and 300 or less, the sum of a', b', c' and d' is at least 1, preferably 1 to 300, more preferably 20 to 300, the occurrence order of the respective repeating units in parentheses with the subscript a', b', c' or d' is not limited in the formula, and, among such repeating units, —(OC$_4$F$_8$)— may be any of —(OCF$_2$CF$_2$CF$_2$CF$_2$)—, —(OCF(CF$_3$)CF$_2$CF$_2$)—, —(OCF$_2$CF(CF$_3$)CF$_2$)—, —(OCF$_2$CF$_2$CF(CF$_3$))—, —(OC(CF$_3$)$_2$CF$_2$)—, —(OCF$_2$C(CF$_3$)$_2$)—, —(OCF(CF$_3$)CF(CF$_3$))—, —(OCF(C$_2$F$_5$)CF$_2$)— and —(OCF$_2$CF(C$_2$F$_5$))—, and is preferably —(OCF$_2$CF$_2$CF$_2$CF$_2$)—, and —(OC$_3$F$_6$)— may be any of —(OCF$_2$CF$_2$CF$_2$)—, —(OCF(CF$_3$)CF$_2$)— and —(OCF$_2$CF(CF$_3$))—, and is preferably —(OCF$_2$CF$_2$CF$_2$)—, and, for example, —(OC$_2$F$_4$)— may be any of —(OCF$_2$CF$_2$)— and —(OCF(CF$_3$))—, and is preferably —(OCF$_2$CF$_2$)—.

Examples of the perfluoro (poly)ether compound represented by general formula (III) include a compound represented by any of the following general formulae (IIIa) and (IIIb) (which may be adopted singly or as a mixture of two or more kinds thereof).

Rf$^5$—(OCF$_2$CF$_2$CF$_2$)$_{b''}$—Rf$^6$ (IIIa)

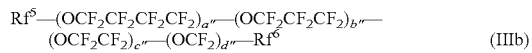

Rf$^5$—(OCF$_2$CF$_2$CF$_2$CF$_2$)$_{a''}$—(OCF$_2$CF$_2$CF$_2$)$_{b''}$—(OCF$_2$CF$_2$)$_{c''}$—(OCF$_2$)$_{d''}$—Rf$^6$ (IIIb)

In such formulae, Rf$^5$ and Rf$^6$ are as described above; in formula (IIIa), b" is an integer of 1 or more and 100 or less; in formula (IIIb), a" and b" are each independently an integer of 1 or more and 30 or less, and c" and d" are each independently an integer of 1 or more and 300 or less, and the occurrence order of the respective repeating units in parentheses with subscript a", b", c", d" is not limited in the formulae.

The fluorine-containing oil may have a number average molecular weight of 1,000 to 30,000. In particular, the number average molecular weight of the compound represented by formula (IIIa) is preferably 2,000 to 8,000. In one embodiment, the number average molecular weight of the compound represented by formula (IIIb) is 3,000 to 8,000. In another embodiment, the number average molecular weight of the compound represented by formula (IIIb) is 8,000 to 30,000.

The curable composition can contain, for example, 0 to 500 parts by mass, preferably 0 to 100 parts by mass, more preferably 1 to 50 parts by mass, further preferably 1 to 5 parts by mass of the fluorine-containing oil based on 100 parts by mass of the PFPE-containing silane compound.

The fluorine-containing oil may be a compound represented by general formula Rf'—F, wherein Rf' is C$_{5-16}$ perfluoroalkyl group, from another viewpoint. The fluorine-containing oil may be a chlorotrifluoroethylene oligomer. The compound represented by Rf'—F and the chlorotrifluoroethylene oligomer are preferable in that high affinity with the perfluoro(poly)ether group-containing silane compound where Rf is a C$_{1-16}$ perfluoroalkyl group is obtained.

The curable composition of the present invention contains the fluorine-containing oil, thereby enabling a more flexible cured product to be formed.

In one embodiment, the average molecular weight of the fluorine-containing oil may be higher than the average molecular weight of the fluorine-containing silane compound (for example, a compound represented by formula (A), (B), (C) or (D)). Such an average molecular weight can be set, thereby allowing a cured product formed by using the curable composition of the present invention to achieve more excellent friction durability and surface lubricity.

In one embodiment, the average molecular weight of the fluorine-containing oil may be lower than the average molecular weight of the fluorine-containing silane compound (for example, a compound represented by formula (A), (B), (C) or (D)). Such an average molecular weight can be set, thereby allowing the curable composition of the present invention to not only be suppressed from being reduced in transparency of a cured product formed by using the curable composition, but also lead to formation of a cured product having high friction durability and high surface lubricity.

Examples of the storage stabilizer can include methyltrimethoxysilane, methyltripropenoxysilane, vinyltributanoximesilane and methyltriacetoxysilane.

Examples of the filling agent can include fibrous filling agents such as asbestos, glass fiber and an organic fiber.

Examples of the colorant can include a pigment and a dye.

Examples of the heat resistance improver can include colcothar and cerium oxide.

Examples of the adhesiveness improver can include β-(3,4-epoxycyclohexyl)ethyltrimethoxysilane, γ-glycidoxypropyltriethoxysilane, γ-methacryloxypropyltrimethoxysilane, γ-methacryloxypropylmethyldiethoxysilane, N-β-(aminoethyl)-γ-aminopropyltrimethoxysilane, γ-aminopropyltriethoxysilane, γ-chloropropyltrimethoxysilane, γ-mercaptopropyltrimethoxysilane and γ-isocyanatopropyltriethoxysilane.

Examples of the liquid strengthening agent can include reticular polysiloxane having a triorganosiloxy unit and a SiO$_2$ unit.

The curable composition can be formed into a pellet by impregnating, therewith, a porous material, for example, a porous ceramic material or a metal fiber, for example, any material obtained by solidifying a steel wool in a cotton-like manner. The pellet can be used in, for example, vacuum deposition.

(Application)

A cured product of the curable composition of the present invention can be used in, for example, a potting material or a sealing material. A cured product of the curable composition of the present invention can be used by, for example, filling any void (for example, a bonding section of a housing and a printed board, or a space between a metal terminal section and a mold resin subjected to resin-molding) of an electronic member with the cured product, and drying the resultant after such filling.

In order that a cured product (for example, a potting material or a sealing material) having higher abrasion resistance is formed, an object to be treated is preferably washed with acetone, hydrofluoroether or the like and thereafter dried for removal of an oily content on the wall of any void, before the treatment with the curable composition of the present invention. The object can be further subjected to a pre-treatment with UV ozone, oxygen plasma or the like, in addition to the washing, thereby allowing abrasion resistance of the cured product to be more enhanced.

A primer treatment can be, if necessary, applied onto, for example, the wall of any void before the treatment with the curable composition of the present invention, thereby enhancing adhesiveness of a potting material formed from the curable composition and more enhancing abrasion resistance. For example, the primer treatment may be performed in the same conditions as those of a primer treatment with a silane coupling agent, according to an ordinary method.

Herein, various primers can also be used in combination in the case where the cured product obtained from the curable composition of the present invention is allowed to adhere to various base materials.

The temperature in the treatment is not limited, and the treatment may be usually performed at room temperature. The treatment time is also not limited, and can be, for example, 5 minutes to 48 hours.

In one embodiment, the curable composition can be cured at room temperature. The curable composition is particularly useful as a composition for formation of a potting material.

In one embodiment, the curable composition of the present invention, when used, may be further diluted with a solvent and thus used, depending on the application and the intended use. Any of the fluorine-based solvents exemplified above can be used as the solvent for use in the dilution. For example, the composition may be used, with being dissolved in a solvent such as 1,3-bis(trifluoromethyl)benzene, Fluorinert (manufactured by 3M), perfluorobutyl methyl ether or perfluorobutyl ethyl ether so that a desired concentration is achieved. In particular, the solvent is preferably used in the application of thin film coating.

The curable composition of the present invention enables a cured product having favorable adhesiveness to a metal or a plastic base material to be formed, and thus can be useful particularly as an adhesive to be applied to peripherals of electrical and electronic components and peripherals of in-car members. The curable composition of the present invention has a favorable elastic modulus particularly even at a low temperature, and thus can be usefully used in, for example, an automobile member (for example, a sealing material, specifically, a gasket), particularly an automobile member usable in a cool region (for example, −50° C. or less).

A cured product of the curable composition of the present invention is favorable in chemical resistance, acid resistance and base resistance. Such a cured product of the curable composition of the present invention can also be used in a chemical plant, a semiconductor manufacturing equipment, or the like.

EXAMPLES

The present invention is more specifically described with reference to the following Examples, but is not intended to be limited to such Examples. The occurrence order of repeating units constituting perfluoropolyether is not limited in the present Examples.

Example 1

A curable composition was prepared which included the following PFPE-containing silane compound (fluorine-containing silane compound), cross-linking agent, catalyst and solvent and which had a solid concentration of 10% by mass. Hereinafter, the solid concentration refers to a mass ratio of the PFPE-containing silane compound, the cross-linking agent and the catalyst to the curable composition.

PFPE silane compound: $(C_2H_5O)_3SiCH_2CH_2CH_2NHCOCF_2(OC_2F_4)_e\text{—}(OCF_2)_f\text{—}CF_2CONHCH_2CH_2CH_2Si(OC_2H_5)_3$ wherein e=40 and f=58

Cross-linking agent: tetraethoxysilane (TEOS) (10 parts by mass based on 100 parts by mass of PFPE-containing silane compound)

Catalyst: tetraisopropaxy titanium (0.09 parts by mass based on 100 parts by mass of PFPE-containing silane compound Solvent: Novec HFE7200

Examples 2 to 4

Each curable composition was prepared in the same manner as in Example 1 except that the solid concentration was changed to the concentration described in Table 1.

(Formation of Cured Product)

A glass plate was spray-coated with each of the curable compositions obtained in Examples 1 to 4. Thereafter, the resultant was left to still stand under an atmosphere of 25° C. and a humidity of 65% for 24 hours, thereby forming a cured product.

The thickness of the resulting cured product was measured with a laser microscope (Model No.: VK9710, manufactured by Keyence Corporation). The results are shown in Table 1. Respective numbers in "Thickness" in Table 1 here represent the minimum value and the maximum value measured. The description "Uniformity" in Table 1 represents a state where a continuous film was formed without any region not coated, like a pinhole. Specifically, an image obtained by the laser microscope was visually confirmed, and any portion where a glass surface was exposed was determined as having a pinhole.

TABLE 1

| | Solid concentration (% by mass) | Thickness (μm) | State of film |
|---|---|---|---|
| Example 1 | 10 | 8-15 | Uniformity |
| Example 2 | 30 | 21-33 | Uniformity |
| Example 3 | 50 | 30-43 | Uniformity |
| Example 4 | 80 | 45-102 | Uniformity |

Comparative Example 1

A composition was prepared in the same manner as in Example 1 except that no solvent was included.

The composition obtained in Comparative Example 1 was used to try to form a cured product according to the same method as in the compositions obtained in Examples, but the composition obtained in Comparative Example 1 was high in viscosity and did not enable any cured product to be formed according to the above method.

Comparative Example 2

A composition was prepared which included the following compound having PFPE and the following solvent and which had a solid concentration of 80% by mass.
Compound having PFPE:
$CF_3(OC_3F_6)_eCF_2(CH_2CH(Si(OCH_3)_3))_3H$, wherein e=24
Solvent: Novec HFE7200

A cured product was formed from the composition obtained in Comparative Example 2, according to the same operation as in the compositions obtained in Examples. The cured product obtained from the composition of Comparative Example 2 was not in the form of gel, and a film formed was not uniform.

INDUSTRIAL APPLICABILITY

The present invention can be suitably utilized for forming a fluorine-containing sealing material for embedding any void (for example, a void at a display edge) of a display or between electronic members such as a printed board in electronic equipment.

The present invention includes following embodiments:
Embodiment 1. A curable composition comprising:
 a fluorine-containing silane compound having two or more Si atoms each bonding to at least one group selected from the group consisting of a hydroxyl group and a hydrolyzable group;
 an organosilicon compound having at least two —O—$R^{g3}$ (s) each bonding to a Si atom, wherein each $R^{g3}$, at each occurrence, is independently a hydrogen atom or a monovalent organic group;
 a catalyst; and
 a solvent.
Embodiment 2. The curable composition according to Embodiment 1, comprising 1 to 300 parts by mass of the solvent based on 100 parts by mass of a total amount of the fluorine-containing silane compound, the organosilicon compound and the catalyst.
Embodiment 3. The curable composition according to Embodiment 1 or 2, wherein the fluorine-containing silane compound is a perfluoropolyether group-containing silane compound.
Embodiment 4. The curable composition according to any one of Embodiments 1 to 3, wherein the fluorine-containing silane compound is at least one perfluoropolyether group-containing silane compound represented by formula (A), (B), (C) or (D):

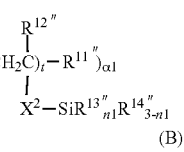
(A)

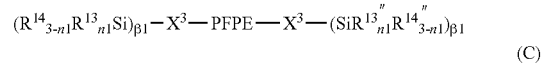
(B)

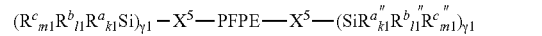
(C)

(D)

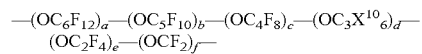

wherein:
 each PFPE, at each occurrence, is independently a group represented by formula:

—$(OC_6F_{12})_a$—$(OC_5F_{10})_b$—$(OC_4F_8)_c$—$(OC_3X^{10}_6)_d$—$(OC_2F_4)_e$—$(OCF_2)_f$— wherein a, b, c, d, e and f are each independently an integer of 0 or more and 200 or less, the sum of a, b, c, d, e and f is at least 1, the occurrence order of the repeating units in parentheses with a, b, c, d, e or f is not limited in the formula, and each $X^{10}$, at each occurrence, is independently a hydrogen atom, a fluorine atom or a chlorine atom;
 each $R^{13}$, at each occurrence, independently represents a hydroxyl group or a hydrolyzable group;
 each $R^{14}$, at each occurrence, independently represents a hydrogen atom or an alkyl group having 1 to 22 carbon atoms;
 each $R^{11}$, at each occurrence, independently represents a hydrogen atom or a halogen atom;
 each $R^{12}$, at each occurrence, independently represents a hydrogen atom or a lower alkyl group;
 $R^{11''}$, $R^{12''}$, $R^{13''}$ and $R^{14''}$ have the same meanings as $R^{11}$, $R^{12}$, $R^{13}$ and $R^{14}$, respectively;
 n1 with respect to each (—$SiR^{13}_{n1}R^{14}_{3-n1}$) unit or each (—$SiR^{13''}_{n1}R^{14''}_{3-n1}$) unit is independently an integer of 0 to 3;
 provided that at least two groups selected from the group consisting of $R^{13}$ and $R^{13''}$, at each occurrence, are each independently present in formulae (A) and (B);
 each $X^1$, at each occurrence, independently represents a single bond or a di- to decavalent organic group;
 each $X^2$, at each occurrence, independently represents a single bond or a divalent organic group;
 each t, at each occurrence, is independently an integer of 1 to 10;
 each α1, at each occurrence, is independently an integer of 1 to 9;
 each $X^3$, at each occurrence, independently represents a single bond or a di- to decavalent organic group;
 each β1, at each occurrence, is independently an integer of 1 to 9;
 each $X^5$, at each occurrence, independently represents a single bond or a di- to decavalent organic group;
 each γ1, at each occurrence, is independently an integer of 1 to 9;
 each $R^a$, at each occurrence, independently represents —$Z^3$—$SiR^{71}_{p1}R^{72}_{q1}R^{73}_{r1}$;

each $Z^3$, at each occurrence, independently represents an oxygen atom or a divalent organic group;

each $R^{71}$, at each occurrence, independently represents $R^{a'}$;

$R^{a'}$ has the same meanings as $R^a$;

the number of Si linearly bonded via a $Z^3$ group in $R^a$ is at most 5;

each $R^{72}$, at each occurrence, independently represents a hydroxyl group or a hydrolyzable group;

each $R^{73}$, at each occurrence, independently represents a hydrogen atom or a lower alkyl group;

each p1, at each occurrence, is independently an integer of 0 to 3;

each q1, at each occurrence, is independently an integer of 0 to 3;

each r1, at each occurrence, is independently an integer of 0 to 3;

each $R^{a''}$, at each occurrence, independently represents $-Z^3-SiR^{71}_{p1}R^{72''}_{q1}R^{73}_{r1}$;

$R^{72''}$ has the same meanings as $R^{72}$;

provided that the sum of p1, q1 and r1 with respect to $(-Z^3-SiR^{71}_{p1}R^{72}_{q1}R^{73}_{r1})$ or $(-Z^3-SiR^{71}_{p1}R^{72''}_{q1}R^{73}_{r1})$ is 3 and at least one q1 in formula (C) is an integer of 1 to 3;

each $R^b$, at each occurrence, independently represents a hydroxyl group or a hydrolyzable group;

each $R^c$, at each occurrence, independently represents a hydrogen atom or a lower alkyl group;

$R^{b''}$ and $R^{c''}$ have the same meanings as $R^b$ and $R^c$, respectively;

each k1, at each occurrence, is independently an integer of 0 to 3;

each l1, at each occurrence, is independently an integer of 0 to 3;

each m1, at each occurrence, is independently an integer of 0 to 3;

provided that the sum of k1, l1 and m1 with respect to $(SiR^a_{k1}R^b_{l1}R^c_{m1})$ or $(SiR^{a''}_{k1}R^{b''}_{l1}R^{c''}_{m1})$ is 3;

at least two groups selected from the group consisting of $R^b$, $R^{b''}$, $R^{72}$ and $R^{72''}$ are present in formula (C);

each $X^7$ independently represents a single bond or a di- to decavalent organic group;

each δ1 is independently an integer of 1 to 9;

each $R^d$, at each occurrence, independently represents $-Z^4-CR^{81}_{p2}R^{82}_{q2}R^{83}_{r2}$;

each $Z^4$, at each occurrence, independently represents an oxygen atom or a divalent organic group;

each $R^{81}$, at each occurrence, independently represents $R^{d'}$;

$R^{d'}$ has the same meanings as $R^d$;

the number of C linearly linked via a $Z^4$ group in $R^d$ is at most 5;

each $R^{82}$, at each occurrence, independently represents $-Y-SiR^{85}_{n2}R^{86}_{3-n2}$;

each Y, at each occurrence, independently represents a divalent organic group;

each $R^{85}$, at each occurrence, independently represents a hydroxyl group or a hydrolyzable group;

each $R^{86}$, at each occurrence, independently represents a hydrogen atom or a lower alkyl group;

each $R^{83}$, at each occurrence, independently represents a hydrogen atom, a hydroxyl group or a lower alkyl group;

each p2, at each occurrence, is independently an integer of 0 to 3;

each q2, at each occurrence, is independently an integer of 0 to 3;

each r2, at each occurrence, is independently an integer of 0 to 3;

each $R^{d''}$, at each occurrence, independently represents $-Z^4-CR^{81}_{p2}R^{82''}_{q2}R^{83}_{r2}$;

$R^{82''}$ represents $-Y-SiR^{85''}_{n2}R^{86''}_{3-n2}$;

provided that the sum of p2, q2 and r2 with respect to $(-Z^4-CR^{81}_{p2}R^{82}_{q2}R^{83}_{r2})$ or with respect to $(-Z^4-CR^{81}_{p2}R^{82''}_{q2}R^{83}_{r2})$ is 3;

n2 with respect to a $(-Y-SiR^{85}_{n2}R^{86}_{3-n2})$ unit or a $(-Y-SiR^{85''}_{n2}R^{86''}_{3-n2})$ unit independently represents an integer of 0 to 3;

$R^{85''}$ and $R^{86''}$ have the same meanings as $R^{85}$ and $R^{86}$, respectively;

each $R^e$, at each occurrence, independently represents $-Y-SiR^{85}_{n2}R^{86}_{3-n2}$;

each $R^{e''}$, at each occurrence, independently represents $-Y-SiR^{85''}_{n2}R^{86''}_{3-n2}$;

each $R^f$, at each occurrence, independently represents a hydrogen atom, a hydroxyl group or a lower alkyl group;

$R^{f''}$ has the same meanings as $R^f$;

each k2, at each occurrence, is independently an integer of 0 to 3;

each l2, at each occurrence, is independently an integer of 0 to 3; and each m2, at each occurrence, is independently an integer of 0 to 3;

provided that the sum of k2, l2 and m2 with respect to $(CR^d_{k2}R^e_{l2}R^f_{m2})$ or with respect to $(CR^{d''}_{k2}R^{e''}_{l2}R^{f''}_{m2})$ is 3, and two or more groups selected from the group consisting of a group represented by $-Y-SiR^{85}_{n2}R^{86}_{3-n2}$ wherein n2 is 1 or more and a group represented by $-Y-SiR^{85''}_{n2}R^{86''}_{3-n2}$ wherein n2 is 1 or more are present in formula (D).

Embodiment 5. The curable composition according to Embodiment 4, wherein $X^{10}$ is a fluorine atom.

Embodiment 6. The curable composition according to any one of Embodiments 1 to 5, wherein the Si atom bonding to at least one group selected from the group consisting of a hydroxyl group and a hydrolyzable group is present at each of both ends of a main backbone of the fluorine-containing silane compound.

Embodiment 7. The curable composition according to any one of Embodiments 1 to 6, wherein the catalyst is a metal-based catalyst, an organic acid-based catalyst, an inorganic acid-based catalyst or a basic catalyst.

Embodiment 8. The curable composition according to any one of Embodiments 1 to 7, wherein the catalyst is a metal-based catalyst.

Embodiment 9. The curable composition according to any one of Embodiments 1 to 8, wherein the catalyst comprises a titanium atom, a zirconium atom or a tin atom.

Embodiment 10. The curable composition according to any one of Embodiments 1 to 9, wherein the catalyst is at least one selected from the group consisting of tetrabutyl titanate, tetrapropyl titanate, tetrapropyl zirconate, tetra-n-butyl zirconate, tetra-n-propyl zirconate, dibutyltin dimethoxide and dibutyltin dilaurate.

Embodiment 11. The curable composition according to any one of Embodiments 1 to 10, comprising 0.1 to 30 parts by mass of the organosilicon compound based on 100 parts by mass of the fluorine-containing silane compound.

The invention claimed is:
1. A curable composition comprising:
a fluorine-containing silane compound having two or more Si atoms each bonding to at least one group selected from the group consisting of a hydroxyl group and a hydrolyzable group;
an organosilicon compound;
a catalyst; and
a solvent,
wherein
the catalyst comprises a metal-based catalyst having titanium or zirconium, and
the organosilicon compound is
at least one represented by formula (E1), (E2), (E3), (E4), or (E5), or
at least one selected from the group consisting of tetraethoxysilane, tetramethoxysilane, methyltriethoxysilane, methyltrimethoxysilane, dimethyldimethoxysilane, tridecafluoro-n-octyltriethoxysilane and tridecafluoro-n-octyltrimethoxysilane;

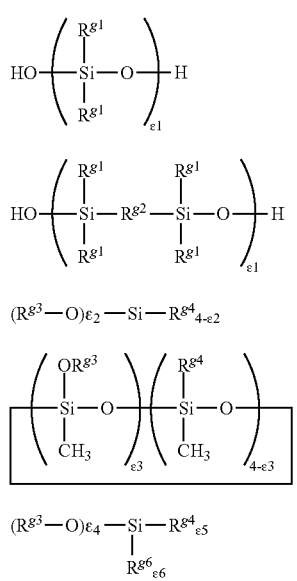

each $R^{g1}$, at each occurrence, is independently a substituted or unsubstituted monovalent hydrocarbon group having 1 to 8 carbon atoms;
each $R^{g2}$, at each occurrence, independently represents a substituted or unsubstituted divalent hydrocarbon group having 1 to 20 carbon atoms;
each $\varepsilon 1$, at each occurrence, is independently an integer of 1 or more;
each $R^{g3}$, at each occurrence, is independently $CH_3-$, $C_2H_5-$, $C_3H_7-$, $CF_3CH_2-$, $CH_3CO-$, $CH_2=C(CH_3)-$, $CH_3CH_2C(CH_3)=N-$, $(CH_3)_2N-$, $(C_2H_5)_2N-$, $CH_2=C(OC_2H_5)-$, $(CH_3)_2C=C(OC_8H_{17})-$, or

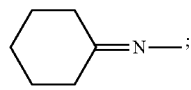

each $R^{g4}$, at each occurrence, is independently a substituted or unsubstituted monovalent hydrocarbon group, except for the monovalent hydrocarbon group comprising a fluorine atom, wherein a substituent of the monovalent hydrocarbon group is selected from the group consisting of a chlorine atom, an iodine atom, a C1-6 alkyl group, a C2-6 alkenyl group, a C2-6 alkynyl group, a C3-10 cycloalkyl group, a C3-10 unsaturated cycloalkyl group, a 5 to 10-membered heterocyclyl group, a 5 to 10-membered unsaturated heterocyclyl group, a C6-10 aryl group and a 5 to 10-membered heteroaryl group each optionally substituted with one or more of a chlorine atom and/or an iodine atom;
each $R^{g6}-$, at each occurrence, independently represents $R^{g8}-R^{g7}-$;
each $R^{g7}$, at each occurrence, independently represents a single bond, an oxygen atom or a divalent organic group;
each $R^{g8}$, at each occurrence, is a methacrylic group, or a vinyl group;
$\varepsilon 2$, at each occurrence, is independently 2 or 3;
$\varepsilon 3$, at each occurrence, is independently 2 or 3;
$\varepsilon 4$ is an integer of 2 or more;
$\varepsilon 5$ is an integer of 0 or more;
$\varepsilon 6$ is 1 or 2;
the sum of $\varepsilon 4$, $\varepsilon 5$ and $\varepsilon 6$ is 4;
the fluorine-containing silane compound is represented by formula (A), (B), (C) or (D):

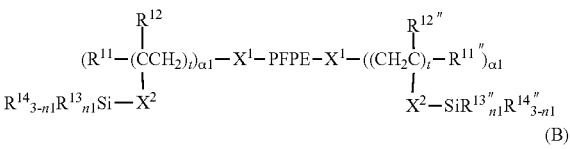

$$(R^{14}_{3-n1}R^{13}_{n1}Si)_{\beta 1}-X^3-PFPE-X^3-(SiR^{13''}_{n1}R^{14''}_{3-n1})_{\beta 1} \quad (B)$$

$$(R^c_{m1}R^b_{l1}R^a_{k1}Si)_{\gamma 1}-X^5-PFPE-X^5-(SiR^{a''}_{k1}R^{b''}_{l1}R^{c''}_{m1})_{\gamma 1} \quad (C)$$

$$(R^f_{m2}R^e_{l2}R^d_{k2}C)_{\delta 1}-X^7-PFPE-X^7-(CR^{d''}_{k2}R^{e''}_{l2}R^{f''}_{m2})_{\delta 1} \quad (D)$$

wherein:
each PFPE, at each occurrence, is independently a group represented by formula:

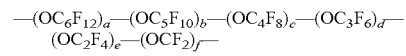

wherein a, b, c, d, e and f are each independently an integer of 0 or more and 200 or less, the sum of a, b, c, d, e and f is at least 1, the occurrence order of the repeating units in parentheses with a, b, c, d, e or f is not limited in the formula, and each $X^{10}$, at each occurrence, is independently a hydrogen atom, a fluorine atom or a chlorine atom;
each $R^{13}$, at each occurrence, independently represents a hydroxyl group or a hydrolyzable group;
each $R^{14}$, at each occurrence, independently represents a hydrogen atom or an alkyl group having 1 to 22 carbon atoms;
each $R^{11}$, at each occurrence, independently represents a hydrogen atom or a halogen atom;
each $R^{12}$, at each occurrence, independently represents a hydrogen atom or a lower alkyl group;

$R^{11"}$, $R^{12"}$, $R^{13"}$ and $R^{14"}$ have the same meanings as $R^{11}$, $R^{12}$, $R^{13}$ and $R^{14}$, respectively;

n1 with respect to each ($-SiR^{13}{}_{n1}R^{14}{}_{3-n1}$) unit or each ($-SiR^{13"}{}_{n1}R^{14"}{}_{3-n1}$) unit is independently an integer of 0 to 3;

provided that at least two groups selected from the group consisting of $R^{13}$ and $R^{13"}$, at each occurrence, are each independently present in formulae (A) and (B);

each $X^1$, at each occurrence, independently represents a single bond or a di- to decavalent organic group;

each $X^2$, at each occurrence, independently represents a single bond or a divalent organic group;

each t, at each occurrence, is independently an integer of 1 to 10;

each α1, at each occurrence, is independently an integer of 1 to 9;

each $X^3$, at each occurrence, independently represents $-(R^{31})_{p'}-(X^a)_{q'}-R^{32}-$;

$R^{31}$ represents a single bond, or $-(CH_2)_{s'}-$;

s' is an integer of 1 to 20;

$X^a$ represents, $-(X^b)_{l'}-$;

each $X^b$, at each occurrence, independently represents a group selected from the group consisting of $-O-$, $-S-$, $-C(O)O-$, $-Si(R^{33})_2-$, $-(Si(R^{33})_2O)_{m'}-Si(R^{33})_2-$, $-CONR^{34}-$, $-O-CONR^{34}-$, $-NR^{34}-$ and $-(CH_2)_{n'}-$;

each $R^{33}$, at each occurrence, independently represents a phenyl group, a $C_{1-6}$ alkyl group or a $C_{1-6}$ alkoxy group;

each $R^{34}$, at each occurrence, independently represents a hydrogen atom, a phenyl group, or a $C_{1-6}$ alkyl group;

each m', at each occurrence, is independently an integer of 1 to 100;

each n', at each occurrence, is independently an integer of 1 to 20;

l' is an integer of 1 to 10;

p' is 0 or 1; and q' is 0 or 1;

provided that at least one of p' and q' is 1, and the occurrence order of the respective repeating units in parentheses with p' or q' is not limited;

$R^{32}$ represents a single bond, or $-(CH_2)_{t'}-$;

t' is s an integer of 1 to 20;

β1 is 1;

each $X^5$, at each occurrence, independently represents $-(R^{31})_{p'}-(X^a)_{q'}-R^{32}-$;

γ1 is 1;

each $R^a$, at each occurrence, independently represents $-Z^3-SiR^{71}{}_{p1}R^{72}{}_{q1}R^{73}{}_{r1}$;

each $Z^3$, at each occurrence, independently represents an oxygen atom or a divalent organic group;

each $R^{71}$, at each occurrence, independently represents $R^{a'}$;

$R^{a'}$ has the same meanings as $R^a$;

the number of Si linearly bonded via a $Z^3$ group in $R^a$ is at most 5;

each $R^{72}$, at each occurrence, independently represents a hydroxyl group or a hydrolyzable group;

each $R^{73}$, at each occurrence, independently represents a hydrogen atom or a lower alkyl group;

each p1, at each occurrence, is independently an integer of 0 to 3;

each q1, at each occurrence, is independently an integer of 0 to 3;

each r1, at each occurrence, is independently an integer of 0 to 3;

each $R^{a"}$, at each occurrence, independently represents $-Z^3-SiR^{71}{}_{p1}R^{72}{}_{q1}R^{73}{}_{r1}$;

$R^{72"}$ has the same meanings as $R^{72}$;

provided that the sum of p1, q1 and r1 with respect to ($-Z^3-SiR^{71}{}_{p1}R^{72}{}_{q1}R^{73}{}_{r1}$) or ($-Z^3-SiR^{71}{}_{p1}R^{72"}{}_{q1}R^{73}{}_{r1}$) is 3 and at least one q1 in formula (C) is an integer of 1 to 3;

each $R^b$, at each occurrence, independently represents a hydroxyl group or a hydrolyzable group;

each $R^c$, at each occurrence, independently represents a hydrogen atom or a lower alkyl group;

$R^{b"}$ and $R^{c"}$ have the same meanings as $R^b$ and $R^c$, respectively;

each k1, at each occurrence, is independently an integer of 0 to 3;

each l1, at each occurrence, is independently an integer of 0 to 3;

each m1, at each occurrence, is independently an integer of 0 to 3;

provided that the sum of k1, l1 and m1 with respect to $(SiR^a{}_{k1}R^b{}_{l1}R^c{}_{m1})$ or $(SiR^{a"}{}_{k1}R^{b"}{}_{l1}R^{c"}{}_{m1})$ is 3;

at least two groups selected from the group consisting of $R^b$, $R^{b"}$, $R^{72}$ and $R^{72"}$ are present in formula (C);

each $X^1$ independently represents $-(R^{31})_{p'}-(X^a)_{q'}-R^{32}-$;

δ1 is 1;

each $R^d$, at each occurrence, independently represents $-Z^4-CR^{81}{}_{p2}R^{82}{}_{q2}R^{83}{}_{r2}$;

each $Z^4$, at each occurrence, independently represents an oxygen atom or a divalent organic group;

each $R^{81}$, at each occurrence, independently represents $R^{d'}$;

$R^{d'}$ has the same meanings as $R^d$;

the number of C linearly linked via a $Z^4$ group in $R^d$ is at most 5;

each $R^{82}$, at each occurrence, independently represents $-Y-SiR^{85}{}_{n2}R^{86}{}_{3-n2}$;

each Y, at each occurrence, independently represents a divalent organic group;

each $R^{85}$, at each occurrence, independently represents a hydroxyl group or a hydrolyzable group;

each $R^{86}$, at each occurrence, independently represents a hydrogen atom or a lower alkyl group;

each $R^{83}$, at each occurrence, independently represents a hydrogen atom, a hydroxyl group or a lower alkyl group;

each p2, at each occurrence, is independently an integer of 0 to 3;

each q2, at each occurrence, is independently an integer of 0 to 3;

each r2, at each occurrence, is independently an integer of 0 to 3;

each $R^{d"}$, at each occurrence, independently represents $-Z^4-CR^{81}{}_{p2}R^{82"}{}_{q2}R^{83}{}_{r2}$;

$R^{82"}$ represents $-Y-SiR^{85"}{}_{n2}R^{86"}{}_{3-n2}$;

provided that the sum of p2, q2 and r2 with respect to ($-Z^4-CR^{81}{}_{p2}R^{82}{}_{q2}R^{83}{}_{r2}$) or with respect to ($-Z^4-CR^{81}{}_{p2}R^{82"}{}_{q2}R^{83}{}_{r2}$) is 3;

n2 with respect to a ($-Y-SiR^{85}{}_{n2}R^{86}{}_{3-n2}$) unit or a ($-Y-SiR^{85"}{}_{n2}R^{86"}{}_{3-n2}$) unit independently represents an integer of 0 to 3;

$R^{85"}$ and $R^{86"}$ have the same meanings as $R^{85}$ and $R^{86}$, respectively;

each $R^e$, at each occurrence, independently represents $-Y-SiR^{85}{}_{n2}R^{86}{}_{3-n2}$;

each $R^{e"}$, at each occurrence, independently represents $-Y-SiR^{85"}{}_{n2}R^{86"}{}_{3-n2}$;

each $R^f$, at each occurrence, independently represents a hydrogen atom, a hydroxyl group or a lower alkyl group;

$R^{f''}$ has the same meanings as $R^f$;

each k2, at each occurrence, is independently an integer of 0 to 3;

each l2, at each occurrence, is independently an integer of 0 to 3; and each m2, at each occurrence, is independently an integer of 0 to 3;

provided that the sum of k2, l2 and m2 with respect to $(CR^d{}_{k2}R^e{}_{l2}R^f{}_{m2})$ or with respect to $(CR^{d''}{}_{k2}R^{e''}{}_{l2}R^{f''}{}_{m2})$ is 3, and two or more groups selected from the group consisting of a group represented by —Y—$SiR^{85}{}_{n2}R^{86}{}_{3-n2}$ wherein n2 is 1 or more and a group represented by —Y—$SiR^{85''}{}_{n2}R^{86''}{}_{3-n2}$ wherein n2 is 1 or more are present in formula (D).

2. The curable composition according to claim 1, comprising 1 to 300 parts by mass of the solvent based on 100 parts by mass of a total amount of the fluorine-containing silane compound, the organosilicon compound and the catalyst.

3. The curable composition according to claim 1, wherein $X^{10}$ is a fluorine atom.

4. The curable composition according to claim 1, wherein the Si atom bonding to at least one group selected from the group consisting of a hydroxyl group and a hydrolyzable group is present at each of both ends of a molecular backbone of the fluorine-containing silane compound.

5. The curable composition according to claim 1, wherein the catalyst is at least one selected from the group consisting of tetrabutyl titanate, tetrapropyl titanate, tetrapropyl zirconate, tetra-n-butyl zirconate, and tetra-n-propyl zirconate.

6. The curable composition according to claim 1, comprising 0.1 to 30 parts by mass of the organosilicon compound based on 100 parts by mass of the fluorine-containing silane compound.

* * * * *